United States Patent [19]

Yagasaki

[11] Patent Number: 5,515,388
[45] Date of Patent: May 7, 1996

[54] APPARATUS AND METHOD FOR PREVENTING REPETITIVE RANDOM ERRORS IN TRANSFORM COEFFICIENTS REPRESENTING A MOTION PICTURE SIGNAL

[75] Inventor: Yoichi Yagasaki, College Park, Md.

[73] Assignee: Sony Corporation, Japan

[21] Appl. No.: 210,613

[22] Filed: Mar. 18, 1994

Related U.S. Application Data

[63] Continuation-in-part of Ser. No. 202,783, Feb. 28, 1994.

[30] Foreign Application Priority Data

Mar. 19, 1993 [JP] Japan ..................... 5-059909

[51] Int. Cl.$^6$ ..................................... G06F 11/10
[52] U.S. Cl. ........................... 371/49.1; 348/405
[58] Field of Search ................ 371/49.1; 375/27, 375/30; 348/405, 408, 420, 421, 415, 390, 400, 417, 409, 418, 416

[56] References Cited

U.S. PATENT DOCUMENTS

| | | | |
|---|---|---|---|
| 5,144,426 | 9/1992 | Tanaka et al. | 358/133 |
| 5,237,410 | 8/1993 | Inoue | 358/136 |
| 5,251,028 | 10/1993 | Iu | 358/133 |
| 5,274,443 | 12/1993 | Dachiku et al. | 358/136 |
| 5,333,012 | 7/1994 | Singhal et al. | 348/405 |
| 5,374,958 | 12/1994 | Yanagihara | 348/45 |

*Primary Examiner*—James P. Trammell
*Attorney, Agent, or Firm*—Limbach & Limbach; Ian Hardcastle

[57] ABSTRACT

A method of quantizing coefficient blocks of DCT coefficients representing a motion picture signal in a manner that prevents repetitive mismatch errors. The coefficient blocks include a current coefficient block derived from a current picture block having a position in a current picture, and a previous coefficient block derived from a previous picture block located in a previous picture at the position of the current picture block in the current picture. The current picture is a P-picture, the previous picture is either the P-picture or the I-picture processed immediately preceding the current picture. In the method, the previous coefficient block is quantized using a first step size. A second step size for quantizing the current coefficient block is determined. The second step size is set to be different from the first step size. Finally, the current coefficient block is quantized using the second step size set in the setting step.

60 Claims, 23 Drawing Sheets

APPARATUS AND METHOD FOR PREVENTING REPETITIVE RANDOM ERRORS IN TRANSFORM COEFFICIENTS REPRESENTING A MOTION PICTURE SIGNAL

PRIOR APPLICATION

This application is a Continuation-in-Part of pending prior U.S. patent application Ser. No. 08/202,783 of inventors Teruhiko Suzuki, Yoichi Yagasaki, Tatsuya Sudo, and Tom Okazaki, entitled Methods and Apparatus for Preventing Rounding Errors when Transform Coefficients Representing a Motion Picture Signal are Inversely Transformed, filed 28 Feb. 1994.

FIELD OF THE INVENTION

This invention relates to a method and apparatus for compressing a motion picture signal, and, in particular, to a method and apparatus for compressing a motion picture signal in which transform coefficients derived from the motion picture signal are quantized in a manner that prevents random errors from accumulating.

BACKGROUND OF THE INVENTION

Orthogonal transforms are used in various applications in diverse digital signal processing systems. Orthogonal transforms permit signal processing to be carried out in the frequency domain. The Fast Fourier Transform (FFT) and the Discrete Cosine Transform (DCT), etc. are widely known types of orthogonal transforms. An orthogonal transform analyzes, for example, a fragment of a signal in the time domain into frequency components (varying depending upon the orthogonal transform function applied) indicating the spectrum (i.e., the distribution of energy versus frequency) of the original signal fragment in the time domain. By processing in various ways the frequency components (commonly called transform coefficients) resulting from orthogonally transforming the signal fragment, redundancy in the original signal fragment can be reduced. In other words, by orthogonally transforming the original signal fragment, and processing the resulting transform coefficients, the original signal fragment can be represented using fewer bits than were used to represent the original signal fragment. Moreover, by inversely orthogonally transforming the transform coefficients, the original signal fragment in the time domain can be recovered.

Apparatus for compressing a motion picture signal and for expanding a compressed motion picture signal are common examples of digital signal processing systems that use orthogonal transform processing.

It is known that the signal power of signals having a high correlation is concentrated at lower frequencies in the frequency domain. As the concentration of signal power on a specific coordinate axis (e.g., the frequency axis) increases, signal redundancy can be progressively reduced, and the signal can be compressed more efficiently.

Since a motion picture signal is generally highly correlated, both spatially, and in time, orthogonal transform processing can be applied to concentrate the signal power on a specific coordinate axis, and the motion picture signal can be compressed with high efficiency.

Hitherto, an extremely large amount of information has been required to represent a motion picture, using, for example, an NTSC-standard video signal. Because of this, recording a motion picture signal has required a recording medium with a very high storage capacity if the medium is to provide an acceptably-long recording time. Moreover, the information rate at which the motion picture signal is recorded on and reproduced from such a medium has been very high. Physically large magnetic tapes or optical discs have therefore been required to store motion picture signals.

If it is desired to record a motion picture signal on a more compact recording medium with an acceptably-long recording time, signal compression must be applied to the motion picture signal to reduce the amount of information that needs to be stored. In addition, an apparatus must be provided that is capable of expanding the compressed motion picture signal reproduced from the compact recording medium.

To meet the requirements just described, various motion picture signal compression systems have been proposed that exploit the correlation between and within the portions of the motion picture signal representing the pictures constituting the motion picture signal. For example, the motion picture signal compression system proposed by the Moving Picture Experts Group (MPEG) is widely known. Since the MPEG system has been widely described in various printed publications, a detailed explanation of the MPEG system will not be repeated here.

The following description will refer frequently to a "picture." Since the signal processing techniques described herein relate to processing a motion picture signal representing a motion picture, it is to be understood that the word "picture," as generally used herein, refers to the portion of a motion picture signal that represents a picture of the motion picture. Moreover, a motion picture signal can represent a picture of the motion picture as a frame or a field. Unless stated otherwise, a "picture" means a field or a frame.

The MPEG system first determines the differences between the pictures constituting the motion picture signal to reduce the redundancy of the motion picture signal in the time domain. Then, the MPEG system reduces the redundancy of the motion picture signal in the spatial domain by applying orthogonal transform processing to blocks of inter picture differences in the spatial domain. The MPEG system applies discrete cosine transform (DCT) processing as the orthogonal transform processing. By reducing redundancy in both the time and spatial domains, the motion picture is compressed extremely efficiently. The compressed motion picture signal resulting from the compression process just described may then be recorded on a recording medium, or transmitted via a suitable transmission medium.

When the compressed motion picture signal is reproduced from the recording medium, or is received from the transmission medium, the blocks of transform coefficients resulting from the DCT transform are extracted from the compressed motion picture signal. The transform coefficients are processed using an inverse orthogonal transform (an inverse discrete cosine transform (IDCT) in the MPEG system) to recover blocks of inter picture differences in the course of reconstructing the pictures of the original motion picture signal.

An example of the construction of a motion picture signal compressor apparatus based on the MPEG system is shown in FIG. 1. In the compressor shown in FIG. 1, a digital motion picture signal is fed into the block formatting circuit 101, where it is convened from a standard video format, e.g., from the NTSC standard video signal format, into a block format to provide a blocked motion picture signal. In this, each picture of the motion picture signal is divided in the spatial domain, i.e., horizontally and vertically, into macroblocks of, e.g., 16×16 pixels. The macroblocks are also sub-divided into blocks of 8×8 pixels.

The apparatus shown in FIG. 1 compresses each picture of the motion picture signal block-by-block until all the blocks constituting the picture have been processed. The apparatus then processes another picture of the motion picture signal, which may or may not be the next picture in the sequence of pictures constituting the motion picture. The following description of the apparatus shown in FIG. 1, the compression of one block of pixels in one picture will be described. The block of pixels being compressed is the current picture block, which is a block of the current picture. The blocked motion picture signal is delivered to the motion predictor 102. The motion predictor feeds the current picture, including the current picture block S1, block-by-block to the difference block calculating circuit 103.

When the difference block calculating circuit 103 receives the current picture block from the motion predictor 102, it also receives the matching block S2 corresponding to the current picture block from the motion predictor 102. The matching block is derived from the reconstructed pictures stored in the picture memory block 112 by the predictor 113. The difference block calculating circuit 103 determines the pixel-by-pixel difference between the current picture block S1 and its corresponding matching block S2. The resulting block of differences, the difference block S3, is fed to the orthogonal transform circuit 104.

The orthogonal transform circuit 104, which is normally a discrete cosine transform (DCT) circuit, applies orthogonal transform processing to the difference block S3, and feeds the resulting block of transform coefficients to the quantizer 105. The quantizer 105 quantizes the block of transform coefficients to provide a block of quantized transform coefficients. The variable-length coder 106 subjects the block of quantized transform coefficients from the quantizer 105 to variable-length coding, such as Huffmann coding or run length coding, etc. The resulting block of coded transform coefficients is then fed to, e.g., a digital transmission path, via the output buffer 107.

A control signal indicating the number of bits stored in the output buffer 107 is fed back to the quantizer 105. The quantizer adjusts the quantizing step size in response to the control signal to prevent the output buffer from overflowing or underflowing. Increasing or decreasing the quantizing step size respectively decreases or increases the number of bits fed into the output buffer.

The block of quantized transform coefficients is also delivered from the quantizer 105 to the inverse quantizer 108, which forms pan of the local decoder used in the compressor to derive from the quantized transform coefficients the reconstructed pictures used in the prediction coding. The inverse quantizer 108 inversely quantizes the block of quantized transform coefficients by performing processing complementary to the quantizing processing performed by the quantizer 105. The resulting block of transform coefficients is fed to the inverse orthogonal transform circuit 109, where it is inversely orthogonally transformed by processing complementary to the orthogonal transform processing performed by the orthogonal transform circuit 104. The resulting restored difference block S4 is fed to the adder 110.

The adder 110 also receives the matching block S2 for the current picture block S1 from one of the picture memories in the picture memory group 112 selected by the predictor 113. The adder 110 performs pixel-bypixel addition between the restored difference block S4 from the inverse orthogonal transform circuit 109 and the matching block S2 from the picture memory group 112 to provide the reconstructed picture block S5. The reconstructed picture block is delivered to one of the picture memories 112A to 112D selected by the selector 111, where it is stored.

The reconstructed picture block is stored in the selected picture memory, where it forms one block (corresponding to the current picture block) of the reconstructed picture being reconstructed, block-by-block, from reconstructed picture blocks in the selected picture memory. When complete, the reconstructed picture will be used for deriving matching blocks for performing prediction coding to compress other pictures of the motion picture signal.

The motion predictor 102 determines, for each macroblock of the current picture, a motion vector between the macroblock of the current pictures and different macroblocks of the other pictures of the motion picture signal stored therein. The motion predictor also generates a sum of the absolute values of the differences (the "difference absolute value sum") between the pixels in each macroblock of the current picture and the different macroblocks of the other pictures. Each difference absolute value sum indicates the degree of matching between each macroblock of the current picture and the macroblocks of the other pictures. The motion predictor feeds each motion vector and its corresponding difference absolute value sum to the prediction mode determining circuit 115.

The prediction mode determining circuit 115 uses the data received from the motion predictor 102 to determine the prediction mode that will be used for prediction coding the current picture relative to one or more other reconstructed pictures. The current picture can be prediction coded using any of the following prediction modes:

(1) Intra picture mode, in which the picture is compressed by itself, without reference to any other pictures. A picture coded in this way is called an I-picture.

(2) Forward prediction mode, in which prediction is carried out with reference to a reconstructed picture occurring earlier in the motion picture. A picture coded in this way is called a P-picture.

(3) Bidirectional prediction mode, in which block-by-block prediction is carried out with reference to a reference block derived from a reconstructed picture occurring earlier in the motion picture, a reconstructed picture occurring later in the motion picture, or by performing a pixel-bypixel linear operation (e.g., an average value calculation) between an earlier reconstructed picture and a later reconstructed picture. A picture coded in this way is called a B-picture.

In other words, an I-picture is a picture in which intra picture coding is completed within the picture. A P-picture is predicted from a reconstructed I-picture or P-picture occurring earlier in the motion picture. A B-picture is predicted block-by-block using an earlier or a later reconstructed I-picture or P-picture or using a block obtained by performing a linear operation using a reconstructed I-picture or P-picture occurring earlier in the motion picture and a reconstructed I-picture or P-picture occurring later in the motion picture.

The prediction mode determining circuit 115 delivers the prediction mode and the corresponding motion vector to the predictor 113 and to the readout address generator 114. The readout address generator 114 provides readout addresses to the picture memory group 112 in response to the motion vector, which causes each picture memory 112A through 112D to read out a block of the reconstructed picture stored therein. The location of the read out block in the reconstructed picture is designated by the motion vector. The predictor 113 selects one of the read out blocks from the picture memories 112A to 112D in response to the prediction mode signal PM received from the prediction mode determining circuit 115. The selected read out block provides the matching block S2 for the current picture block S1. When the current picture block is part of a B-picture, the predictor also performs linear operations on the read out blocks from the picture memories 112A though 112D to provide the required matching block. The predictor delivers the matching block S2 to the difference block calculating circuit 103 and the adder 110.

An example of the construction of a compressed motion picture signal expander apparatus based on the MPEG system is shown in FIG. 2. In this, the compressed motion picture signal obtained directly from the compressor or by reproducing it from a recording medium is fed as a bit stream into the input buffer 121, where it is temporarily stored. The compressed digital signal includes blocks of coded transform coefficients (including a block of coded transform coefficients representing the current picture block), and prediction mode information, quantizing step-size information, and a motion vector for each block.

The compressed motion picture signal is read out of the input buffer 121 one picture at a time, and is delivered to the inverse variable-length coder (IVLC) 122. The inverse variable-length coder 122 applies inverse variable length coding to the compressed motion picture signal, and separates the compressed motion picture signal into its components, including blocks of quantized transform coefficients, and prediction mode information, step-size information, and a motion vector for each block.

Each block of coded transform coefficients is fed into the inverse quantizer 123, which uses the step-size information for the block to inversely quantize the block of quantized transform coefficients to provide a block of transform coefficients. The inverse orthogonal transform circuit 124 applies inverse orthogonal transform processing, normally IDCT processing, to the block of transform coefficients to derive a restored difference block. The inverse quantizer 123 and the inverse orthogonal transform circuit 124 respectively apply processing complementary to that applied by the quantizer 105 and orthogonal transform circuit 104 in the compressor shown in FIG. 1.

The readout address generator 130 provides a readout address to the picture memories 128A to 128D in response to the motion vector for the current picture block received from the inverse variable-length coder 122. In response to the readout address, each of the picture memories 128A to 128D reads out a block of the reconstructed picture stored therein. The predictor 129 selects one of the read out blocks from the picture memories 128A to 128D in response to the prediction mode signal PM, also received from the inverse variable-length coder 122. The selected read out block provides the matching block for reconstructing the current picture block. When the current picture block is part of a picture coded as a B-picture, the predictor also performs linear operations on the read out blocks from the picture memories 112A though 112D to provide the matching block. The predictor 129 delivers the matching block to the adder 125.

The adder 125 performs a pixel-by-pixel addition between the restored difference block from the inverse transform circuit 124 and the matching block from the predictor 129 to reconstruct the current picture block of the current picture. The selector 126 feeds the reconstructed current picture block for storage in the one of the picture memories 128A through 128D in which the current picture is being reconstructed. The reconstructed current picture block is stored in the selected picture memory in the position of the current picture block in the reconstructed current picture. When all the reconstructed blocks of the current picture have been stored in the selected picture memory 128A to 128D, the reconstructed current picture is ready for reading out, and also for use as a reference picture for reconstructing other pictures occurring earlier or later in the motion picture.

The reconstructed pictures stored in the picture memories 128A to 128D are read out as the output motion picture signal via the selector 126 in response to readout addresses generated by the display address generator 127. A scan converter (not shown) converts the output motion picture signal read out from the picture memories 128A through 128D to the raster format of the desired video signal format, e.g., NTSC. The resulting output motion picture signal can then be displayed on a suitable display, e.g., a CRT, etc. In this example, the sync. signal generator 131 is locked to an external sync. source, and periodically generates a frame sync. signal for delivery to the display address generator 127. The display address generator 127 the generates readout addresses in synchronism with the frame sync. signal.

The orthogonal transform circuits, for example, the DCT and the IDCT circuits used in the compressor and the expander described above, respectively perform arithmetic operations on pixel values and transform coefficients represented by integers having a finite number of bits. Thus, the orthogonal transform operations performed by the orthogonal transform circuits can result in a truncation of the number of bits. For this reason, a difference in the accuracy of the orthogonal transform operation using real numbers, or a difference in the configuration of the circuit used to perform the orthogonal transform operation, can change the result of the orthogonal transform operation. This can lead to a mismatch between the compressor and the expander, and to mismatches between expanders expanding a common compressed signal.

For example, in the compressor, the difference block derived from the motion picture signal is orthogonally transformed, and predetermined processing is applied to quantize the resulting transform coefficients in the course of generating the compressed motion picture signal. Then, in the expander, or in the local decoder in the compressor, if the real number operational accuracy or the configuration of the inverse orthogonal transform circuit does not correspond to that of the compressor, then it is possible the output of the expander will differ from the input to the compressor. Hence, the output of the expander can depend on the accuracy and the configuration of the apparatus used for the expander.

The operational accuracy or the configuration of an inverse orthogonal transform may vary depending upon the apparatus used to perform the inverse orthogonal transform. For example, inversely transforming a block of transform coefficients using two different constructions of the same type of inverse orthogonal transform circuit may produce different results. Such a difference in the results is called an inverse orthogonal transform mismatch error (a "mismatch error").

The MPEG system defines the operational accuracy with which the DCT and the IDCT are to be performed, but does not define the operational method and the configuration. This is because circuits and methods for performing DCTs and IDCTs were developed before the MPEG standards were established.

In the MPEG system, as described above, the compressor implements, e.g., inter picture motion-compensated prediction coding to the motion picture signal. In this, the motion picture signal is divided into blocks, a difference block is derived from the current picture block and a matching block obtained by applying motion compensation to a reconstructed picture, the difference block is orthogonally transformed using DCT processing, the resulting transform coefficients are quantized, the quantized transform coefficients are subject to variable-length coding, and the coded transform coefficients are assembled together with prediction mode information, quantizing step size information, and motion vectors to provide the compressed motion picture signal.

The expander applies inverse variable-length coding to the coded transform coefficients, inverse quantizing to the quantized transform coefficients resulting from the inverse variable-length coding, and IDCT processing to the transform coefficients resulting from the inverse quantizing. The resulting restored difference block is added to a matching block obtained by applying motion compensation to a reconstructed picture in response to the motion vector. The resulting reconstructed picture block is stored as a block of a reconstructed picture, which provides a picture of the motion picture output signal, and also is available for use as a reference picture.

The compressor includes a local decoder that derives, from the quantized transform coefficients, reconstructed pictures for use in carrying out the prediction coding. The local decoder includes an inverse quantizer and an inverse orthogonal transform circuit.

If the configuration of IDCT circuit in the local decoder in the compressor is different from that of the IDCT circuit in the expander, there are instances in which the reconstructed pictures produced by the local decoder in the compressor are different from the reconstructed pictures produced by the expander. The dependency of the IDCT processing on implementation can cause problems when the compressed motion picture signal generated by a compressor conforming with the MPEG standard is recorded on a recording medium, such as an optical disc, etc., for distribution to the public. When the compressed motion picture signal reproduced from the optical disc is expanded by expanders manufactured and sold by different makers, the reproduced picture may be different from the original picture. Moreover, the differences may depend upon the actual expander used. Similar incompatibilities between different expanders may also occur when the compressed motion picture signal is distributed by a distribution system such as terrestrial or satellite broadcasting, telephone system, ISDN system, cable, wireless, or optical distribution system, etc.

Mismatch errors are particularly problematical when inter picture prediction coding is carried out. Inter picture prediction coding can be interfield coding or inter-frame coding. Inter picture prediction coding can cause mismatch errors to accumulate to the extent that they result in fatal flaws in the reconstructed pictures.

In the motion picture signal compression performed by the MPEG system, each video sequence is divided into Groups of Pictures (GOPs) of, for example, eight or twelve pictures. Each picture is classified as an I-picture, a P-picture, and a B-picture, as described above.

A B-picture is not used as a reference picture in performing motion prediction. Hence, a mismatch error occurring in a B-picture does not lead to errors in other pictures.

When a mismatch error occurs in a P-picture, the picture with the mismatch error is stored in the picture memory for use in carrying out prediction coding. Accordingly, when inter picture prediction coding is carried out, the error in the P-picture stored in the picture memory gradually spreads to the P-pictures and B-pictures derived from it by prediction coding. The error accumulates until the picture is replaced by an I picture or a P-picture lacking such an error.

Similarly, when a mismatch error occurs in an I-picture, the reconstructed picture with the mismatch error is stored in the picture memory for use in carrying out prediction coding. Accordingly, when inter-picture prediction coding is carried out, the error in the I-picture stored in the picture memory spreads to the P-pictures and B-pictures derived from it by prediction coding. The error accumulates until the picture is replaced by a new I-picture lacking such an error.

Error accumulation is illustrated in FIG. 3. In FIG. 3, if the mismatch error in decoding an I-picture is EI, and the mismatch error in decoding the P-picture P1 is EP1, the value of the error in the reconstructed P-picture P1 is EI+EP1. Further, when the mismatch error in decoding the P-picture P2 is EP2, the value of the error in the reconstructed P-picture P2 is EI+EP1+EP2. Even if the individual mismatch errors are small, the gradual accumulation of these errors will result in a large error.

Mismatch errors produced by the IDCT processing used in the MPEG decoders in both the compressor and the expander can be classified into two distinct types:

Type (1): Errors resulting from insufficient operational accuracy.

Type (2): Errors resulting from systematic differences in rounding.

The MPEG standard sets forth a requirement for operational accuracy. However, this requirement is not so stringent that it can guarantee that a mismatch error will not occur. Therefore, a Type (1) mismatch error can occur between IDCT devices whose operational accuracy satisfies the MPEG requirement.

The outputs of the IDCT processing are integers. Hence, after the IDCT processing has been performed using real numbers, the processing results must be rounded. In general, the processing results are rounded to the nearest integer. However, a problem occurs when the processing result is *0.5, where * is any integer. The MPEG standard does not define how a processing result of *0.5 should be rounded. Some IDCT devices round *0.5 up, and other IDCT devices round *0.5 down. Further, there are instances in which rounding up or rounding down depends on the sign of the processing result. Mismatch errors resulting from the systematic rounding errors just described are Type (2) mismatch errors.

Type (1) mismatch errors differ from Type (2) mismatch errors in that Type (1) errors normally occur randomly, whereas Type (2) errors are systematic. Because Type (1) errors normally are random, positive errors and negative errors occur with roughly equal probability. Hence, when prediction coding is carried out over a long time, it can be assumed that Type (1) mismatch errors will usually cancel out.

On the other hand, since Type (2) mismatch errors are systematic, and are inherent in the IDCT processing itself, such errors consistently have the same polarity. Accordingly, when prediction coding is carried out over a long time, the mismatch error will be cumulative in one direction. Although each Type (2) mismatch error is only +1 or −1, if many mismatch errors accumulate in one direction, the cumulative mismatch error will be large. In U.S. patent application Ser. No. 08/202,783, the application of which this application is a continuation-in-part, the disclosure of which is incorporated herein by reference, the inventor describes methods and apparatus for preventing Type (2) errors.

Even though Type (1) mismatch errors may occur quite frequently, they normally cancel out over time, and so are usually unproblematical. However, in some instances, the two (or more) blocks of DCT coefficients derived from a picture block located in the same position in two (or more) consecutively-processed P-pictures, or in one (or more) consecutively-processed P-picture following an I-picture, can be identical. If a Type (1) mismatch error occurs when each identical block of DCT coefficients is inversely orthogonally transformed, the resulting Type (1) mismatch errors are not random, but are cumulative in the second picture (and in subsequent pictures). The accumulated Type (1) mismatch errors make the reconstructed picture generated by the decoders in both the compressor and the expander different from the original picture in the motion picture signal. This degrades the picture quality that can be provided by the MPEG system.

OBJECTS AND SUMMARY OF THE INVENTION

In view of the state of the art described above, it is an object of the invention to provide a step size control circuit and a step size control method for determining the step size used by quantizer use in a motion picture signal apparatus in such a manner that repetitive Type (1) mismatch errors are prevented when the quantized coefficient blocks are inversely quantized and inversely orthogonally transformed.

Accordingly, the invention provides a method of quantizing coefficient blocks of DCT coefficients representing a motion picture signal in a manner that prevents repetitive mismatch errors. The coefficient blocks include a current coefficient block derived from a current picture block having a position in a current picture, and a previous coefficient block derived from a previous picture block located in a previous picture at the position of the current picture block in the current picture. The current picture is a P-picture, the previous picture is either the P-picture or the I-picture processed immediately preceding the current picture. In the method, the previous coefficient block is quantized using a first step size. A second step size for quantizing the current coefficient block is determined. The second step size is set to be different from the first step size. Finally, the current coefficient block is quantized using the second step size set in the setting step.

The coefficient blocks may additionally include a prior-previous coefficient block derived from a prior-previous picture block located in a prior-previous picture at the position of the current picture block in the current picture. The prior-previous picture is either an I-picture or a P-picture processed immediately before the previous picture. The prior-previous coefficient block is quantized using a prior-previous step size. Quantizing the previous coefficient block using a previous step size results in a previous quantized coefficient block, and includes testing when the previous quantized coefficient block is an all-zero quantized coefficient block. Then, the current step size is set to be different from the priorprevious step size when the previous quantized coefficient block is an all-zero quantized coefficient block, instead of being set to be different from the previous step size.

Setting the current step size to be different from the previous step size may include representing the parity of the previous step size using a parity bit, inverting the parity bit to provide an inverted parity bit, and replacing the least-significant bit of the current step size with the inverted parity bit.

The invention also provides an apparatus for quantizing coefficient blocks of DCT coefficients representing a motion picture signal to prevent repetitive mismatch errors. The coefficient blocks include a current coefficient block derived from a current picture block having a position in a current picture, and a previous coefficient block derived from a previous picture block located in a previous picture at the position of the current picture block in the current picture. The current picture is a P-picture; the previous picture is either a P-picture or an I-picture processed immediately preceding the current picture. The apparatus includes a step size controller that determines a step size for quantizing each coefficient block. The step size controller determines a previous step size for the previous coefficient block and a current step size for the current coefficient block. The step size controller includes a step size setting circuit that sets the current step size to be different from the previous step size. Finally, the apparatus includes a quantizer. The quantizer receives each coefficient block, and receives from the step size controller the step size for each coefficient block.

Finally, the invention provides an apparatus for compressing a motion picture signal. The motion picture signal includes successive pictures comprising picture blocks. The pictures include a previous picture and a current picture. The current picture includes a current picture block having a position in the current picture, the previous picture includes a previous picture block located in the previous picture at the position of the current picture block in the current picture. The apparatus includes a motion compensator that performs motion compensation on the previous picture to derive a block of differences between the current picture block and the previous picture. An orthogonal transform circuit orthogonally transforms the block of differences to provide a current coefficient block. A step size controller determines a current step size for quantizing the current coefficient block, and receives information indicating a previous step size used to quantize a previous coefficient block derived from the previous picture block. The step size control means includes a step size setting circuit that sets the current step size to be different from the previous step size. Finally, the apparatus includes a quantizer that receives the current coefficient block and the previous coefficient block, and receives from the step size controller the step size for each coefficient block.

DETAILED DESCRIPTION OF THE INVENTION

Preferred embodiments of the apparatus and method for quantizing DCT coefficients representing a motion picture signal will now be described with reference to the drawings.

The invention is applied to a hybrid coding system in which motion compensated prediction coding and discrete cosine transform (DCT) processing are combined. This hybrid coding system is described in the standard ISO/IEC 11172, popularly known as the MPEG (Motion Picture Experts Group), and is based on H. 261 of the Consultative Committee for International Telegraph and Telephone (CCITT). The CCITT is an international committee for promulgating standards for, inter alia, compressing motion picture signals, and for compressing motion picture signals for storage on a recording medium. The basic configuration of the MPEG hybrid coding system is well known. The draft of ISO/IEC standard 11172 includes a useful glossary of the terms used herein.

Motion-compensated prediction coding is a method for reducing the redundancy of a motion picture signal by exploiting the correlation of the motion picture signal in the time domain. Motion-compensating prediction of the current picture (i.e., the picture currently being coded) is performed using another, already decoded, picture of the motion picture as a reference picture. The resulting motion-compensated prediction error signal representing the motion-compensated prediction errors is included in the compressed signal, together with a motion vector and a prediction mode, etc. This significantly reduces the amount of information in the compressed motion picture signal required to represent the current picture.

The inter picture motion-compensated prediction coding may be carried out between frames of the motion picture signal. Alternatively, if the motion picture signal is an interlaced signal, the motion-compensated prediction coding may be carried out between fields. In addition, inter picture motion-compensated prediction coding may be adaptively switched between inter-frame coding and inter-field coding depending upon the properties of the motion picture signal.

The motion-compensated prediction error signal is compressed using a signal compressor that exploits the spatial correlation of each picture constituting the motion picture. The difference signal compressor typically includes an orthogonal transform circuit, such as a DCT circuit, and a quantizer. The DCT is a form of orthogonal transform that concentrates the signal power in specific frequency components as a result of the two-dimensional spatial correlation within the picture. This way, only the concentrated and distributed coefficients are included in the compressed signal, either directly, or after additional compression. This further reduces the amount of information in the compressed motion picture signal required to represent the current picture.

Figure 1:
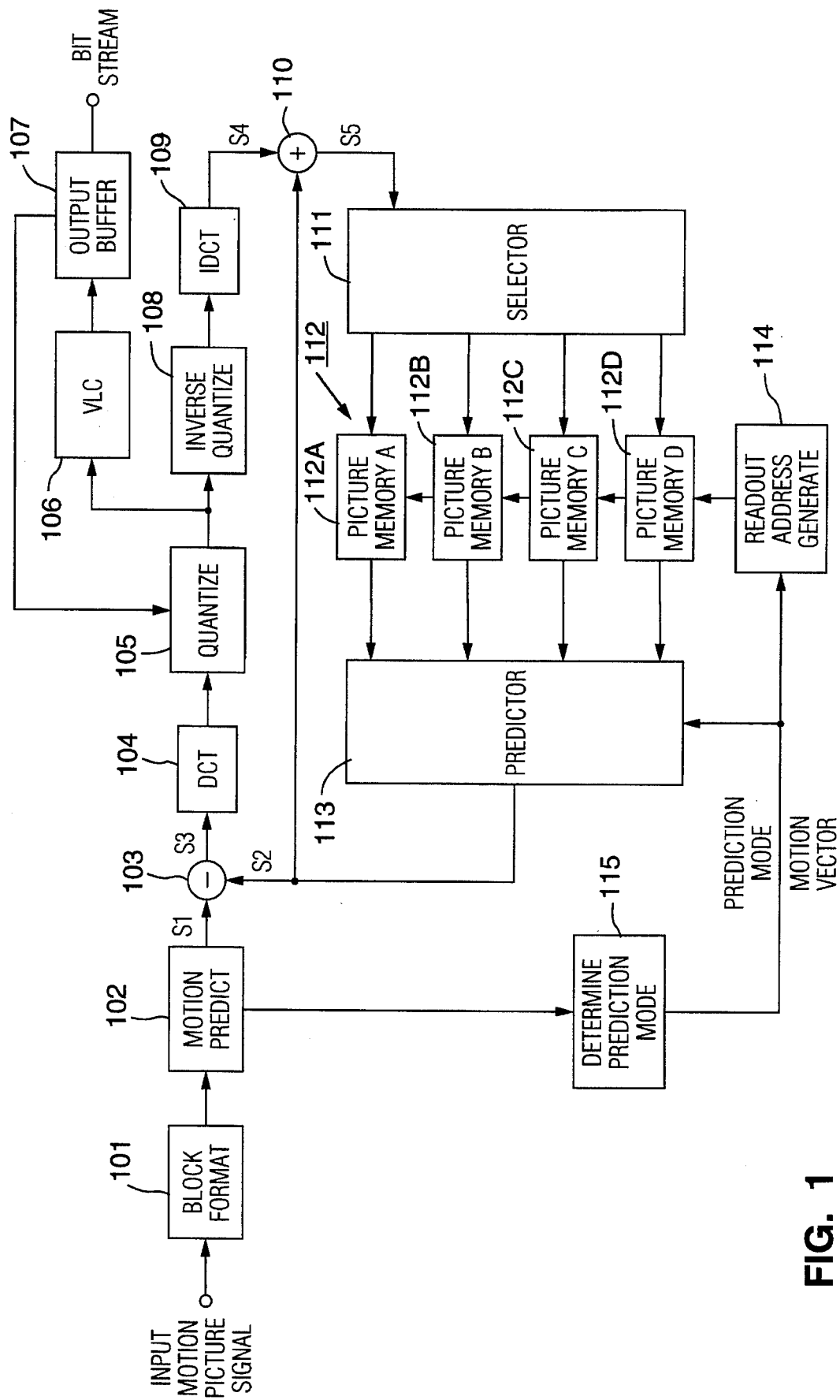
FIG. 1 is a block diagram showing the configuration of a conventional motion picture signal compressor apparatus according to the MPEG system.
Figure 2:
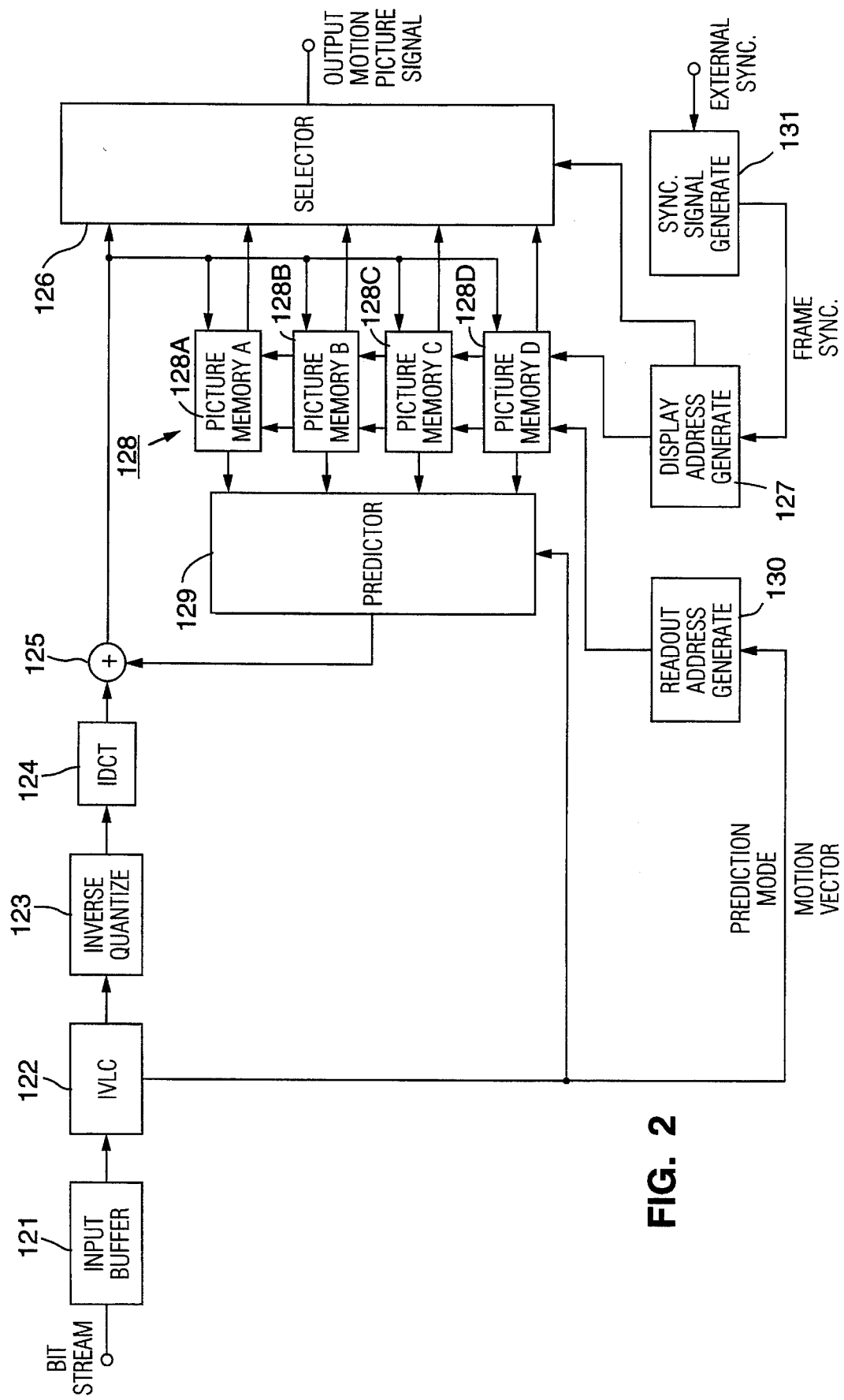
FIG. 2 is a block diagram showing the configuration of a conventional compressed motion picture signal expander apparatus according to the MPEG system.
Figure 3:
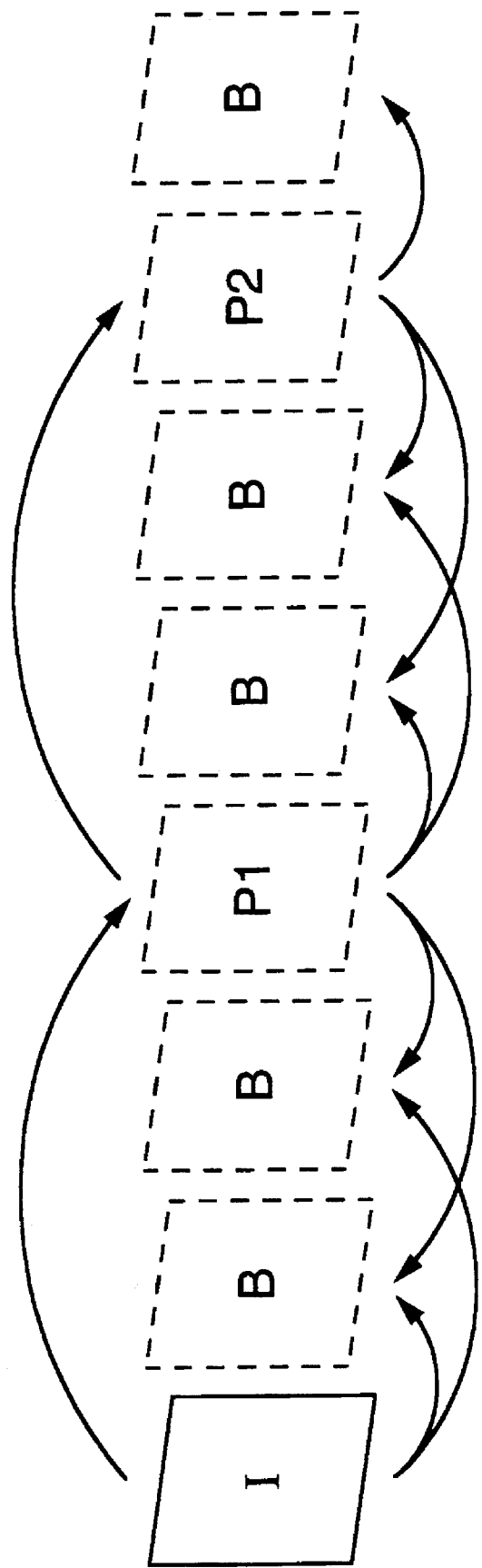
FIG. 3 illustrates the sequence in which a motion picture signal is compressed in the MPEG system.
Figure 4:
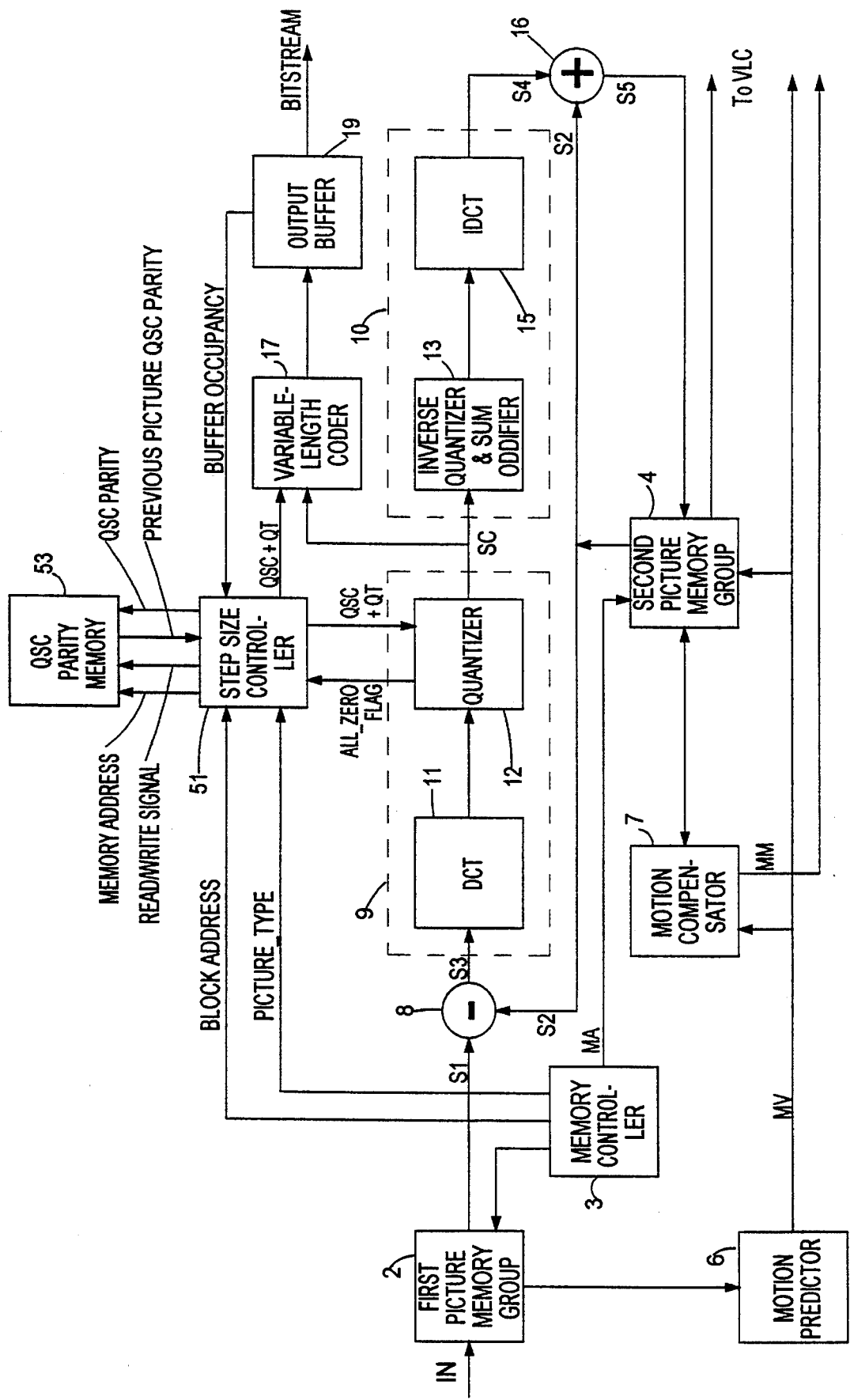
FIG. 4 is a block diagram showing the configuration of an MPEG motion picture signal compressor apparatus incorporating a first embodiment of the quantizing step size controller according to the invention.

The practical configuration of the motion picture signal compressor apparatus to which a first embodiment of the invention is applied is shown in FIG. 4. In the apparatus shown in FIG. 4, the motion picture signal is divided into pictures, and is compressed picture-by-picture. Each picture is divided into picture blocks, and the picture is compressed block-by-block. The picture block being compressed will be called the current picture block. The current picture block is a block of a picture called the current picture. The I-picture or P-picture processed immediately before the current picture is called the previous picture; the first P-picture processed after the current picture is called the following picture. The picture block located in the previous picture at the position of the current picture in the current block is called the previous picture block. The picture block located in the following picture at the position of the current picture in the current block is called the following picture block. The blocks of DCT coefficients respectively derived from the previous picture block, the current picture block, and the following picture block are called the previous coefficient block, the current coefficient block, and the following coefficient block.

The motion picture signal, normally a video signal, is delivered to the first picture memory group 2, where plural pictures of the motion picture signal are temporarily stored. The memory controller 3 controls the reading of pictures from the first picture memory group 2 and the second picture memory group 4.

The motion predictor 6 carries out motion prediction by performing block matching between the current picture block and plural blocks of the previous and following pictures stored in the first picture memory group 2. The block matching is performed using macroblocks of, e.g., 16×16 pixels. The motion prediction reference picture indication signal generated by the memory controller 3 selects the blocks of the previous and following pictures stored in the first picture memory group 2 to be block matched with the current picture block. The motion predictor 6 then delivers to the motion compensator 7, as the motion vector MV, the position of a block in one of the previous or following pictures stored in the first picture memory group for which the differences between the block and the current picture block, i.e., the motion prediction error, are minimum.

In response to the motion vector MV, the motion compensator 7 causes a block of each of the reconstructed pictures stored in the second picture memory group 4 to be read out as a potential matching block. The position in the reconstructed pictures from which the potential matching blocks are read is specified by the motion vector MV. The motion compensation reference picture indication signal MA from the memory controller 3 then selects one of the potential matching blocks read out from the second picture memory group 4 as the matching block S2 for the current picture block. The reconstructed pictures stored in the second picture memory group 4 are pictures that have been reconstructed by the local decoder 10 and the adder 16 locally decoding the quantized DCT coefficients generated by the difference block encoder 9, which will be described below.

The reconstructed picture from which the motion compensation reference picture indication signal MA selects the matching block depends on the prediction mode of the current picture. In the forward prediction mode (P-picture), the matching block is selected from a previous reconstructed picture. In the bidirectional prediction mode (B-picture), the matching block is selected from a previous reconstructed picture or a future reconstructed picture, or the matching block can be generated by performing a linear operation (e.g., average value calculation) on blocks of a previous reconstructed picture and a following reconstructed picture. Finally, when the current picture is coded in the intra picture coding mode without prediction (I-picture), a zero block, in which all the pixel values are set to zero, is used as the matching block. The matching blocks read out from the second picture memory group 4 are adaptively modified so that an optimally-matching matching block is selected for each block of the motion picture signal.

The motion compensator 7 selects the prediction mode for each picture by first calculating the sum of the absolute values of the pixel-by-pixel differences between the current picture block and potential matching blocks generated in the different prediction modes. Then, the motion compensator selects the prediction mode for which this sum is a minimum. The motion compensator feeds the motion compensation mode signal MM, which indicates the selected prediction mode, to the variable-length coder 17, which will be described below. The motion compensator 7 also causes the second picture memory group 4 to feed the matching block S2 for the selected prediction mode to the difference block calculating circuit 8.

The difference block calculating circuit 8 also receives the current picture block S1 of the motion picture signal, read out from the first picture memory group 2, and calculates the pixel-by-pixel difference between the current picture block S1 and the matching block S2. The difference block calculating circuit feeds the resulting difference block S3 to the difference block encoder 9. The difference block encoder 9 compresses the difference block S3 to form the block of quantized transform coefficients SC.

Each block of quantized DCT coefficients SC is fed from the difference block encoder 9 to the variable-length coder 17. Also fed to the variable-length coder are the motion vector MV, motion compensation mode signal MM, the modified quantizing step size SS, for each block of quantized DCT coefficients. The variable-length coder 17 applies variable-length coding, such as Huffmann coding, to the data it receives. The variable-length coder also assembles the variable-length coded data with the start codes and header information of the respective layers of the MPEG standard to form the pictures of the compressed motion picture signal. The compressed motion picture signal is fed into the output buffer 19 picture-by picture; and is read out of the output buffer as a bit stream.

The compressed motion picture signal may be recorded on a suitable recording medium, such as an optical disc, of may be distributed by a distribution system, such as terrestrial or satellite broadcasting, telephone system, ISDN system, cable, wireless, or optical distribution system, etc.

Each block of quantized DCT coefficients SC is also fed from the difference block encoder 9 into the local decoder 10, where it is expanded to provide the restored difference block S4. The local decoder 10 in the motion picture signal compressor apparatus has a configuration similar to the compressed motion picture signal expander apparatus, to be described below, but differs in detail.

The restored difference block S4 is fed to the adder 16, which also receives the matching block S2 for the current picture block S1 from one of the picture memories in the second picture memory group 4. The adder 16 performs pixel-by-pixel addition between the restored difference block S4 from the local decoder 10 and the matching block S2 from the second picture memory group 4 to provide the reconstructed picture block S5. The reconstructed picture block is delivered to one of the picture memories in the second picture memory group 4, where it is stored.

The reconstructed picture block is stored in the selected picture memory in the second picture memory group 4, where it forms one block (corresponding to the current picture block) of the reconstructed picture being reconstructed, block-by-block, from reconstructed picture blocks provided by the local decoder 10 and the adder 16. When complete, the reconstructed picture will be used for deriving matching blocks for performing prediction coding to compress other pictures of the motion picture signal.

The difference block encoder 9 and the local decoder 10 will now be described in more detail.

The difference block encoder 9 comprises the DCT circuit 11 and the quantizer 12, as shown in FIG. 4. The DCT circuit 11 uses DCT processing to orthogonally transform the difference block S3 from the difference block generating circuit 8. The difference block may alternatively be orthogonally transformed using other types of orthogonal transform. Each 16×16 macroblock is orthogonally transformed as six 8×8 blocks (four luminance blocks and four chrominance blocks). The DCT circuit 11 feeds the resulting block of 384 (8×8×6) DCT coefficients to the quantizer 12. The quantizer 12 quantizes the block of DCT coefficients to provide the block of quantized DCT coefficients SC.

The step size controller 51 controls the quantizing step size used by the quantizer 12 to quantize each block of 384 DCT coefficients. The step size controller sets the step size in response to buffer occupancy information provided by the output buffer 19, a previous picture parity provided by the parity memory 53, and a block_address and the picture_type code provided by the memory controller 3.

The parity memory 53 receives a step size parity and a memory address for each picture block from the step size controller 51, stores the step size parity, and later feeds the step size parity back to the step size controller 51 as a previous picture parity for use in controlling the quantizing step size use for quantizing the next P-picture.

The local decoder 10 comprises the inverse quantizer and sum oddifier 13 and the IDCT circuit 15, as shown in FIG. 4. The inverse quantizer and sum oddifier 13 inversely quantizes the block of quantized DCT coefficients SC from the quantizer 12 using the step size set by the step size controller 51. The inverse quantizer and sum oddifier 13 then performs a parity inversion operation on the resulting block of dequantized DCT coefficients if the sum of the dequantized DCT coefficients in the block is not an odd number. This prevents a Type (2) mismatch error from occurring when the resulting block of sum-oddified DCT coefficients is inversely orthogonally transformed by the IDCT circuit 15. The IDCT circuit 15 performs inverse orthogonal transform processing on the sum-oddified block of DCT coefficients from the quantizer and sum oddifier 13 to provide a restored difference block S4. The IDCT circuit applies inverse orthogonal transform processing complementary to the orthogonal transform processing applied by the DCT circuit 11, and therefore preferably applies inverse discrete cosine transform (IDCT) processing.

The quantizing performed by the quantizer 12 in response to quantizing step size information provided by the step size controller 51 will now be described. The quantizer 12 quantizes the block of 6×8×8 DCT coefficients derived from each macroblock of each picture (i.e., each picture block) of the motion picture signal. Each macroblock of a picture compressed in the intra picture coding mode (an I-picture) is called an intra macroblock. Each macroblock compressed in an inter picture coding mode is called a non-intra macroblock. When an intra macroblock is orthogonally transformed, the DCT coefficient of the (0, 0) component is the DC coefficient.

The DC coefficient is quantized by dividing, with rounding, the DC coefficient by 8 when quantizing with 8-bit accuracy, by 4 when quantizing with 9-bit accuracy, by 2 when quantizing with 10-bit accuracy, and by 1 when quantizing with 11-bit accuracy. The DC component of an intra macroblock is quantized according to equation (1). Equation (1) and the following equations are written in the syntax of the C programming language. This syntax is described in, for example, Herbert Schildt, USING TURBO C, Osborne McGraw-Hill (1988), especially at pages 83–87.

$$QDC=dc//8 \text{ (8 bits)}$$

$$QDC=dc//4 \text{ (9 bits)}$$

$$QDC=dc//2 \text{ (10 bits)}$$

$$QDC=dc//1 \text{ (11 bits)} \quad (1)$$

where dc is the DC coefficient and QDC is the quantized DC coefficient

The DCT coefficients, other than the DC coefficient, resulting from orthogonally transforming an intra macroblock (the "AC components"), are quantized by determining the quantizing factors $ac^-(i, j)$ by weighting the DCT coefficients $ac(i, j)$ by the weighting matrix Wi according to the equation (2).

$$ac^-(i, j)=(16*ac(i, j))//Wi(i, j) \quad (2)$$

The coefficients of the weighting matrix Wi are defined in equation (3).

$$Wi = \begin{matrix} 8 & 16 & 19 & 22 & 26 & 27 & 29 & 34 \\ 16 & 16 & 22 & 24 & 27 & 29 & 34 & 37 \\ 19 & 22 & 26 & 27 & 29 & 34 & 34 & 38 \\ 22 & 22 & 26 & 27 & 29 & 34 & 37 & 40 \\ 22 & 26 & 27 & 29 & 32 & 35 & 40 & 48 \\ 26 & 27 & 29 & 32 & 35 & 40 & 48 & 58 \\ 26 & 27 & 29 & 34 & 38 & 46 & 56 & 69 \\ 27 & 29 & 35 & 38 & 46 & 56 & 69 & 83 \end{matrix} \quad (3)$$

Then, using the equation (4), the quantizing factors $ac^-(i, j)$ are quantized to determine the quantizing levels QAC(i, j) of the respective AC coefficients.

$$QAC(i, j) = \frac{ac^-(i, j) + \text{sign}(ac^-(i, j)) * ((p*mquant)//q)}{(2*mquant)} \quad (4)$$

In equation (4), p and q are arbitrary fixed integers, for example, p=3 and q=4, and mquant is the quantizing step size.

The DCT coefficients resulting from orthogonally transforming an inter picture coding macroblock (a "non-intra macroblock") are quantized by determining the quantizing factors $ac^-(i, j)$ by weighting all the DCT coefficients obtained by transforming the non-intra macroblock by the weighting matrix Wn according to equation (5).

$$ac^-(i, j)=(16*ac(i, j))//Wn(i, j) \quad (5)$$

The coefficients of the weighting matrix Wn are defined in equation (6).

$$Wn = \begin{matrix} 16 & 17 & 18 & 19 & 20 & 21 & 22 & 23 \\ 17 & 18 & 19 & 20 & 21 & 22 & 23 & 24 \\ 18 & 19 & 20 & 21 & 22 & 23 & 24 & 25 \\ 19 & 20 & 21 & 22 & 23 & 24 & 26 & 27 \\ 20 & 21 & 22 & 23 & 25 & 26 & 27 & 28 \\ 21 & 22 & 23 & 24 & 26 & 27 & 28 & 30 \\ 22 & 23 & 24 & 26 & 27 & 28 & 30 & 31 \\ 23 & 24 & 25 & 27 & 28 & 30 & 31 & 33 \end{matrix} \quad (6)$$

Then, using equation (7), the quantizing factors $ac^-(i, j)$ are quantized to determine the quantizing levels QAC(i,j) of the AC coefficients.

$$QAC(i,j) = ac^-(i,j) / (2*mquant) \quad (7)$$
$$\text{if } (mquant == odd)$$
$$ac^-(i,j) + 1 / (2*mquant)$$
$$\text{if } (mquant == even \text{ AND } ac^-(i,j) < 0)$$
$$ac^-(i,j) - 1 / (2*mquant)$$
$$\text{if } (mquant == even \text{ AND } ac^-(i,j) > 0)$$

The resulting quantizing levels QAC(i,j) are fed to the variable-length coder 17 and to the local decoder 10 as the above-described block of quantized DCT coefficients SC.

It can be seen from the above equations that, if blocks of DCT coefficients derived from picture blocks located in the same position in consecutively-processed pictures are identical, and the quantizer 12 quantizes them with the same step size mquant, the resulting blocks of quantized DCT coefficients will also be identical.

The way in which the inverse quantizer 13 in the motion picture signal compressor, and the inverse quantizer in the compressed motion picture signal expander, which will be described below, apply inverse quantizing the block of quantized DCT coefficients from the quantizer 12 will now be described. The inverse quantizer 13 receives the block of quantized DCT coefficients SC from the difference block encoder 9, and inversely quantizes the block of quantized DCT coefficients to provide a block of dequantized DCT coefficients. In practice, the inverse quantizer 13 inversely quantizes the quantized DC coefficients resulting from orthogonally transforming an intra macroblock using the processing defined in equation (8) to provide respective DC coefficients.

$$rec(0, 0) = 8*QDC \text{ (8 bits)}$$
$$rec(0, 0) = 4*QDC \text{ (9 bits)}$$
$$rec(0, 0) = 2*QDC \text{ (10 bits)}$$
$$rec(0, 0) = 1*QDC \text{ (11 bits)} \quad (8)$$

The inverse quantizer 13 inversely quantizes the quantized AC coefficients resulting from orthogonally transforming an intra macroblock using the processing defined in equation (9).

$$rec(i, j) = (mquant*2*QAC(i, j)*Wi(i, j))/16 \quad (9)$$

if(QAC(i, j)==0)
rec(i, j)=0

Finally, the inverse quantizer 13 inversely quantizes all the quantized coefficients resulting from orthogonally transforming a non-intra macroblock using the processing defined in equation (10).

if $QAC(i, j) > 0$
  $rec(i, j) = ((2*QAC(i, j) + 1)*mquant*Wn(i, j))/16$
if $QAC(i, j) < 0$
  $rec(i, j) = ((2*QAC(i, j) - 1)*mquant*Wn(i, j))/16$
if $QAC(i, j) == 0$
  $rec(i, j) = 0$ It can be seen from the equations (8)–(10) that, if the blocks of quantized DCT coefficients derived from picture blocks located in the same position in consecutively-processed pictures are identical, and the dequantizer 13 dequantizes them using the same quantizing step size mquant, the resulting blocks of dequantized DCT coefficients will also be identical. Then, if a Type (1) mismatch error occurs when one of the identical blocks of dequantized DCT coefficients is inversely orthogonally transformed, the same Type (1) mismatch error will occur when the next of the identical blocks of dequantized DCT coefficients is inversely orthogonally transformed, and a cumulative Type (1) mismatch error will result.

The preferred embodiment of the step size controller 51 shown in FIG. 4 will now be described in detail with reference to FIGS. 4–7. In the motion picture signal compressor shown in FIG. 4, the step size controller 51 controls the quantizing step size used to quantize each block of DCT coefficients derived from each P-picture in a manner that prevents identical blocks of quantized DCT coefficients from being derived from picture blocks located in the same position in two consecutively-processed P-pictures, or from picture blocks located in the same position in an I-picture and the following P-picture.

It can be seen by examining equations (2) and (3) that, if different quantizing step sizes mquant are used for quantizing identical blocks of DCT coefficients derived from picture blocks located in the same position in two consecutively-processed pictures, there is a high probability that the resulting blocks of quantized DCT coefficients will be different, even though the blocks of DCT coefficients subject to quantizing are identical.

By examining equations (9) and (10), it can also be seen that there is a high probability that, when the blocks of quantized DCT coefficients derived from two identical blocks of DCT coefficients using different quantizing step sizes are dequantized by the dequantizer 13 (and also by the dequantizer in the expander, to be described below), the resulting blocks of dequantized DCT coefficients will also be different from one another.

Consequently, even if a Type (1) mismatch error occurs when the block of dequantized DCT coefficients derived from the first of the two identical blocks of DCT coefficients is inversely orthogonally transformed, it is very unlikely that the same Type (1) mismatch error will occur when the second of the two blocks of dequantized DCT coefficients is inversely orthogonally transformed. Changing the step size with which the DCT coefficients derived from picture blocks in the same position in consecutively-processed pictures are quantized in the difference block encoder 9 therefore prevents a repetitive Type (1) mismatch error from occurring when the dequantized DCT coefficients derived from these picture blocks are inversely orthogonally transformed in the local decoder 10 and in the expander.

Changing the quantizing step size as described above is less effective if the changed step size is a multiple of the normal step size, because the chances of the two blocks of dequantized DCT coefficients being identical is increased, despite the use of a different quantizing step size. Hence, it is preferred to avoid changing the step-size by a factor that is a multiple of the normal step size, if possible.

In the MPEG system, not all step sizes are allowed, and the allowed step sizes are represented by two parameters: quantizer_scale_code and qscale_type, as shown in Table 1.

TABLE 1

| quantizer_scale_code | qscale_type = 0 | qscale_type = 1 |
| --- | --- | --- |
| 0 | forbid'n | forbid'n |
| 1 | 2 | 1 |
| 2 | 4 | 2 |
| 3 | 6 | 3 |
| 4 | 8 | 4 |
| 5 | 10 | 5 |
| 6 | 12 | 6 |
| 7 | 14 | 7 |
| 8 | 16 | 8 |
| 9 | 18 | 10 |
| 10 | 20 | 12 |
| 11 | 22 | 14 |
| 12 | 24 | 16 |
| 13 | 26 | 18 |
| 14 | 28 | 20 |
| 15 | 30 | 22 |
| 16 | 32 | 24 |
| 17 | 34 | 28 |
| 18 | 36 | 32 |
| 19 | 38 | 36 |
| 20 | 40 | 40 |
| 21 | 42 | 44 |
| 22 | 44 | 48 |
| 23 | 46 | 52 |
| 24 | 48 | 56 |
| 25 | 50 | 64 |
| 26 | 52 | 72 |
| 27 | 54 | 80 |
| 28 | 56 | 88 |
| 29 | 58 | 96 |
| 30 | 60 | 104 |
| 31 | 62 | 112 |

Consequently, so that changing the step size will be effective, and will result in a step size allowed by MPEG, the step size controller 51 preferably changes the step size by changing the quantizing_scale_code, which will be called QSC, for brevity. The simplest way of changing the QSC by the smallest amount that will result in a different step size is to change the parity of the QSC. However, changing the parity of a QSC of 1 results in a QSC of zero, which is not an allowed QSC value. Therefore, the simple process of inverting the parity of the QSC must be modified to prevent a QSC of zero from being produced. The modification will be described in detail below. Meanwhile, for simplicity, this modified changing of the parity of the QSC will be referred to as inverting the parity of the QSC. Alternatively, the QSC can be changed using a look-up table, or can be changed by adding one to the QSC, and preventing an overflow when one is added to a QSC of 31. These methods will be described in detail below.

The possibility arises that identical blocks of quantized DCT coefficients will be produced when inverting the parity of the QSC representing the step size used to quantize two identical blocks of DCT coefficients changes the step size to one that is an integral multiple of the other. For example, inverting the parity of the QSC changes the step size by a factor of two when the QSC is changed from 2 to 1 or vice versa. However, when the change in the QSC from 2 to 1 results in a change in the step size of from 2 to 1 (i.e., when the QT in its zero state), identical blocks of quantized DCT coefficients will only be produced if all the DCT coefficients in the DCT coefficient block are even. This is a comparatively rare occurrence. Moreover, when the change in the QSC from 2 to 1 results in a change in the step size of from 4 to 2 (i.e., when the QT in its one state), identical blocks of quantized DCT coefficients will only be produced if all the DCT coefficients in the DCT coefficient block are a multiple of four. This is also a comparatively rare occurrence.

As mentioned above, the step size controller 51 inverts the parity of the QSC representing the step size used to quantize only those blocks of DCT coefficients derived from a P-picture. This is because preventing repetitive mismatch errors from occurring in P-pictures effectively eliminates noticeable repetitive mismatch errors. I-pictures are not coded predictively, so, although a Type (1) mismatch error can occur in an I-picture, a repetitive Type (1) error cannot. B-pictures are not used as reference pictures for prediction, so, although a repetitive Type (1) mismatch error can occur between an I-picture or a P-picture and a B-picture, the repetitive mismatch error occurs only in that one B-picture, and is therefore rarely noticeable. On the other hand, P-pictures are derived by prediction from I-pictures and from other P-pictures, and are used as a reference pictures for other P-pictures and for B-pictures. A repetitive Type (1) mismatch error can occur between a P-picture and the I-picture from which it is predicted, and between the P-picture and P-pictures predicted from it. A repetitive mismatch error occurring in the P-picture manifests itself in all the P- and B-pictures predicted from that P-picture, and can therefore be noticeable.

The step size controller 51 temporarily suspends inverting the parity of the QSC representing the step size when quantizing a block of DCT coefficients results in a block of quantized DCT coefficients in which all 6×8×8 quantized DCT coefficients in the block are zero. A block of quantized DCT coefficients in which all 384 quantized DCT coefficients have a value of zero will be called an all-zero quantized coefficient block. An all-zero quantized coefficient block is represented by a special code, and will not generate a mismatch error when it is inversely quantized and inversely orthogonally transformed because an all-zero restored difference block is generated in response to the all-zero block code. The reconstructed picture block derived from the all-zero quantized coefficient block is the same as the matching block from the reference picture. Consequently, since a mismatch error cannot occur, there is no need to invert the parity of the QSC representing the step size used to quantize the block of DCT coefficients derived from the following picture block when quantizing the current picture block results in an all-zero quantized coefficient block. Moreover, as will be explained below, a mismatch error may arise if the parity of the QSC representing the step size used to quantize the following coefficient block is inverted when quantizing the current coefficient block is an all-zero quantized coefficient block. Consequently, the step size controller 51 does not invert the parity of the QSC representing the step size used to quantize the following coefficient block when quantizing the current coefficient block results in an all-zero quantized coefficient block.

The reason for not inverting the parity of the QSC representing the step size used to quantize the coefficient block in the picture following a coefficient block that, when quantized, resulted in an all-zero quantized coefficient block is as follows. When the current picture block is very similar to the previous picture block, the values of the DCT coefficients derived from the current picture block are all small. When the current coefficient block is quantized using a step size of 1 (the smallest step size), at least one of the DCT coefficients in the resulting quantized coefficient block is not zero. If a mismatch error occurs when the dequantized coefficient block derived from the current picture block is inversely transformed, the mismatch error will be present in the resulting reconstructed picture block.

The first following picture block is the picture block located in the first P-picture following current picture at the position of the current picture block in the current picture. When the first following picture block is very similar to the current picture block, the coefficient block derived from the first following picture block is the same as that derived from the current picture block. When the coefficient block derived from the first following picture block is quantized using a step size of 2 (a step size of 2 results when the parity of the QSC representing step size of 1 is inverted, because a step size of zero is not allowed), an all-zero quantized coefficient block will result.

When the all-zero quantized coefficient block is inversely quantized and inversely orthogonally transformed, a mismatch error cannot occur. Therefore, if a mismatch error occurs when the dequantized coefficient block derived from the current picture block is inversely transformed, the mismatch error will also be present in the reconstructed picture block obtained when the dequantized coefficient block derived from the first following picture block is inversely transformed (because the mismatch error is present in the reference picture), but the mismatch error does not accumulate in the reconstructed picture.

The second following picture block is the picture block located in the second P-picture following the current picture at the position of the current picture block in the current picture. When the second following picture block is very similar to the first following picture block, the coefficient block derived from the second following picture block will be the same as that derived from the first following picture block.

If the parity of the QSC representing the step size with which the coefficient block derived from the second following picture block is quantized were allowed to be inverted, the coefficient block derived from the second following picture block would be quantized using a step size of 1 (a step size of 1 results when the parity of a step size of 2 is inverted). The resulting quantized coefficient block would include non-zero quantized DCT coefficients identical to those derived from the current picture block. If a mismatch error occurred when the dequantized coefficient block derived from the current picture block was inversely transformed, this mismatch error will be repeated when the dequantized coefficient block derived from the second following picture block is inversely transformed. The mismatch errors resulting from decoding the coefficient blocks derived from both the current picture block and the second following picture block will be present in the reconstructed picture block obtained when the dequantized coefficient block derived from the second following picture block is inversely transformed. Thus, mismatch errors will accumulate in the second following picture.

To avoid this problem, the parity of the QSC representing the step size with which a coefficient block is quantized is not inverted when the picture block from which the coefficient block is derived follows a picture block from which an all-zero quantized coefficient block, i.e., a block of quantized DCT coefficients in which the quantized DCT coefficients are all zero, was derived. This is done by not storing in the parity memory the parity of the QSC representing the step size with which the all-zero quantized coefficient block was quantized. For example, if this rule is applied, the coefficient block derived from the second following picture block is quantized using a step size of two. This is because the QSC parity is inverted relative to the parity stored in the parity memory, which is the parity of the QSC representing the step size used to quantize the coefficient block derived from the current picture block, and not the first following picture block. An all-zero coefficient block will result. When the all-zero coefficient block is inversely quantized and inversely orthogonally transformed, a mismatch error cannot occur. Therefore, if a mismatch error occurs when the dequantized coefficient block derived from the current picture block is inversely transformed, the same mismatch error will be present in each of the reconstructed picture blocks obtained when the dequantized coefficient blocks derived from current picture block, the first following picture block, and the second following picture block are inversely transformed, but the mismatch error does not accumulate in the first and second following pictures.

In the preferred embodiment shown in FIG. 4, the parity of the QSC representing the step size resulting in an all-zero quantized coefficient block is inhibited from being written into the parity memory 53 to prevent inversion of the QSC parity following an all-zero quantized coefficient block.

In the preferred embodiment of the step size controller 51 shown in FIG. 4, processing is simplified by inverting the parity of the QSC representing the step size with which the coefficient blocks (except coefficient blocks following an all-zero quantized coefficient block) derived from consecutively-processed P-pictures following an I-picture or a P-picture is quantized. The QSC parity is inverted so that the blocks of DCT coefficients derived from picture blocks located in the same position in consecutively-processed P-pictures, or in a P-picture following an I-picture, are quantized with a step size represented by a QSC of the opposite parity. The parity of the QSC representing the step size is inverted between consecutive P-pictures, or between an I-picture and a following P-picture, irrespective of whether the blocks of quantized DCT coefficients derived from the picture blocks in the consecutively-processed pictures are identical. This saves having to test whether the quantized coefficient blocks are identical.

Figure 5:
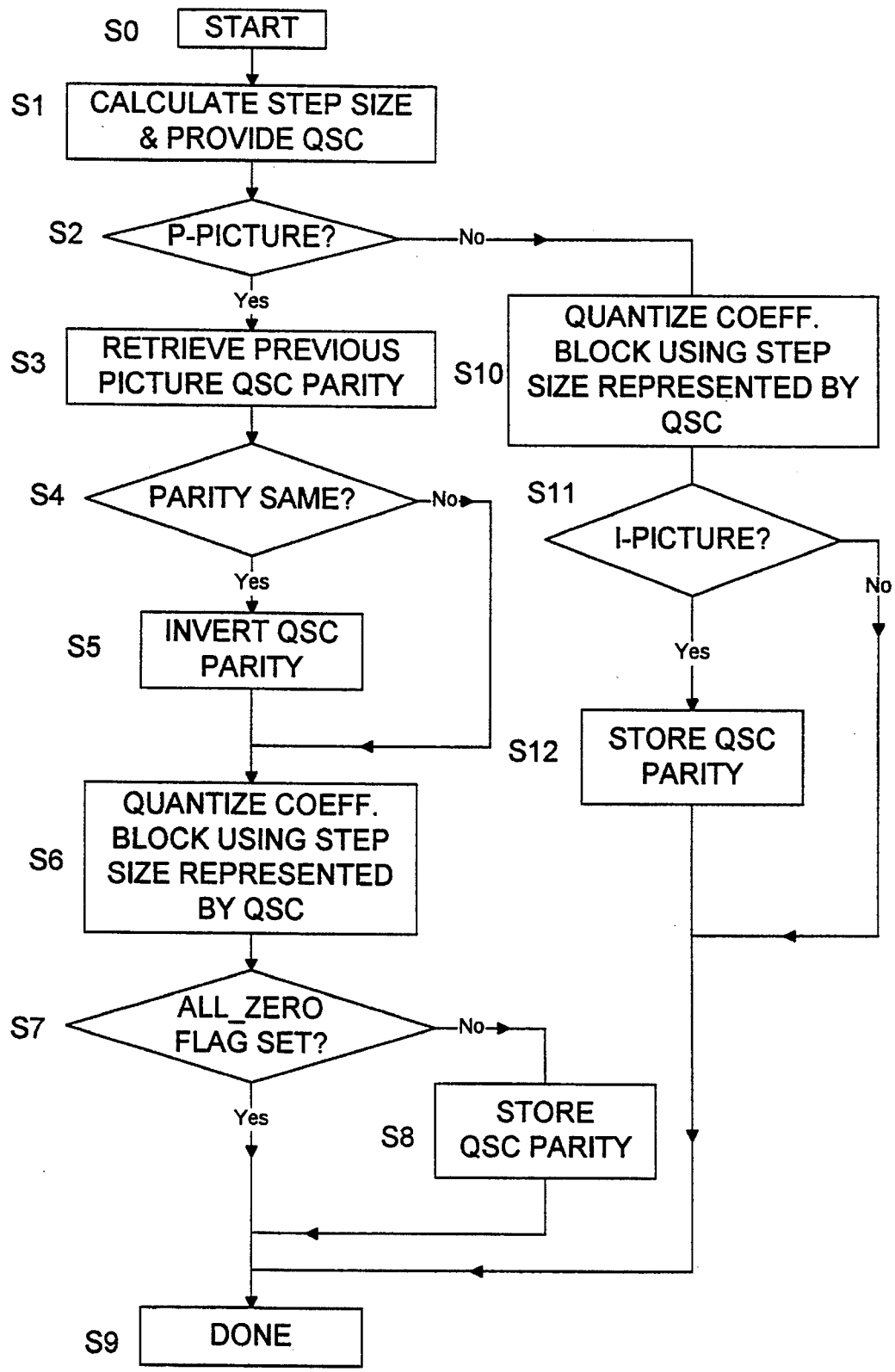
FIG. 5 is a flow chart illustrating the operation of the first embodiment of the step size controller according to the invention.

The step-size controller 51 may be implemented using a digital signal processor or a computer operating according to the flow chart shown in FIG. 5. In the flow chart shown in FIG. 5, at step S1, the step-size controller 51 determines the calculated step size for quantizing the current coefficient block, i.e., the block of DCT coefficients derived from the current picture block of the current picture. The calculated step size is determined in response to, for example, data indicating the occupancy of the output buffer 19. As described above, the step size is calculated to prevent the output buffer from overflowing or underflowing. Increasing the quantizing step size decreases the number of bits entering the output buffer, and therefore prevents an overflow; decreasing the quantizing step size increases the number of bits entering the output buffer, and therefore prevents an underflow. The calculated step size is restricted to a step size value allowed by MPEG, and is represented by the calculated quantizing_scale_code (calculated QSC) and the qscale_type (QT).

At step S2, the step-size controller 51 determines whether the current picture is a P-picture. If the result at step S2 is YES, and the current picture is a P-picture, execution advances to step S3 to begin the processing that, if necessary, will modify the calculated QSC determined in step S1. Otherwise, when the result at step S2 is NO, and the current picture is an I-picture or a B-picture, execution jumps to step S10, bypassing the processing steps that may modify the calculated QSC determined in step S1.

At step S3, the step size controller retrieves from the parity memory 53 stored previous picture QSC parity information indicating the parity of the QSC representing the step size that was used to quantize the coefficient block derived from the previous picture block, i.e., the picture block located in the previously-processed P-picture or I-picture at the position of the current picture block in the current picture.

At step S4, the step size controller 51 determines whether the parity of the calculated QSC determined at step S1 is the same as the retrieved previous picture QSC parity. The parity comparison can be one of several types; for example, the parity of evenness/oddness (2n/2n+1), the parity of 3n/3n+1/3n+2, and so on. In the preferred embodiment, the parity of evenness/oddness (2n/2n+1) is used. If the result is YES, execution passes to step S5, where the step size controller modifies the calculated QSC determined at step S1 to invert its parity. For example, the least-significant bit (LSB) of the QSC may be toggled, as shown in Table 2. If the resulting QSC is zero, the QSC is set to two, which has an opposite parity to a QSC of one, and is an allowed QSC value. Other ways of inverting the parity of the QSC are discussed below. The calculated QSC with its parity inverted is then adopted as the current QSC, i.e., the QSC representing the step size to be used for quantizing the coefficient block, and execution passes to step S6.

TABLE 2

| Previous Picture QSC Parity | LSB of Calculated QSC (QSC > 1) | LSB of QSC |
|---|---|---|
| 0 | 0 | 1 |
| 0 | 1 | 1 |
| 1 | 0 | 0 |
| 1 | 1 | 0 |

If the result at step S4 is NO, and the parity of the QSC calculated at step S1 is different from the previous picture QSC parity, execution passes to step S6, and the calculated QSC determined at step S1 is adopted as the current QSC.

Alternatively, and preferably, step S4 may be omitted, and, at step S5, the previous picture QSC parity may be inverted and substituted for the LSB of the calculated QSC determined in step S1. The calculated QSC with the inverted previous picture QSC parity substituted for its LSB is then adopted as the current QSC. Again, when the resulting current QSC has a value of zero, the current QSC is set to a value of two, which has a parity opposite to that of a QSC of one, and is an allowed QSC value. Execution then passes the step S6.

At step S6, step size controller 51 feeds the current QSC and the QT to the quantizer 12. The quantizer 12 quantizes the current coefficient block using the step size represented by the current QSC and the QT supplied by the step size controller. After quantizing the current coefficient block, the quantizer 12 checks to determine whether all the resulting quantized coefficient block is an all-zero quantized coefficient block, i.e., whether the quantized DCT coefficients in the block of quantized DCT coefficients are all zero. If so, the quantizer sets the all_zero flag.

At step S7, the step size controller 51 tests whether the all_zero flag is set. If the result at step S7 is NO, and the all_zero flag is not set, indicating that at least one of the quantized DCT coefficients in the current quantized coefficient block is not zero, execution passes to step S8. At step S8, the step size controller 51 calculates the parity of the QSC fed to the quantizer 12 in step S6, and stores the result in the parity memory 53 for use as a previous picture QSC parity when the next P-picture is processed. Execution then passes to step S9, the end of the routine.

On the other hand, if the result at step S7 is YES, the all_zero flag is set, indicating that the current quantized coefficient block is an all-zero quantized coefficient block. Since the current picture is a P-picture (result at step S2=YES), the all-zero quantized coefficient block indicates that there are no differences between the current picture block and the previous picture block. Execution jumps to step S9, which is the end of the routine. This prevents the parity of the QSC fed to the quantizer 12 in step S6 from being stored in the parity memory as a previous picture QSC parity. This, in turn, ensures that the following coefficient block, i.e., the block of DCT coefficients derived from the picture block located in the next P-picture at the position of the current block in the current picture, will be quantized with a QSC whose parity is different from the QSC stored in the parity memory.

When the result at step S2 is NO, indicating that the current picture is an I-picture or a B-picture, execution jumps to step S10. At step S10, the step size controller 51 feeds the calculated QSC and the QT determined at step S1 to the quantizer 12. The quantizer 12 quantizes the current coefficient block using the step size represented by the current QSC and the QT received from the step size controller. Execution then passes to step S11, where the step size controller tests to determine whether the current picture is an I-picture.

If the result at step S11 is YES, and the current picture is an I-picture, execution passes to step S12, where the step size controller 51 calculates the parity of the QSC fed to the quantizer 12 in step S10. The step size controller stores the resulting QSC parity in the parity memory 53 as a previous picture QSC parity. When the current picture is an I-picture, every quantized coefficient block of includes at least one non-zero DCT coefficient. Therefore, in contrast to when the current picture is a P-picture, when the current picture is an I-picture, there is no need to determine whether the current quantized coefficient block is an all-zero quantized coefficient block before storing the step size parity in the parity memory 53 as a previous picture parity. The QSC parity for every coefficient block derived from an I-picture is therefore stored in the parity memory as a previous picture QSC parity. Execution then passes to step S9, the end of the routine.

If the result at step S11 is NO, and the current picture is a B-picture, no post-quantizing activity is carried out, and execution jumps to step S9, the end of the routine.

A hardware implementation of the step-size controller 51 will now be described with reference to FIG. 6. The step size controller includes the step size calculator 61 and the step size modifier 63, which provide the quantizing_scale_code (QSC) and the qscale_type (QT) representing the step size for quantizing the current coefficient block for feeding to the quantizer 12; the QSC parity calculator 65 which calculates the parity of the QSC representing the step size used to quantize the current coefficient block; and the read/write signal generator 67 and the address generator 69, which control reading and writing the previous picture QSC parity into and out of the QSC parity memory 53.

When the orthogonal transform circuit 11 has orthogonally transformed the current picture block (in the case of an I-picture) or the difference block derived from the current picture block (in the case of a P-picture or a B-picture), and the resulting block of DCT coefficients has been fed into the quantizer 12, the step size calculator 61 receives buffer occupancy information from the output buffer 19 and, in response to the buffer occupancy information, derives a calculated step size for quantizing the current coefficient block, i.e., the block of DCT coefficients derived from the current picture block. The calculated step size derived by the step size calculator is restricted to a step size value allowed by MPEG, and is represented by the calculated quantizing_scale_code (calculated QSC) and the qscale_type (QT). The step size calculator feeds the calculated QSC and the QT to the step size modifier 63. The step size modifier passes the QT to the quantizer 12 without modification.

Additionally, at the start of each picture, the step size controller 51 receives from the memory controller 3 the picture_type code, which indicates whether the current picture is an I-picture, a P-picture, or a B-picture. The picture_type code is fed into the read/write signal generator 67, and the step size modifier 65.

At the start of quantizing each coefficient block, the memory controller 3 provides the block_address indicating the location in the picture of the picture block from which the coefficient block is derived. Thus, in this example, the memory controller 3 provides the block_address of the current picture block. The block_address is fed from the memory controller to the address generator 69, which converts the block_address of the current picture block into a memory address, which is the address in the QSC parity memory 53 where there is stored the previous picture QSC parity for the previous picture block, i.e., the picture block located in the previously-processed I-picture or P-picture at the position of the current picture block in the current picture. The address generator feeds the memory address to the QSC parity memory 53.

Only when the picture_type code provided by the memory controller 3 is the picture_type code for a P-picture is the step-size modifier 63 enabled. When the picture_type code provided by the memory controller 3 is the picture_type code for an I-picture or a B-picture, the step-size modifier 63 is not enabled, and simply passes unmodified the calculated QSC determined by the step size calculator 61 as the current QSC, i.e., the QSC representing the step size for quantizing the current coefficient block. Thus, the coefficient blocks derived from such pictures are quantized using as the quantizing step size the step size represented by the calculated QSC determined by the step size calculator 61, unmodified by the step size modifier 63.

When the picture_type code provided by the memory controller 3 is the picture_type code for a P-picture, the read/write generator 67 is enabled in its read mode, and, depending on the state of the all_zero flag, may also be enabled in its write mode. When the picture_type code provided by the memory controller 3 is the picture_type code for an I-picture, the read/write generator 67 is enabled in its write mode.

In response to the picture_type code indicating that the current picture is a P-picture, the read/write signal generator 67 feeds the read/write signal in its read_enable mode to the QSC parity memory 53. In response to the read_enable signal, and the memory address generated by the address generator 69, the QSC parity memory 53 feeds back to the step size modifier 63 the previous picture QSC parity for the previous picture block, i.e., the picture block located in the previously-processed I-picture or P-picture at the position of the current picture block in the current picture.

When the picture_type code indicates that the current picture is a P-picture, the step size modifier may modify the calculated QSC determined by the step size calculator 61 to provide the current QSC. For example, the step size modifier may compare the previous picture QSC parity received from the QSC parity memory 53 with the parity of the calculated QSC determined by the step size calculator 61. Then, if the parity of the calculated QSC is the same as the previous picture QSC parity, the step size modifier may invert the parity of the calculated QSC determined by the step size calculator to provide the current QSC. To invert the parity of the QSC, the step size modifier may toggle the least significant bit (LSB) of the calculated QSC, as shown in Table 2 set forth above. However, when the resulting QSC has a value of zero, the step size modifier sets the value of the QSC to two to invert its parity. This avoids the forbidden QSC value of zero. Alternative ways of inverting the parity of the QSC will be described below.

Alternatively and preferably, the step size modifier 63 may invert the previous picture QSC parity received from the QSC parity memory 53, and, when the picture_type code indicates that the current picture is a P-picture, replace the least-significant bit of the calculated QSC determined by the step size calculator 61 by the inverted previous picture QSC parity to provide the current QSC. By replacing the least-significant bit of the calculated QSC determined by the step size calculator with the inverted previous picture QSC parity, the parity of the current QSC will always be the inverse of the parity of the previous QSC, i.e., the QSC representing the step size used to quantize the coefficient block derived from the previous picture block. However, again, when substituting the inverted previous picture QSC parity for the LSB of the calculated QSC results in a QSC of zero, the parity of the calculated QSC is inverted by setting its value to two to provide a inverted-parity QSC with an allowed value.

The step size modifier 63 feeds the current QSC and the QT, i.e., the QSC and the QT representing the step size for quantizing the current block, to the quantizer 12, which quantizes the current coefficient block using the step size represented by the current QSC and the QT. After quantizing the current coefficient block, the quantizer 12 checks to determine whether the resulting quantized coefficient block is an all-zero quantized coefficient block, i.e., whether the quantized DCT coefficients in the quantized coefficient block are all zero. If so, the quantizer sets the all_zero flag.

The step size modifier 63 also feeds the step size to the variable-length coder 17 for inclusion in the compressed motion picture signal.

Finally, the step size modifier 63 feeds the current QSC to the QSC parity calculator 65. The QSC parity calculator calculates the parity of the current QSC fed to the quantizer 12 by the step size modifier, and feeds the resulting QSC parity to the QSC parity memory 53. The QSC parity memory also receives from the address generator 69 the memory address corresponding to the address of the current picture block. However, the step size parity is only written into the QSC parity memory at the address indicated by the memory address from the address generator when the QSC parity memory receives the read/write signal in its write_enable mode from the read/write signal generator 67.

The read/write generator 67 monitors the picture_type code and the all_zero flag to determine whether to feed the write_enable signal to the QSC parity memory 53. A picture_type code indicating that the current picture is a B-picture inhibits the read/write generator from feeding the read/write signal in its write_enable mode to the QSC parity memory 53. Hence, no QSC parity relating to a B-picture is stored in the QSC parity memory 53. When the picture_type code indicates that the current picture is an I-picture, the read/write signal generator 67 feeds the write_enable signal to the QSC parity memory for every picture block of the picture. When the picture_type code indicates that the current picture is a P-picture, the read/write signal generator 67 feeds the write_enable signal to the QSC parity memory for those picture blocks of the picture from which a quantized coefficient block including at least one non-zero quantized DCT coefficient is derived.

The read/write signal in its write_enable mode causes the QSC parity memory 53 to store the QSC parity received from the QSC parity calculator 65 at the memory address indicated by the address received from the address generator 69. The step size parities stored in the QSC parity memory will be used as previous picture parities when the next P-picture is processed.

When the picture_type code indicates that the current picture is a P-picture, the read/write signal generator 67 determines the state of the all_zero flag. When the all_zero flag is not set, indicating that the current quantized coefficient block includes at least one non-zero quantized DCT coefficient, the read/write generator 67 feeds the read/write signal in its write_enable mode to the QSC parity memory 53.

When the all_zero flag is set, indicating that the current quantized coefficient block is an all-zero quantized coefficient block, this inhibits the read/write signal generator 67 from feeding the read/write signal in its write_enable mode to the QSC parity memory 53. Thus, when the all_zero flag is set, the parity of the current QSC representing the step size with which the current coefficient block was quantized is not written into the QSC parity memory 53 to overwrite the QSC parity of the previous picture block already stored therein. This prevents the parity of the QSC fed to the quantizer 12 from being stored in the QSC parity memory as a previous picture QSC parity. This, in turn, ensures that the block of DCT coefficients derived from the following picture block will be quantized with the parity of the QSC unmodified.

Figure 7A:
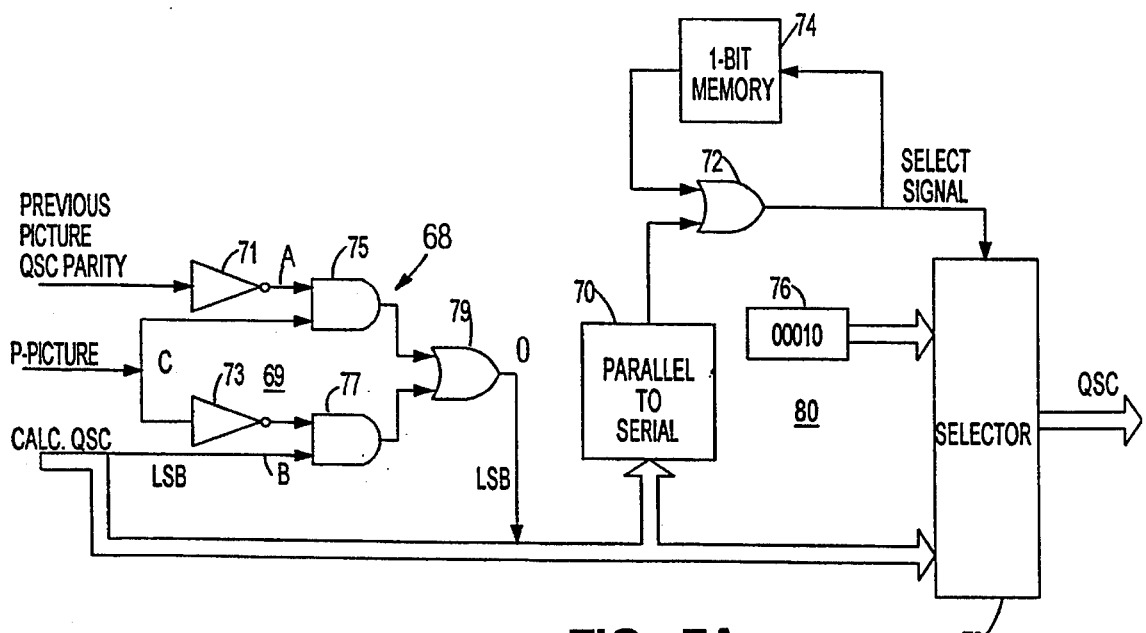
FIG. 7A is a block diagram showing a first embodiment of the step size modifier in the first embodiment of the step size controller according to the invention.

A block diagram of a first embodiment the step size modifier 63 is shown in FIG. 7A. The step size modifier includes two main units, the parity inverter 68, which includes the inverters 71 and 73, the AND-gates 75 and 77, the OR-gate 79; and the zero prevention circuit 80, which includes the serial-to-parallel converter 70, the OR-gate 72, the one-bit memory 74, the register 76, and the selector 78.

In the parity inverter 68, the outputs of the AND-gates 75 and 77 are connected to the inputs of the OR gate 79. One of the inputs of the AND gate 75 is directly connected to the control input C, and one of the inputs of the AND gate 77 is connected to the control input C via the inverter 73. This arrangement of the AND-gates 75 and 77, the inverter 73 and the OR gate 79 form the selector 69 that connects the input A to the output O when the control input is in its 1 state, and connects the input B to the output O when the control input C is in its 0 state.

In the parity inverter 68 in the step-size modifier 63, the previous picture QSC parity is fed from the QSC parity memory 53 via the inverter 71 to the input A of the selector 69. The least-significant bit (LSB) of the calculated QSC determined by the step size calculator 61, is fed to the input B of the selector 69. The picture_type code, which includes the code element P-picture that is in a logical 1 state when the current picture is a P-picture, is fed from the memory control 3 (FIG. 4) to the control input C of the selector 69.

When the current picture is an I-picture or a B-picture, the code element P-picture is in its 0 state. This closes the AND-gate 75 and opens the AND-gate 77, and allows the LSB of the calculated QSC determined by the step size calculator 61 to pass unchanged to the output O as the LSB of the QSC. The LSB of the calculated QSC passes to the output O via the AND-gate 77 and the OR gate 79.

When the current picture is a P-picture, the code element P-PICTURE is in its 1 state. This opens the AND-gate 75 and closes the AND-gate 77, which passes the previous picture QSC parity, inverted by the inverter 71, to the output as the LSB of the QSC. The inverted previous picture QSC parity passes to the output O via the AND-gate 75 and the OR gate 79. This way, when the current picture is a P-picture, the previous picture QSC parity, inverted by the inverter, is substituted for the LSB of the calculated QSC determined by the step size calculator 61. This ensures that the parity of the QSC representing the step size used to quantize the current coefficient block is the inverse of the parity of the QSC representing the step size used to quantize the previous coefficient block. The logical operation of the parity inverter 68 for QSC values greater than one is illustrated in Table 3.

TABLE 3

| Previous picture QSC parity | LSB of Calculated QSC | P-picture | LSB of QSC |
|---|---|---|---|
| 0 | 0 | 1 | 1 |
| 0 | 1 | 1 | 1 |
| 1 | 0 | 1 | 0 |
| 1 | 1 | 1 | 0 |
| 0 | 0 | 0 | 0 |
| 0 | 1 | 0 | 1 |
| 1 | 0 | 0 | 0 |
| 1 | 1 | 0 | 1 |

The parity inverter 68 just described can provide a QSC value of zero, which is not an allowed value for the QSC. The QSC from the parity inverter is therefore further processed by the zero prevention circuit 80, which sets the value of the QSC to two when the parity inverter generates a QSC value of zero. In the zero prevention circuit, the parallel-to-serial converter 70 converts the five-bit QSC value to a serial bit stream, which is fed into one input of the OR-gate 72. The output of the OR gate 72 is fed back to the other input of the OR-gate 72 via the one-bit memory 74. The output of the OR-gate 72 is fed as the select signal to the 5-bit selector 78. One input of the 5-bit selector receives the QSC from the parity inverter, the other input of the 5-bit selector receives the value 00010 from the register 76. The output of the 5-bit selector provides the current QSC.

When the QSC from the parity inverter is greater than zero, and, therefore, includes at least one one, the select signal remains in its logical 1 state, which causes the selector 78 to select the output of the parity inverter. However, when the parity inverter produces a QSC of zero, the select signal remains in its logical 0 state, and the selector 78 selects the output of the register 78. Thus, when the parity inverter produces a QSC of zero, the selector 78 substitutes the binary value of two for the zero output of the parity inverter.

Figure 6:
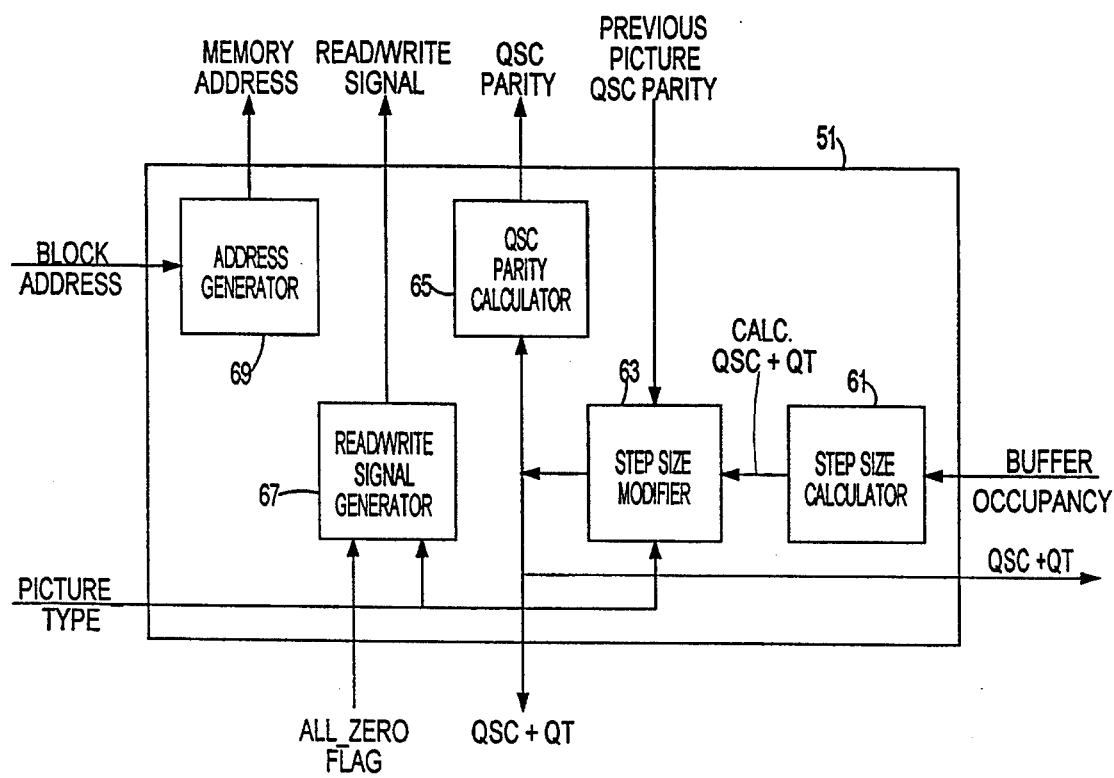
FIG. 6 is a block diagram showing a hardware implementation of the first embodiment of the step size controller according to the invention.
Figure 7B:
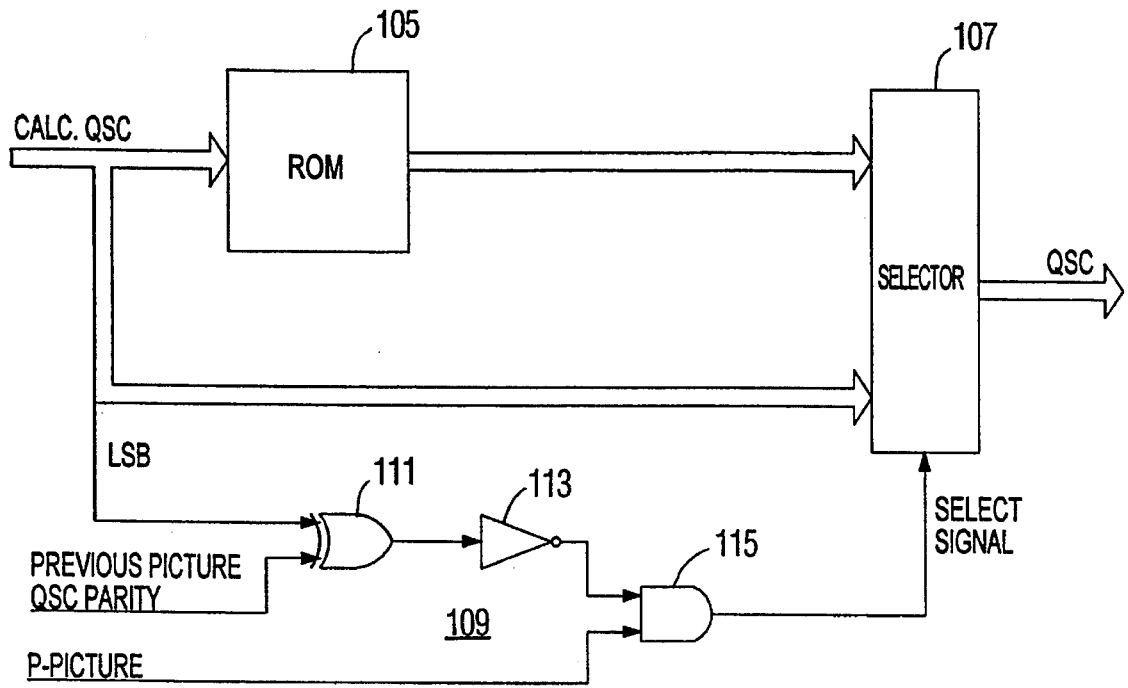
FIG. 7B is a block diagram showing a second embodiment of the step size modifier in the first embodiment of the step size controller according to the invention.

An alternative embodiment of the step size modifier 63 is shown in FIG. 7B. In this, the parity of the calculated QSC is inverted using a look-up table. The values stored in the look-up table are all allowed QSC values. The step-size modifier includes the look-up table 105 and the selector 107. The selector 107 is controlled by the control circuit 109 made up of the exclusive-OR (XOR) gate 111, the inverter 113, and the AND gate 115. The look-up table 105 includes a parity-inverted QSC for each of the 31 possible values of QSC. Most of the parity inverted QSCs are obtained by inverting the least-significant bit of the QSC, as described above. However, the parity inverted QSC for a QSC of one has a value of two, not zero. The calculated QSC from the QSC calculator 61 (FIG. 6) is fed into the address input of the look-up table. In response to the calculated QSC, the look-up table feeds the corresponding parity-inverted QSC to the selector 107. The selector also receives the QSC from the step size calculator. The output of the selector 107 provides the current QSC, i.e., the QSC representing the step size for quantizing the current coefficient block.

The selector 107 is controlled by the control circuit 109. The selector normally selects the calculated QSC as the current QSC, but selects the parity-inverted QSC as the current QSC when the current picture is a P-picture and the parity of the calculated QSC is the same as the previous picture QSC parity.

In the control circuit 109, one input of the XOR-gate 111 receives the least-significant bit (LSB) of the calculated QSC from the step size calculator 61. The other input of the XOR-gate receives the previous picture QSC parity from the QSC parity memory 63. The output of the XOR-gate 111 is inverted by the inverter 113 and fed to one input of the AND-gate 115, the other input of which receives the code element P-PICTURE. The output of the AND-gate 115 feeds the select signal to the selector 109. When the select signal is in its logical 1 state, the selector 109 selects the parity-inverted QSC from the look-up table, and when the select signal is in its logical 0 state, the selector 109 selects the calculated QSC.

The code element P-picture is fed into the AND-gate 115. When the current picture is an I-picture or a B-picture, the code element P-PICTURE is in its 0 state. This holds the output of the AND-gate in its 0 state, and the selector 109 selects the calculated QSC as the current QSC.

When the current picture is a P-picture, the code element is in its 1 state, which opens the AND-gate 115, and the select signal depends on the output of the XOR gate 111, inverted by the inverter 113. When the least-significant bit of the calculated QSC is equal to the previous picture QSC parity, this indicates that the parity of the calculated QSC is the same as that of the previous picture QSC parity. The output of the XOR gate is a logical 0, the output of the inverter 113 is a logical 1, and the select signal is also a logical 1. Consequently, the selector 109 selects the parity-inverted QSC from the look-up table as the current QSC. On the other hand, when the least-significant bit of the calculated QSC is different from the previous picture QSC parity, this indicates that the parity of the calculated QSC is different from that of the previous picture QSC parity. The output of the XOR gate is a logical 1, the output of the inverter 113 is a logical 0, and the select signal is also a logical 0. Consequently, the selector 109 selects the calculated QSC as the current QSC.

Figure 7C:
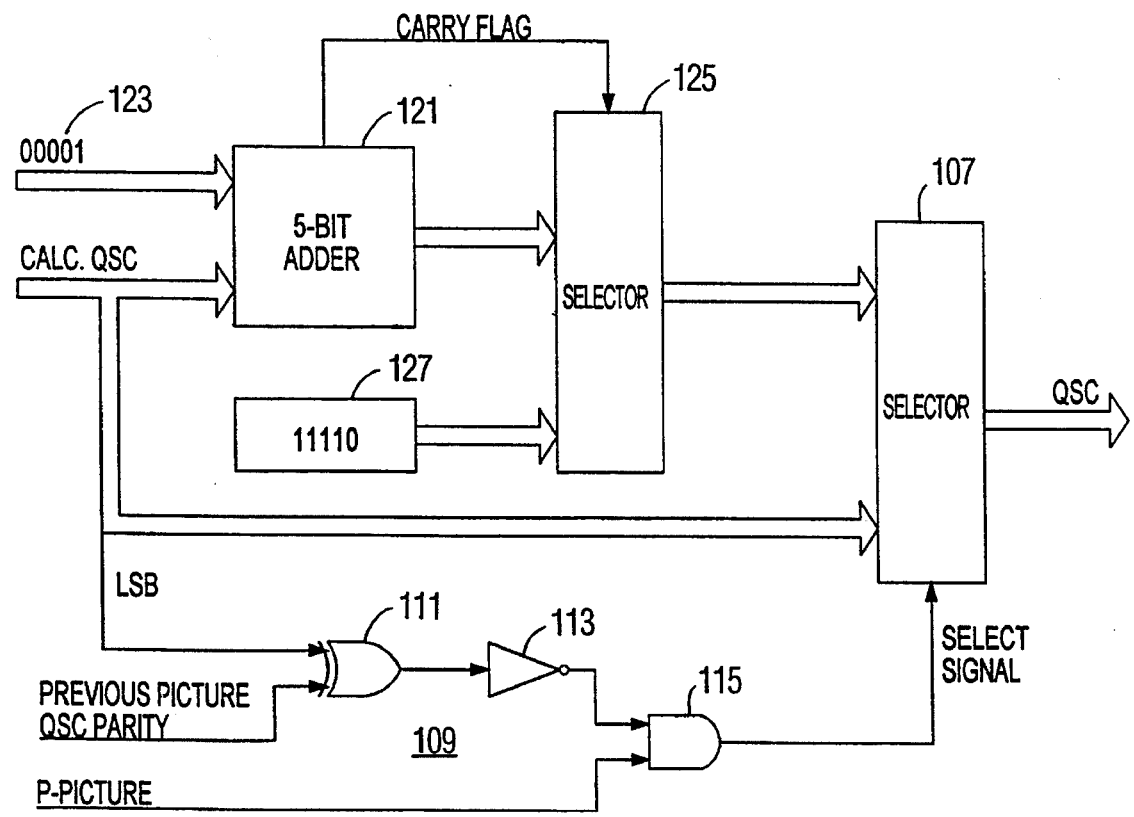
FIG. 7C is a block diagram showing a third embodiment of the step size modifier in the first embodiment of the step size controller according to the invention.

A third embodiment of the step size modifier 63 is shown in FIG. 7C. In this, the parity of the calculated QSC is inverted by adding one to the calculated QSC, and by setting the QSC to 30 when an overflow occurs, indicating an attempted QSC of 32. The step size modifier includes the 5-bit adder 121, the register 123, the selectors 107 and 125, and the control circuit 109 made up of the exclusive-OR (XOR) gate 111, the inverter 113, and the AND gate 115. The operation of the selector 107 and the control circuit 109 is the same as that just described and will not be described again here.

The selector 107 receives the calculated QSC from the step size calculator 61. The calculated QSC is also fed into the 5-bit adder 121, which also receives 00001 from the register 123. The resulting sum is fed to one input of the selector 125, the other input of which receives binary 11110 from the register 127. The selector 125 is controlled by the carry flag generated by the 5-bit adder 121. The carry flag is normally in a logical 0 state, and the selector 125 selects the output from the 5-bit adder 121.

The step size modifying circuit shown in FIG. 7C inverts the parity of the calculated QSC by the 5-bit adder adding one to the calculated QSC. The resulting parity-inverted QSC is selected by the selector 125, and fed to the selector 107. When the QSC has a value of 31, the 5-bit adder generates an output of 00000, and sets the carry flag to 1. The carry flag causes the selector 125 to select the output of the register 127, which is the binary representation of 30. This value has the opposite parity to 31, and is an allowed QSC value. Thus, when the QSC has a value of 31, a value of 30 is fed to the selector 107.

The selector 107 is controlled by the control circuit 109, as described above. The selector 107 normally selects the calculated QSC, but selects the parity-inverted QSC from the selector 125 when the current picture is a P-picture and the parity of the calculated QSC is the same as the previous picture QSC parity.

In a further variation, the parity of the calculated QSC may be inverted by subtracting one from (or adding the two's complement of −1 to) the calculated QSC. The result is then passed to a zero prevention circuit similar to the zero prevention circuit 80 described above with reference to FIG. 7A. When subtracting one from the calculated QSC produces a resulting parity-inverted QSC of zero, the zero prevention circuit sets the parity-inverted QSC to two, in the manner described above with reference to FIG. 7A.

Figure 8:
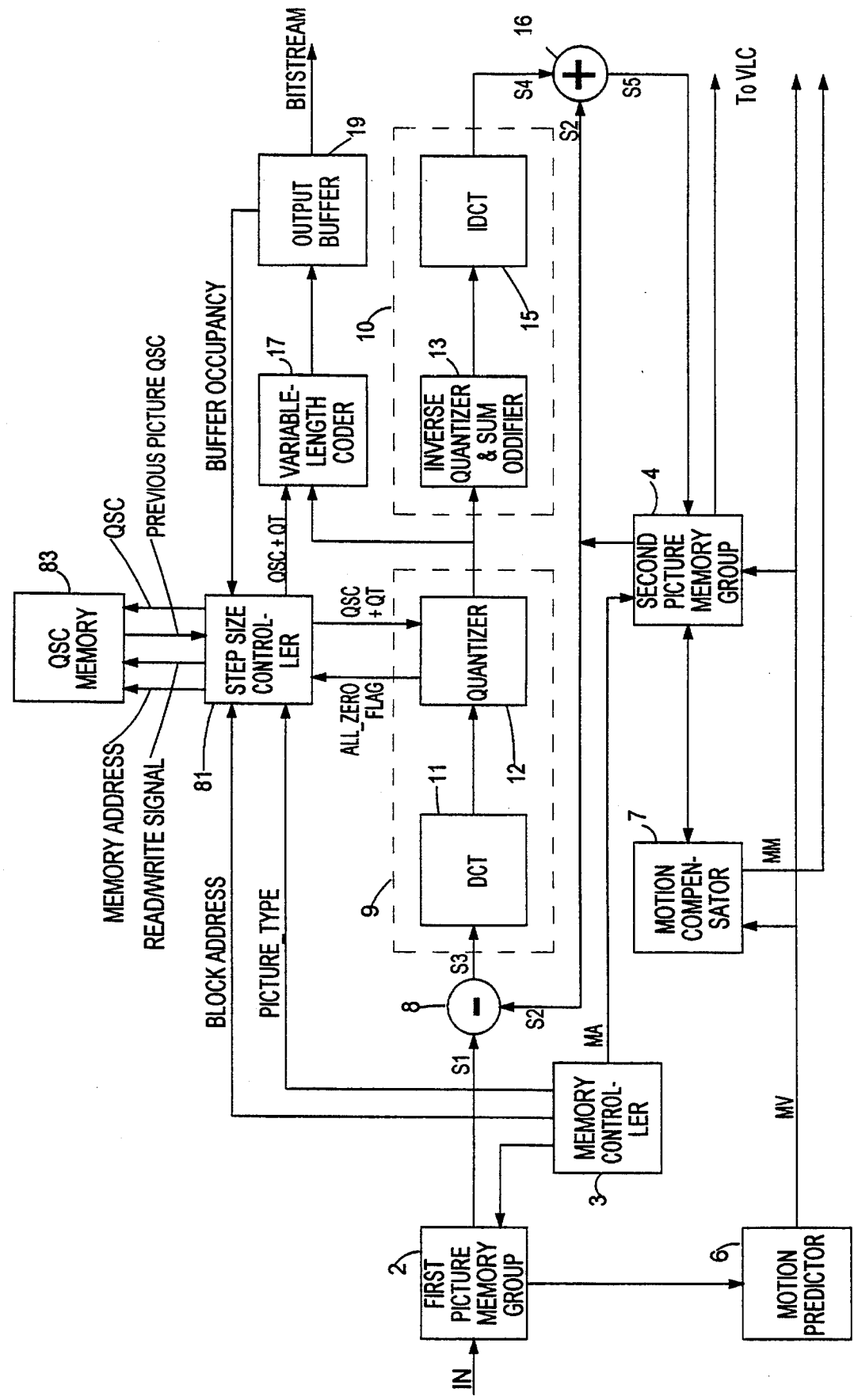
FIG. 8 is a block diagram showing the configuration of an MPEG motion picture signal compressor apparatus incorporating a second embodiment of the quantizing step size controller according to the invention.

An alternative embodiment of the motion picture signal compressor shown in FIG. 4 is shown in FIG. 8. In the motion picture signal compressor shown in FIG. 8, elements corresponding to those in the motion picture signal compressor shown in FIG. 4 are indicated by the same reference numerals, and will not be described again here. The motion picture signal compressor shown in FIG. 8 includes the step size controller 81 and the step size memory 83.

Figure 9:
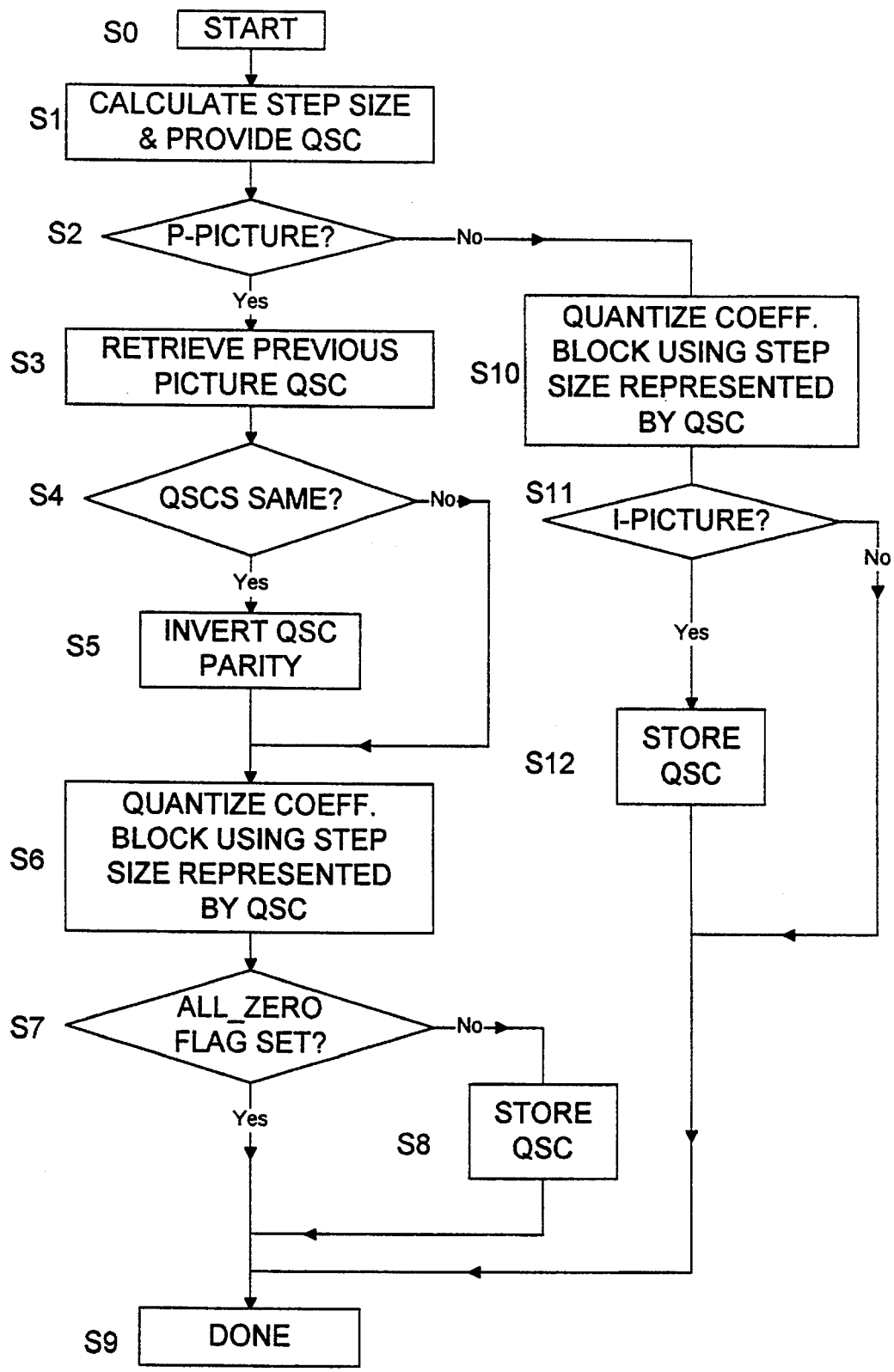
FIG. 9 is a flow chart illustrating the operation of the second embodiment of the step size controller according to the invention.

The step-size controller 81 may be implemented using a digital signal processor or a computer operating according to the flow chart shown in FIG. 9. In the flow chart shown in FIG. 9, at step S1, the step-size controller 81 calculates the calculated step size for quantizing the DCT coefficients derived from the current picture block of the current picture in response to, for example, data indicating the occupancy of the output buffer 19, as described above. The calculated step size is restricted to a step size value allowed by MPEG, and is represented by the calculated quantizing_scale_code (calculated QSC) and the qscale_type (QT).

At step S2, the step-size controller 81 determines whether the current picture is a P-picture. If the result at step S2 is YES, and the current picture is a P-picture, execution advances to step S3 to begin the processing that, if necessary, will modify the calculated QSC determined in step S1, and, hence, the step size. Otherwise, when the result at step S2 is NO, and the current picture is an I-picture or a B-picture, execution jumps to step S10, bypassing the processing steps that may modify the calculated QSC determined at step S1.

At step S3, the step size controller 81 retrieves from the QSC memory 83 the stored previous picture QSC, indicating the QSC representing the step size that was used to quantize the previous coefficient block, i.e., the block of DCT coefficients derived from the picture block in the previously-processed P-picture or I-picture at the position of the current picture block in the current picture.

At step S4, the step size controller 81 determines whether the calculated QSC determined at step S1 is the same as the retrieved previous picture QSC. If the result is YES, execution passes to step S5, where the step size controller modifies the calculated QSC determined at step S1 to invert its parity. For example, the least-significant bit (LSB) of the step size may be toggled, but if the resulting parity-inverted QSC is zero, the QSC is set to two, which has an opposite parity to a QSC of one, and is an allowed QSC value. Other ways of inverting the parity of the QSC are discussed above. The calculated QSC with its parity inverted is then adopted as the current QSC, i.e., the QSC representing the step size to be used for quantizing the coefficient block, and execution passes to step S6.

If the result at step S4 is NO, and the calculated QSC determined at step S1 is different from the previous picture QSC, the calculated QSC determined at step S1 is adopted as the current QSC, and execution passes to step S6.

At step S6, step size controller 81 feeds the current QSC and the QT to the quantizer 12. The quantizer 12 quantizes the current coefficient block using the step size represented by the current QSC and the QT supplied by the step size controller. After quantizing the current coefficient block, the quantizer 12 checks to determine whether the resulting quantized coefficient block is an all-zero quantized coefficient block in which the quantized DCT coefficients are all zero. If so, the quantizer sets the all_zero flag.

At step S7, the step size controller 81 tests whether the all_zero flag is set. If the result at step S7 is NO, and the all_zero flag is not set, indicating that at least one of the quantized DCT coefficients in the current quantized coefficient block is not zero, execution passes to step S8. At step S8, the step size controller 81 stores the current QSC fed to the quantizer 12 in step S6 in the QSC memory 83 for use as a previous picture QSC when the next P-picture is processed. Execution then passes to step S9, the end of the routine.

On the other hand, if the result at step S7 is YES, the all_zero flag is set, indicating that the current quantized coefficient block is an all-zero quantized coefficient block. Since the current picture is a P-picture (result at step S2=YES), the all-zero quantized coefficient block indicates that there are no differences between the current picture block and the previous picture block. Execution jumps to step S9, which is the end of the routine. This prevents the current QSC fed to the quantizer 12 in step S6 from being stored in the QSC memory as a new previous picture QSC. This, in turn, ensures that the following coefficient block, i.e., the block of DCT coefficients derived from the picture block located in the next P-picture at the position of the current block in the current picture, will be quantized with a step size represented by an unmodified QSC.

When the result at step S2 is NO, indicating that the current picture is an I-picture or a B-picture, execution jumps to step S10. At step S10, the step size controller 81 feeds the calculated QSC determined at step S1 to the quantizer 12. The quantizer quantizes the current coefficient block using the step size represented by the current QSC and the QT received from the step size controller. Execution passes to step S11, where the step size controller tests to determine whether the current picture is an I-picture.

If the result at step S11 is YES, and the current picture is an I-picture, execution passes to step S12, where the step size controller 81 stores in the QSC memory 83 as a previous picture QSC the current QSC fed to the quantizer 12 in step S10. When the current picture is an I-picture, every coefficient block includes at least one non-zero DCT coefficient. Therefore, in contrast to when the current picture is a P-picture, when the current picture is an I-picture, there is no need to determine whether the current quantized coefficient block is an all-zero quantized coefficient block before storing its QSC in the QSC memory 83 as a previous picture QSC. The QSC representing the step size used to quantize every coefficient block derived from an I-picture is stored in the QSC memory as a previous picture QSC. Execution then passes to step S9, the end of the routine.

If the result at step S11 is NO, and the current picture is a B-picture, no post-quantizing activity is carried out, and execution jumps to step S9, the end of the routine.

A hardware implementation of the step-size controller 81 will now be described with reference to FIG. 10. In the step size controller shown in FIG. 10, elements corresponding to those in the step size controller 51 shown in FIG. 6 are indicated by the same reference numerals, and will not be described again here. The step size controller includes the step size calculator 61 and the step size modifier 85, which provide the QSC for feeding to the quantizer 12; and the read/write signal generator 67 and the address generator 69, which control reading and writing the previous picture QSCs into and out of the QSC memory 83.

When the orthogonal transform circuit 11 has orthogonally transformed the current picture block (in the case of an I-picture) or the difference block derived from the current picture block (in the case of a P-picture or a B-picture), and the resulting block of DCT coefficients (the current coefficient block) has been fed into the quantizer 12, the step size calculator 61 receives buffer occupancy information from the output buffer 19 and, in response to the buffer occupancy information, calculates the step size for quantizing the current coefficient block. The calculated step size derived by the step size calculator is restricted to a step size value allowed by MPEG, and is represented by the calculated quantizing_scale_code (calculated QSC) and the qscale_type (QT). The step size calculator feeds the calculated QSC and the QT to the step size modifier 85. The step size modifier passes the QT to the quantizer 12 without modification.

Additionally, at the start of each picture, the step size controller 81 receives from the memory controller 3 the picture_type code, which indicates whether the current picture is an I-picture, a P-picture, or a B-picture. The picture_type code is fed into the read/write signal generator 67, and the step size modifier 85.

In response to the picture_type code indicating that the current picture is a P-picture, the read/write signal generator 67 feeds the read/write signal in its read_enable mode to the QSC memory 83. In response to the read_enable signal, and the memory address generated by the address generator 69, as described above, the QSC memory 83 feeds back to the step size modifier 85 the previous picture QSC for the previous picture block, i.e., the picture block located in the previously-processed I-picture or P-picture at the position of the current picture block in the current picture.

When the picture_type code indicates that the current picture is an I-picture or a P-picture, the step size modifier 85 passes unmodified the calculated QSC determined by the step size calculator 61 as the current QSC. On the other hand, when the picture_type code indicates that the current picture is a P-picture, the step size modifier may modify the calculated QSC determined by the step size calculator 61 to provide the current QSC.

When the picture_type code indicates that the current picture is a P-picture, the step size modifier 85 compares the previous picture QSC received from the QSC memory 83 with the calculated QSC determined by the step size calculator 61. If the step size modifier 85 determines that the calculated QSC is the same as the previous picture QSC, the step size modifier inverts the parity of the calculated QSC determined by the step size calculator to provide the current QSC. To invert the parity of the QSC, the step size modifier may toggle the least significant bit (LSB) of the calculated QSC, as shown in Table 2 set forth above. However, when the resulting parity-inverted QSC has a value of zero, the step size modifier sets the value of the QSC to two to invert its parity. This avoids the forbidden QSC value of zero. Alternative ways of inverting the parity of the QSC are described above.

The step size modifier 85 then feeds the current QSC and the QT to the quantizer 12, which quantizes the current coefficient block using the step size represented by the current QSC and the QT received from the step size modifier. After quantizing the current coefficient block, the quantizer 12 checks to determine whether the resulting quantized coefficient block is an all-zero quantized coefficient block in which the quantized DCT coefficients are all zero. If so, the quantizer sets the all_zero flag.

The step size modifier 85 also feeds the current QSC to the QSC memory 83. The QSC memory also receives from the address generator 69 the memory address corresponding to the address of the current picture block, as described above. However, the current QSC is only written into the QSC memory at the address indicated by the memory address from the address generator when the QSC memory receives the read/write signal in its write_enable mode from the read/write signal generator 67.

The read/write generator 67 monitors the picture_type code and the all_zero flag to determine whether to feed the read/write signal in its write_enable mode to the QSC memory 83. A picture_type code indicating that the current picture is a B-picture inhibits the read/write generator from feeding a write_enable signal to the QSC memory 83. Hence, no QSC relating to a B-picture is stored in the QSC memory 83. When the picture_type code indicates that the current picture is an I-picture, the read/write signal generator 67 feeds the write_enable signal to the QSC memory for every picture block of the picture. When the picture_type code indicates that the current picture is a P-picture, the read/write signal generator 67 feeds the write_enable signal to the QSC memory for those picture blocks of the picture from which a quantized coefficient block including least one non-zero quantized DCT coefficient is derived.

The read/write signal in its write_enable mode causes the QSC memory 83 to store the current QSC received from the step size modifier 85 at the memory address indicated by the address received from the address generator 69. The QSCs stored in the QSC memory will be used as previous picture QSCs when the next P-picture is processed.

When the picture_type code indicates that the current picture is a P-picture, the read/write signal generator 67 determines the state of the all_zero flag. When the all_zero flag is not set, indicating that the current quantized coefficient block includes at least one non-zero quantized DCT coefficient, the read/write generator 67 feeds the read/write signal in its write_enable mode to the QSC memory 83.

When the all_zero flag is set, indicating that the current quantized coefficient block is an all-zero quantized coefficient block, this inhibits the read/write signal generator 67 from feeding the read/write signal in its write_enable mode to the QSC memory 83. Thus, when the all_zero flag is set, the QSC representing the step size with which the current coefficients block was quantized is not written into the QSC memory 83 to overwrite the QSC for the previous picture block already stored therein. This prevents the QSC fed to the quantizer 12 from being stored in the QSC memory as a previous picture QSC. This, in turn, ensures that the block of DCT coefficients derived from the following picture block will be quantized with the parity of the QSC unmodified.

Figure 11:
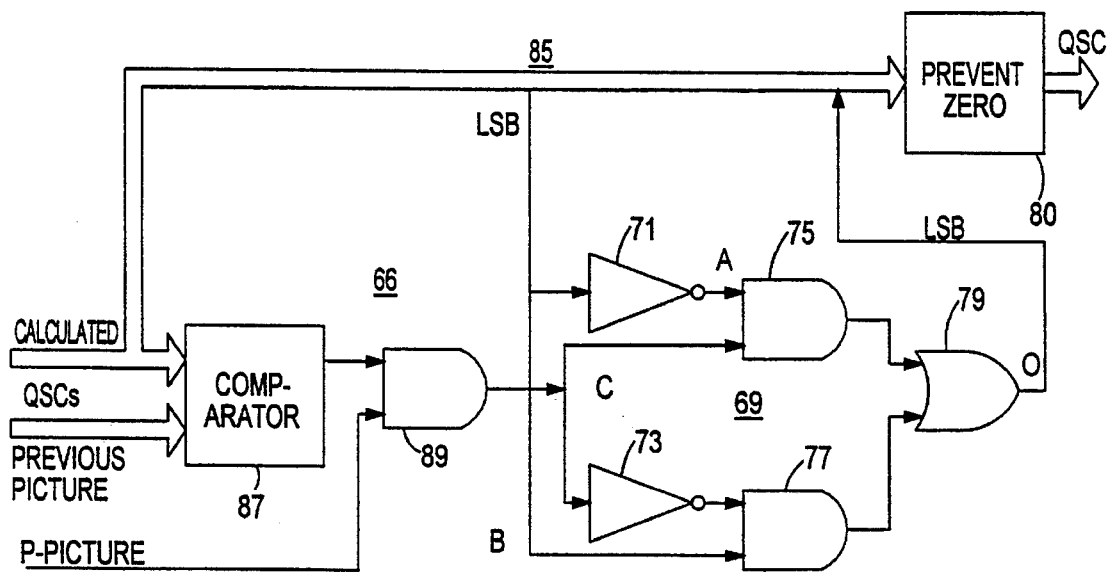
FIG. 11 is a block diagram showing the step size modifier in the second embodiment of the step size controller according to the invention.

A block diagram of an example of the step size modifier 85 is shown in FIG. 11. Elements in the step size modifier shown in FIG. 11 corresponding to those in the step size modifier shown in FIG. 7A are indicated by the same reference numerals and will not be described in detail again. The step size modifier includes two main units, the parity inverter 66, and the zero prevention circuit 80. The parity inverter is made up of the inverter 71, the comparator 87, the AND-gate 89, and the selector 69 formed of the inverter 73, the AND-gates 75 and 77, and the OR-gate 79.

In the step-size modifier 85, the parity inverter receives the previous picture QSC from the QSC memory 83, and feeds it to one input of the comparator 87. The step-size modifier 85 also receives the calculated QSC determined by the step size calculator 61, and feeds it to the other input of the comparator 87. The least-significant bit of the calculated QSC is also fed to the input B of the selector 69, and, via the inverter 71, to the input A of the selector 69. Finally, the step size modifier receives the code element P-PICTURE as an element of the picture_type code from the memory control 3 (FIG. 8), and feeds it to one input of the AND gate 89. The output of the comparator 87 is fed to the other input of the AND-gate 89. The output of the AND-gate 89 is fed to the control input C of the selector 69. The output of the comparator is only in its 1 state when the calculated QSC determined by the step size calculator 61 and the previous picture QSC are equal, and is otherwise in its 0 state.

The output of the parity inverter 66 is fed to the prevent zero circuit 100. The prevent zero circuit sets a parity-inverted QSC of zero to two to prevent the step size modifier from generating a non-allowed QSC value.

When the code element P-picture is in its 0 state, indicating that the current picture is an I-picture or a B-picture, the AND-gate 89 holds the control input C of the selector 69 in its 0 state. With the control input C in the 0 state, the least-significant bit of the calculated QSC passes unchanged to the output O of the selector 69, where it provides the least-significant bit of the step size. The least-significant bit of the calculated QSC passes to the output O via the AND-gate 77 and the OR-gate 79.

When the code element P-picture is in its 1 state, indicating that the current picture is a P-picture, the state of the output of the AND-gate 89, and hence the state of the control input C of the selector 69, depends on the output of the comparator 87.

When the calculated QSC determined by the step size calculator 61 is different from the previous picture QSC, the parity of the calculated QSC must not be modified, and the outputs of the comparator 87 and the AND-gate 89 are in their 0 states. This causes the selector to connect the least-significant bit of the calculated QSC to the output O unchanged as the least-significant bit of the step size. The least-significant bit of the calculated QSC passes to the output O via the AND-gate 77 and the OR-gate 79. On the other hand, when the calculated QSC determined by the step size calculator 61 is equal to the previous picture QSC, and the parity of the calculated QSC must therefore be inverted, the outputs of the comparator 87 and the AND-gate 89 are in their 1 states. This causes the selector 69 to connect the least-significant bit of the calculated QSC, inverted by the inverter 71, to the output O to provide the least-significant bit of the QSC. The least-significant bit of the calculated QSC is connected to the output O via the AND-gate 75 and the OR-gate 79. The least-significant bit of the QSC from the output of the selector 69 is reunited with the remaining bits of the calculated QSC to provide the QSC as shown. The logical operation of the step size modifier 85 is illustrated in Table 4.

TABLE 4

| Previous picture QSC | Calculated QSC | P-picture | Processing applied to LSB of Calculated QSC |
|---|---|---|---|
| x | x | 1 | inverted |
| x | not x | 1 | unchanged |
| x | x | 0 | unchanged |
| x | not x | 0 | unchanged |

The parity inverter 66 just described can provide a QSC value of zero, which is not an allowed value for the QSC. The QSC from the parity inverter is therefore further processed by the zero prevention circuit 80 to set the value of the QSC to two when a QSC value of zero is generated. Operation of the zero prevention circuit 80 is the same as that described above with reference to FIG. 7A, and will not be described again here.

The parity of the calculated QSC may alternatively be inverted using a look-up table, as described above with reference to FIG. 7B, or by adding one to the calculated QSC (with special processing of a result of 32) or by subtracting one from the calculated QSC (with special processing of a result of zero), as described above with reference to FIGS. 7B and 7C. In the parity inversion circuits shown in FIGS. 7B and 7C, the control circuit 109 is replaced by the selection control circuit consisting of the comparator 87 and the AND-gate 80.

Figure 12:
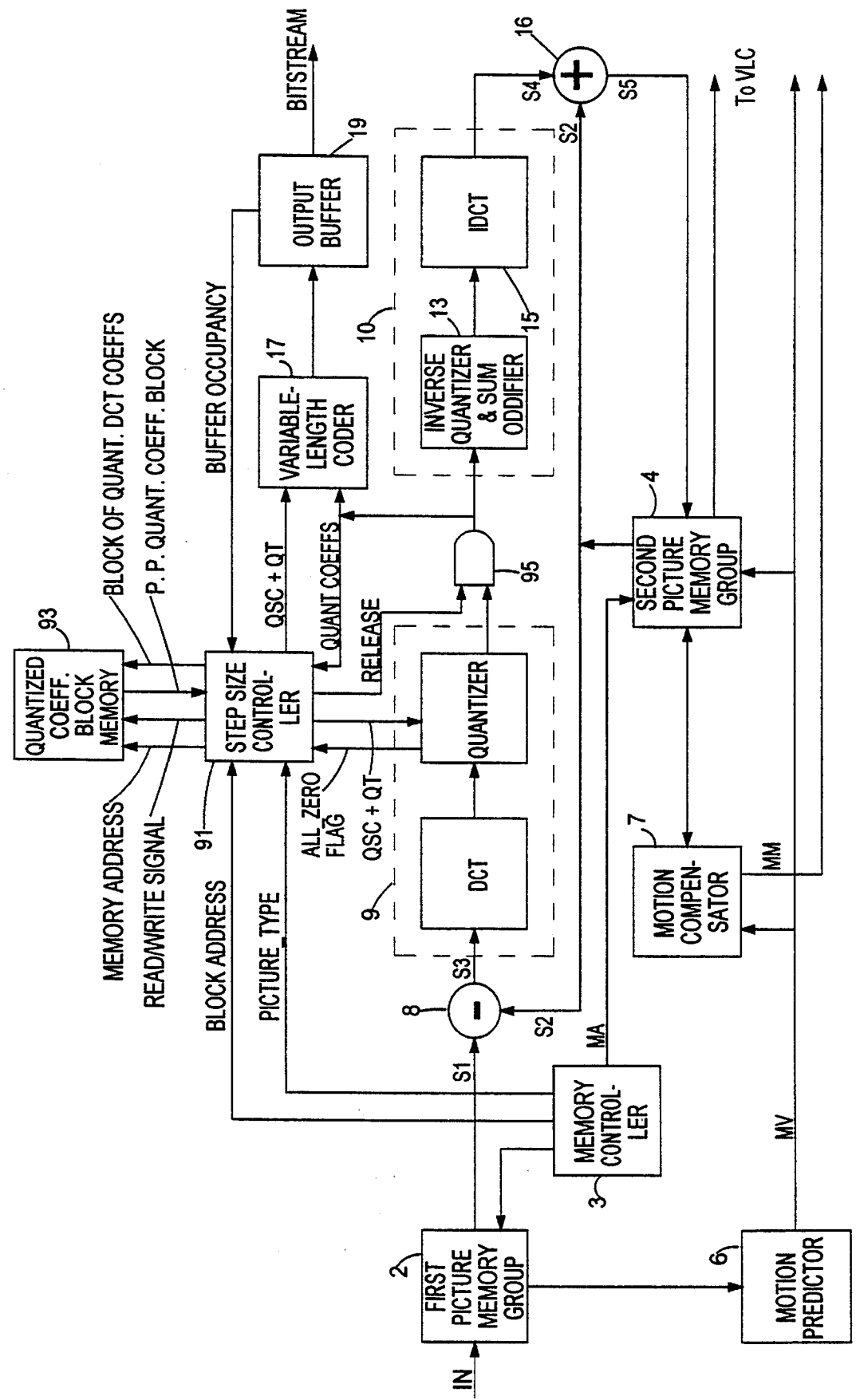
FIG. 12 is a block diagram showing the configuration of an MPEG motion picture signal compressor apparatus incorporating a third embodiment of the quantizing step size controller according to the invention.

A further alternative embodiment of the motion picture signal compressor shown in FIG. 4 is shown in FIG. 12. In the motion picture signal compressor shown in FIG. 12, elements corresponding to those in the motion picture signal compressor shown in FIG. 4 are indicated by the same reference numerals, and will not be described again here. The motion picture signal compressor shown in FIG. 12 includes the step size controller 91, and the quantized coefficient block memory 93. The AND-gate 95 interrupts the path between the quantizer 12 and the variable-length coder 17. Controlled by the step size controller 91, the AND-gate 95 releases each block of quantized DCT coefficients from the quantizer 12 to the variable-length coder 17 and the local decoder 10 only when the quantizing processing is complete. Alternatively, the AND-gate 95 may be omitted, and the RELEASE signal from the step size controller 91 may control the quantizer 12 directly to prevent the quantizer from feeding a block of quantized DCT coefficients to the variable-length coder and the local decoder until the quantizing processing is complete.

Figure 13:
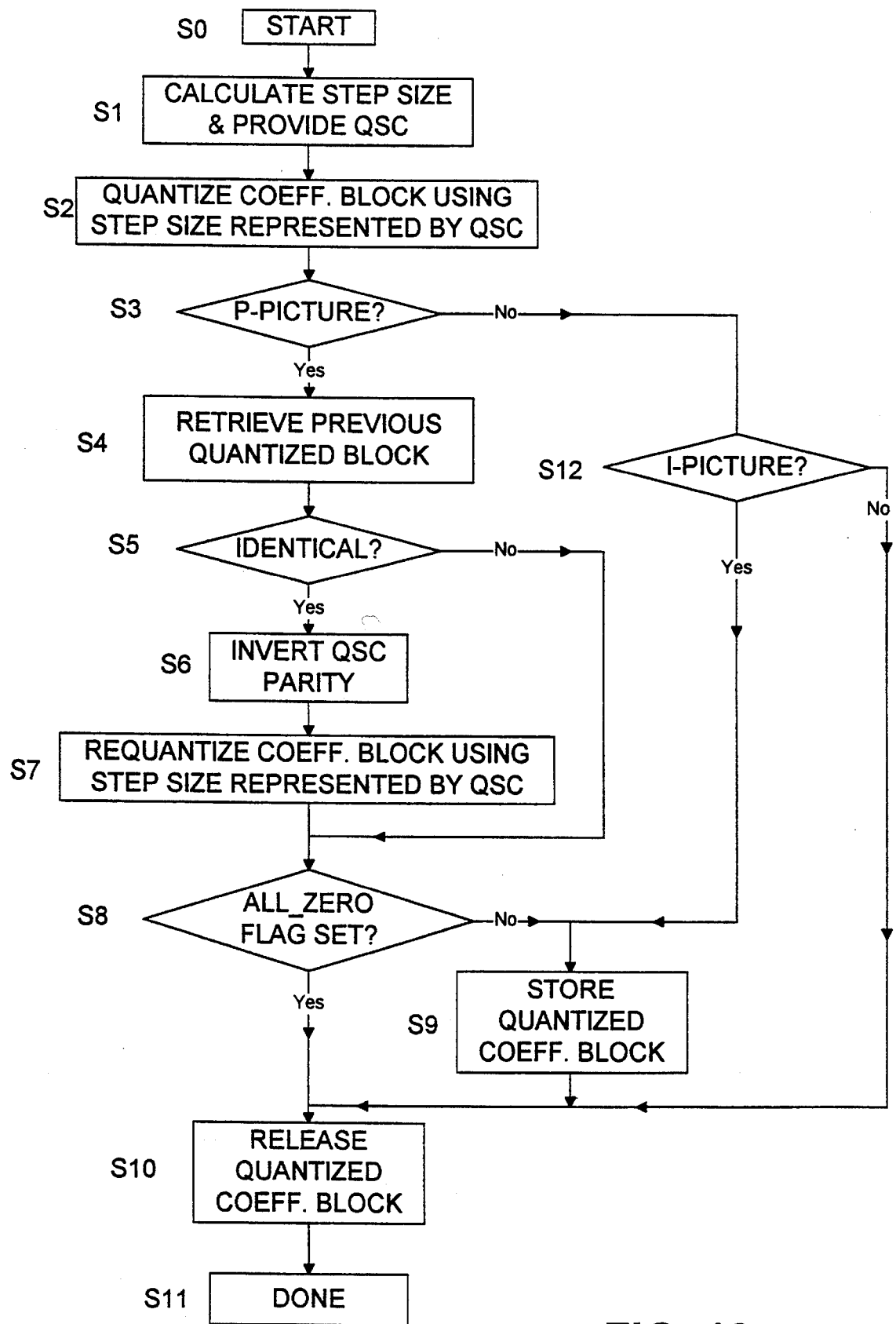
FIG. 13 is a flow chart illustrating the operation of the third embodiment of the step size controller according to the invention.

The step-size controller 91 may be implemented using a digital signal processor or a computer operating according to the flow chart shown in FIG. 13. In the flow chart shown in FIG. 13, at step S1, the step-size controller 91 determines the calculated step size for quantizing the current coefficient block, i.e., the block of DCT coefficients derived from the current picture block of the current picture, in response to, for example, data indicating the occupancy of the output buffer 19, as described above. The calculated step size is restricted to a step size value allowed by MPEG, and is represented by the calculated quantizing_scale_code (calculated QSC) and the qscale_type (QT).

At step S2, the step-size controller 91 feeds the calculated QSC determined in step S1 and the QT to the quantizer 12. The quantizer quantizes the current coefficient block using the step size represented by the calculated QSC and the QT. The quantizer feeds the resulting quantized coefficient block to the step size controller 91. After quantizing the current coefficient block, the quantizer 12 checks to determine whether the resulting quantized coefficient block is an all-zero quantized coefficient block in which the quantized DCT coefficients are all zero. If so, the quantizer sets the all_zero flag.

At step S3, the step size controller 91 determines whether the current picture is a P-picture. If the result at step S3 is YES, and the current picture is a P-picture, execution advances to step S4 to begin the processing that, if necessary, will modify the calculated QSC, and hence the step size, determined in step S1. Otherwise, when the result at step S3 is NO, and the current picture is an I-picture or a B-picture, execution jumps to step S12, bypassing the processing steps that may modify the calculated QSC determined at step S1.

At step S4, the step size controller 91 retrieves from the quantized coefficient block memory 93 the stored previous picture quantized coefficient block, i.e., the block of quantized DCT coefficients derived from the previous picture block, which is the picture block located in the previously-processed P-picture or I-picture at the position of the current picture block in the current picture.

At step S5, the step size controller 91 performs a coefficient-by-coefficient comparison on the 6×64 DCT coefficients in each of the current quantized coefficient block and the previous picture quantized coefficient block to determine whether the current quantized coefficient block received from the quantizer 12 is identical to the previous picture quantized coefficient block retrieved from the quantized coefficient block memory 93. If the result is NO, the step size represented by the calculated QSC is suitable for quantizing the current coefficient block, and execution jumps to step S8. If the result is YES, execution passes to step S6, where the step size controller modifies the calculated QSC determined at step S1 by inverting its parity to provide the step size. For example, the least-significant bit (LSB) of the step size determined at step S1 may be toggled to invert its parity. For example, the least-significant bit (LSB) of the QSC may be toggled, as shown in Table 2. If the resulting QSC is zero, the QSC is set to two, which has an opposite parity to a QSC of one, and is an allowed QSC value. Other ways of inverting the parity of the QSC are discussed below. The calculated QSC with its parity inverted is then adopted as the QSC, and execution then passes the step S7.

At step S7, the step size controller 91 feeds the QSC determined at step S6 and the QT to the quantizer 12. The quantizer 12 re-quantizes the current coefficient block using the QSC and the QT supplied by the step size controller. After re-quantizing the current coefficient block, the quantizer 12 checks to determine whether the resulting quantized coefficient block is an all-zero quantized coefficient block. If so, the quantizer sets the all_zero flag.

At step S8, the step size controller 91 tests whether the all_zero flag is set. If the result at step S8 is NO, and the all_zero flag is not set, indicating that at least one of the quantized DCT coefficients in the current quantized coefficient block is not zero, execution passes to step S9. At step S9, the step size controller 91 stores the quantized coefficient block generated by the quantizer 12 either in step S2 or in step S7, if the quantizer requantized the current coefficient block in step S7. The quantized coefficient block is stored in the quantized coefficient block memory 93 for use as a previous picture quantized coefficient block when the next P-picture is processed. Execution then passes to step S10, where the current quantized coefficient block generated by the quantizer 12 in step S2 or in step S7 is fed to the variable-length coder 17 and the local decoder 10. Execution then advances to step S11, the end of the routine.

On the other hand, if the result at step S8 is YES, the all_zero flag is set, indicating that the current quantized coefficient block is an all-zero quantized coefficient block. Since the current picture is a P-picture (result at step S3=YES), the all-zero coefficient block indicates that there are no differences between the current picture block and the previous picture block, i.e., the picture block located in the previously-processed I-picture or P-picture at the position of the current block in the current picture. In this case, execution jumps to step S10, described above. This bypasses the step in which the current quantized coefficient block generated by the quantizer 12 in either step S2 or in step S7 is stored in the quantized coefficient block memory 93 as a new previous picture quantized coefficient block. This prevents the current quantized coefficient block from over writing the previous quantized coefficient block already stored in the quantized coefficient block memory. This, in turn, ensures that the following coefficient block, i.e., the block of DCT coefficients derived from the following picture block, which is the picture block located in the next P-picture in the position of the current block in the current picture, will be quantized with an unmodified step size.

When the result at step S3 is NO, indicating that the current picture is an I-picture or a B-picture, execution jumps to step S12. At step S12, the step size controller 91 tests to determine whether the current picture is an I-picture.

If the result at step S12 is YES, and the current picture is an I-picture, execution passes to step S9, described above, where the step size controller 91 stores the current quantized coefficient block generated by the quantizer 12 in either step S2 or in step S7, if the quantizer requantized the current coefficient block in step S7. The current quantized coefficient block is stored in the quantized coefficient block memory 93 as a previous picture quantized coefficient block. When the current picture is an I-picture, every quantized coefficient block includes at least one non-zero DCT coefficient. Therefore, in contrast to when the current picture is a P-picture, when the current picture is an I-picture, there is no need to determine whether the current quantized coefficient block is an all-zero quantized coefficient block zero before storing the current quantized coefficient block in the quantized coefficient block memory 93 as a previous picture quantized coefficient block. Every quantized coefficient block derived from an I-picture is therefore stored in the quantized coefficient block memory as a previous picture quantized coefficient block. Execution then passes via step S10, described above, to step S11, the end of the routine.

If the result at step S12 is NO, and the current picture is a B-picture, no post-quantizing activity is carried out, and execution jumps to step S10, described above, and thence to step S11, the end of the routine.

A hardware implementation of the step-size controller 91 will now be described with reference to FIG. 14. In the step size controller shown in FIG. 14, elements corresponding to those in the step size controller shown in FIG. 6 are indicated by the same reference numerals, and will not be described again here. The step size controller includes the step size calculator 61 and the step size modifier 97, which provide the step size for feeding to the quantizer 12; and the read/write signal generator 67 and the address generator 69, which control reading and writing previous picture quantized coefficient blocks into and out of the quantized coefficient block memory 93.

When the orthogonal transform circuit 11 has orthogonally transformed the current picture block (in the case of an I-picture) or the difference block derived from the current picture block (in the case of a P-picture or a B-picture), and the resulting block of DCT coefficients has been fed into the quantizer 12 as the current coefficient block, the step size calculator 61 receives buffer occupancy information from the output buffer 19 and, in response to the buffer occupancy information, determines the calculated step size for quantizing the current coefficient block. The calculated step size determined by the step size calculator is restricted to a step size value allowed by MPEG, and is represented by the calculated quantizing_scale_code (calculated QSC) and the qscale_type (QT). The step size calculator feeds the calculated QSC and the QT to the step size modifier 97. The step size modifier passes the QT to the quantizer 12 without modification.

Additionally, at the start of each picture, the step size controller 91 receives from the memory controller 3 the picture_type code, which indicates whether the current picture is an I-picture, a P-picture, or a B-picture. The picture_type code is fed into the read/write signal generator 67, and the step size modifier 97.

In response to the picture_type code indicating that the current picture is a P-picture, the read/write signal generator 67 feeds the read/write signal in its read_enable mode to the quantized coefficient block memory 93. In response to the read_enable signal, and the memory address generated by the address generator 69, as described above, the quantized coefficient block memory 93 feeds back to the step size modifier 97 the previous picture quantized coefficient block, i.e., the block of quantized DCT coefficients derived from the previous picture block, which is the picture block located in the previously-processed I-picture or P-picture at the position of the current picture block in the current picture.

The step size modifier 97 also operates in response to the picture_type code. When the picture_type code indicates that the current picture is an I-picture or a P-picture, the step size modifier is prevented from modifying the calculated QSC determined by the step size calculator 61, and the step size modifier simply passes unmodified the calculated QSC determined by the step size calculator as the step size. Also, when the picture_type code indicates that the current picture is an I-picture or a B-picture, the step size modifier generates the control signal RELEASE, which opens the gate 95 to allow the quantized coefficient block generated by the quantizer 12 to pass to the variable-length coder 17 and the local decoder 10.

On the other hand, when the picture_type code indicates that the current picture is a P-picture, the step size modifier 97 is enabled so that it can modify the calculated QSC determined by the step size calculator 61, if required. Also, when the picture_type code indicates that the current picture is a P-picture, the step size modifier does not initially generate the control signal RELEASE. The AND-gate 95 remains closed until the step size modifier has determined that the quantized coefficient block generated by the quantizer 12 is not identical to the quantized coefficient block from the quantized coefficient block memory.

The step size modifier 97 passes the calculated QSC determined by the step size calculator 61 to the quantizer 12, which quantizes the current coefficient block using the step size indicated by the calculated QSC and the QT delivered by the step size modifier. The resulting quantized coefficient block from the quantizer 12 is fed to the step size modifier, and also to the AND-gate 95, which is initially closed. After quantizing the current coefficient block, the quantizer 12 checks to determine whether the resulting quantized coefficient block is an all-zero quantized coefficient block in which the quantized DCT coefficients all zero. If so, the quantizer sets the all_zero flag.

When the picture_type code indicates that the current picture is a P-picture, the step size modifier 97 compares the previous picture quantized coefficient block received from the quantized coefficient block memory 93 with the current quantized coefficient block received from the quantizer 12. If the step size modifier 97 determines that the current quantized coefficient block received from the quantizer 12 is different from the previous picture quantized coefficient block received from the quantized coefficient memory 93, the step size modifier feeds the control signal RELEASE to the AND-gate 95. This opens the AND-gate 95, which allows the quantizer 12 to feed the quantized coefficient block to the variable-length coder 17 and the local decoder 10.

If, on the other hand, the step size modifier 97 determines that the quantized coefficient block received from the quantizer 12 is identical to the previous picture quantized coefficient block received from the quantized coefficient memory 93, the step size modifier inverts the parity of the calculated QSC determined by the step size calculator 61 to provide a modified step size. To do this, the step size modifier toggles the least significant bit (LSB) of the calculated QSC, as shown in Table 5 set forth below. However, when the resulting parity-inverted QSC has a value of zero, the step size modifier sets the value of the QSC to two to invert its parity. This avoids the forbidden QSC value of zero. Alternative ways of inverting the parity of the QSC are described above.

When it has to change the parity of the calculated QSC, the step size modifier delays generating the control signal RELEASE. This keeps the AND-gate 95 closed to prevent the incorrectly-quantized coefficient block initially generated by the quantizer 12 from reaching the variable-length coder and the local decoder 10.

The step size modifier 97 then feeds the QSC and the QT to the quantizer 12, which re-quantizes the DCT coefficients in the current coefficient block using the step size represented by the QSC and the QT received from the step size modifier. The resulting quantized coefficient block from the quantizer 12 is fed to the step size modifier, and also to the AND gate 95, which is still closed. After re-quantizing the current coefficient block, the quantizer 12 checks to determine whether the current quantized coefficient block is an all-zero quantized coefficient block. If so, the quantizer sets the all_zero flag.

The quantized coefficient block received by the step size modifier 97 from the quantizer 12 is now different from the previous picture quantized coefficient block from the quantized coefficient block memory 93. Consequently, the step size modifier generates the control signal RELEASE, which opens the AND-gate 95 to allow the quantizer 12 to feed the quantized coefficient block to the variable-length coder 17 and the local decoder 10.

The quantized coefficient block from the quantizer 12 is also fed to the quantized coefficient block memory 93. The quantized coefficient block memory also receives from the address generator 69 a memory address corresponding to the address of the current picture block, as described above. However, the quantized coefficient block is only written into the quantized coefficient block memory at the address indicated by the memory address from the address generator when the quantized coefficient block memory receives the read/write signal in the write_enable mode from the read/write signal generator 67.

The read/write signal generator 67 monitors the picture_type code and all_zero flag to determine whether to feed the read/write signal in the write_enable mode to the quantized coefficient block memory 93. A picture_type code indicating that the current picture is a B-picture inhibits the read/write signal generator from feeding a write_enable signal to the quantized coefficient block memory 93. Hence, no blocks of quantized DCT coefficients derived from a B-picture are ever stored in the quantized coefficient block memory 93. When the picture_type code indicates that the current picture is an I-picture, the read/write signal generator 67 feeds the read/write signal in its write_enable mode to the quantized coefficient block memory 93 for every picture block of the picture. When the picture_type code indicates that the current picture is a P-picture, the read/write signal generator 67 feeds the write_enable signal to the quantized coefficient block memory for those picture blocks of the picture from which a quantized coefficient block including least one non-zero quantized DCT coefficient is derived.

The read/write signal in its write_enable mode causes the quantized coefficient block memory 83 to store the quantized coefficient block received from the quantizer 12 at the memory address indicated by the address received from the address generator 69. The quantized coefficient blocks stored in the quantized coefficient block memory will be used as previous picture quantized coefficient blocks when the next P-picture is processed.

When the picture_type code indicates that the current picture is a P-picture, the read/write signal generator 67 determines the state of the all_zero flag. When the all_zero flag is not set, indicating that the current quantized coefficient block includes at least one non-zero quantized DCT coefficient, the read/write generator 67 feeds the read/write signal in its write_enable mode to the quantized coefficient block memory 93.

When the all_zero flag is set, indicating that the current quantized coefficient block is an all-zero quantized coefficient block, this inhibits the read/write signal generator 67 from feeding the read/write signal in its write_enable mode to the quantized coefficient block memory 93. Thus, when the all_zero flag is set, the quantized coefficient block is not written into the quantized coefficient block memory 93 to overwrite the previous picture quantized coefficient block already stored therein. This prevents the quantized coefficient block from the quantizer 12 from being stored in the quantized coefficient block memory as a previous picture quantized coefficient block. This, in turn, ensures that the coefficient block derived from the following picture block, i.e., the picture block located in the next P-picture at the position of the current block in the current picture, will be quantized with the step size unmodified.

Figure 15:
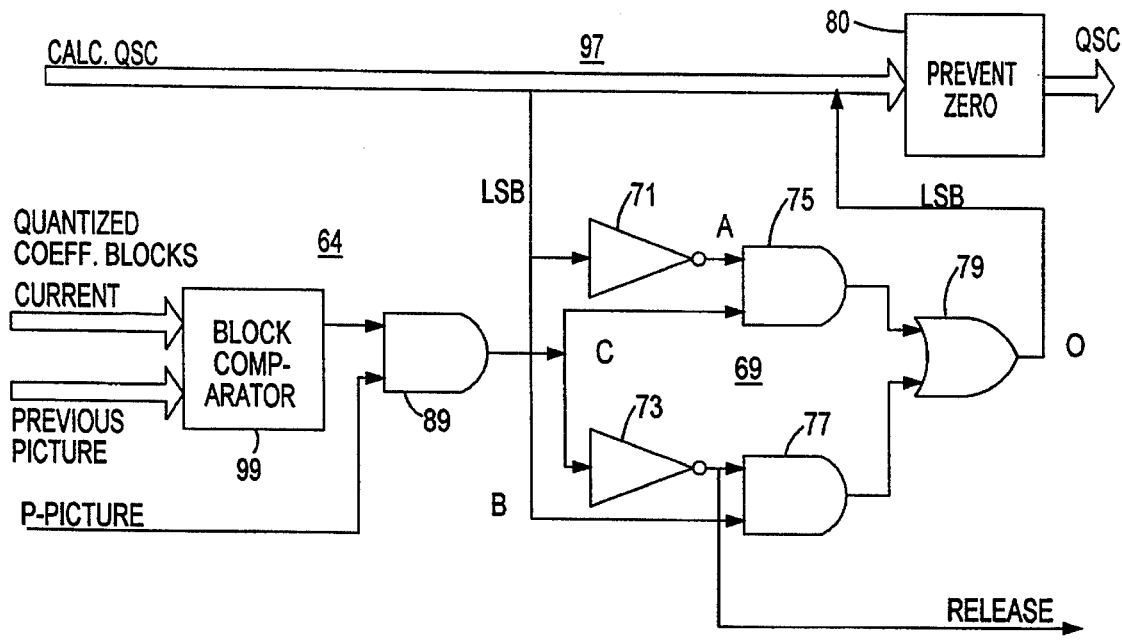
FIG. 15 is a block diagram showing the step size modifier in the third embodiment of the step size controller according to the invention.

A block diagram of an example of the step size modifier 97 is shown in FIG. 15. Elements in the step size modifier shown in FIG. 15 corresponding to those in the step size modifier shown in FIG. 11 are indicated by the same reference numerals and will not be described in detail again. The step size modifier includes two main units, the parity inverter 64 and the zero prevention circuit 80. The parity inverter 64 includes the inverter 71, the block comparator 99, and the AND-gate 89, and the selector 69 formed by the inverter 71, the AND-gates 75 and 77, and the OR-gate 79 forming.

In the step-size modifier 97, the parity inverter 64 receives the previous picture quantized coefficient block from the quantized coefficient block memory 93, and feeds it to one input of the block comparator 99. The parity inverter also receives the current quantized coefficient block from the quantizer 12, and feeds it to the other input of the block comparator 99. The least-significant bit of the calculated QSC is also fed to the input B of the selector 69, and, via the inverter 71, to the input A of the selector 69. Finally, the parity inverter receives the code element P-picture, which is an element of the picture_type code from the memory control 3 (FIG. 12), and feeds it to one input of the AND-gate 89. The output of the block comparator 99 is fed to the other input of the AND-gate 89. The output O of the selector 69 provides the least-significant bit of the QSC. The output of the AND-gate 89 is fed to the control input of the selector 69, and, via the inverter 73, as the control signal RELEASE to the AND gate 95 (FIG. 12).

The block comparator 99 performs a coefficient-by-coefficient comparison between the quantized coefficient block from the quantizer 12 and the previous picture quantized coefficient block from the quantized coefficient block memory 93. The output of the block comparator is only in its 1 state when the quantized DCT coefficients in the quantized coefficient block are all identical to the respective quantized DCT coefficients in the previous picture quantized coefficient block, and is otherwise in its 0 state.

When the code element P-picture is in its 0 state, indicating that the current picture is an I-picture or a B-picture, the AND gate 89 holds the control input C of the selector 69 in its 0 state. With the control input C in the 0 state, the least-significant bit of the calculated QSC passes to the output of the selector 69 unchanged via the AND-gate 77 and the OR-gate 79, where it provides the least-significant bit of the QSC. The output of the AND-gate 89, inverted by the inverter 73, feeds the control signal RELEASE to the AND-gate 95, which holds the gate open. This allows the quantized coefficient block from the quantizer 12 to be fed to the variablelength coder 17 and the local decoder 10.

When the code element P-picture is in its 1 state, indicating that the current picture is a P-picture, the state of the output of the AND-gate 89, and, hence, the states of the control input C of the selector 69 and the control signal RELEASE, depend on the output of the block comparator 99.

When the quantized coefficient block from the quantizer 12 is different from the previous picture quantized coefficient block from the quantized coefficient block memory 93, the parity of the calculated QSC must not be modified, and the output of the block comparator 99 is in its 0 state. Consequently, the output of the AND-gate 89 is also in its 0 state, and that of the inverter 73 is in its 1 state. This causes the selector 69 to connect the least significant bit of the calculated QSC to the output O unchanged via the AND-gate 77 and the OR-gate 79. The output O provides the least-significant bit of the QSC. The output of the inverter 73 provides the control signal RELEASE in its 1 state, which opens the AND-gate 95.

On the other hand, when the quantized coefficient block from the quantizer 12 is identical to the previous picture quantized coefficient block from the quantized coefficient block memory 93, the parity of the calculated QSC must be inverted. The output of the block comparator 99 is in its 1 state, which sets the output of the AND-gate 89 to its 1 state, and the output of the inverter 73 to its 0 state. This causes the selector 69 to connect the least significant bit of the calculated QSC, inverted by the inverter 71, to the output O via the AND-gate 75 and the OR-gate 79. The inverted least-significant bit of the calculated QSC from the output of the selector 69 is reunited with the remaining bits of the QSC as shown. The output of the inverter 73 provides the control signal RELEASE in its 0 state. This maintains the AND gate 95 in its closed state until the current coefficient block is requantized using the step size, and the resulting quantized coefficient block is not identical to the previous picture quantized coefficient block. The logical operation of the step size modifier 97, for values of the calculated QSC of greater than one, is illustrated in Table 5.

TABLE 5

| Quantized Coefficient Block | Previous Picture Quantized Coefficient Block | P-picture | Processing Applied to LSB of Calculated QSC |
|---|---|---|---|
| $F_{0,0}$–$F_{7,7}$ | identical | 1 | inverted |
| $F_{0,0}$–$F_{7,7}$ | different | 1 | unchanged |
| $F_{0,0}$–$F_{7,7}$ | identical | 0 | unchanged |
| $F_{0,0}$–$F_{7,7}$ | different | 0 | unchanged |

The parity inverter 64 just described can provide a QSC value of zero, which is not an allowed value for the QSC. The QSC from the parity inverter 64 is therefore further processed by the zero prevention circuit 80 to set the value of the QSC to two when the parity inverter generates a QSC value of zero. Operation of the zero prevention circuit 80 is the same as that described above with reference to FIG. 7A, and will not be described again here.

The parity of the calculated QSC may alternatively be inverted using a look-up table, as described above with reference to FIG. 7B, or by adding one to the calculated QSC (with special processing of a result of 32), or by subtracting one from the calculated QSC (with special processing of a result of zero), as described above with reference to FIGS. 7B and 7C. In the parity inversion circuits shown in FIGS. 7B and 7C, the control circuit 109 is replaced by the selection control circuit consisting of the block comparator 99 and the AND-gate 80.

Figure 16:
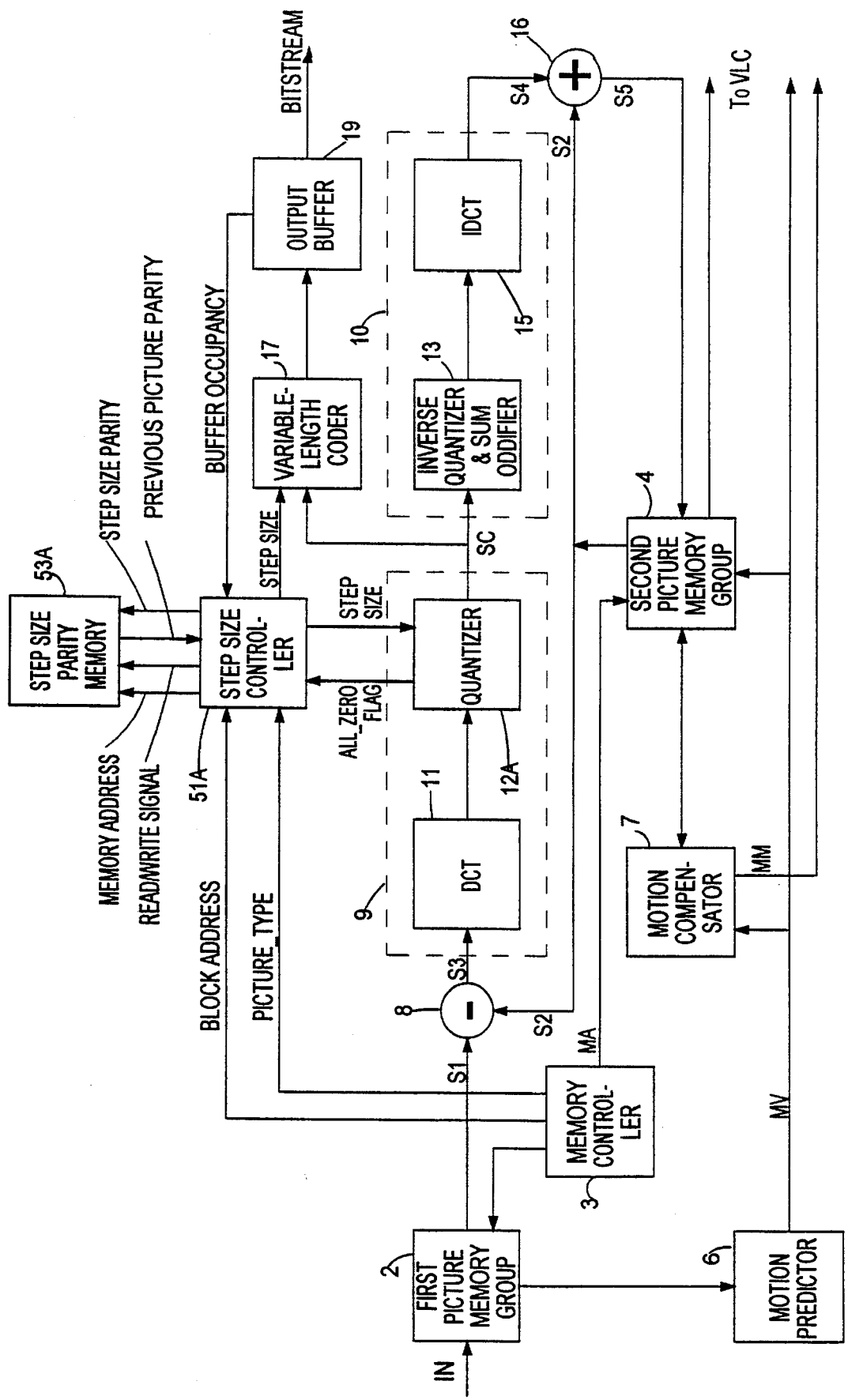
FIG. 16 is a block diagram showing the configuration of a non-MPEG motion picture signal compressor apparatus incorporating the first embodiment of the quantizing step size controller according to the invention.

In the embodiments of the motion picture signal compressor described above, the step size is represented by the quantizer_scale_code (QSC) and the qscale_type (QT) defined by the MPEG standard. FIG. 16 shows a motion picture signal compressor having a structure similar to the MPEG compressor, but in which the step size controller feeds the step size to the quantizer, and the step size is not restricted to the values allowed by the MPEG standard. In the motion picture signal compressor shown in FIG. 16, repetitive Type (1) errors are prevented by using a different step size to quantize successive coefficient blocks, i.e., coefficient blocks derived from picture blocks located in the same position in consecutively processed P-pictures, or in a P-picture following an I-picture. The effectiveness of changing the step size is maximized by changing the step size parity. The step size used to quantize a coefficient block following a coefficient block that, when quantized, resulted in an all-zero quantized coefficient is not changed.

In the motion picture signal compressor shown in FIG. 16, elements corresponding to those in the motion picture signal compressor shown in FIG. 4 are indicated by the same reference numerals, and will not be described again here. Elements similar to elements in the motion picture signal compressor shown in FIG. 4 are indicated by the same reference numerals with the letter "A" added. The motion picture signal compressor shown in FIG. 16 includes the step size controller 51A, the step size memory 53A, and the quantizer 12A.

Figure 17:
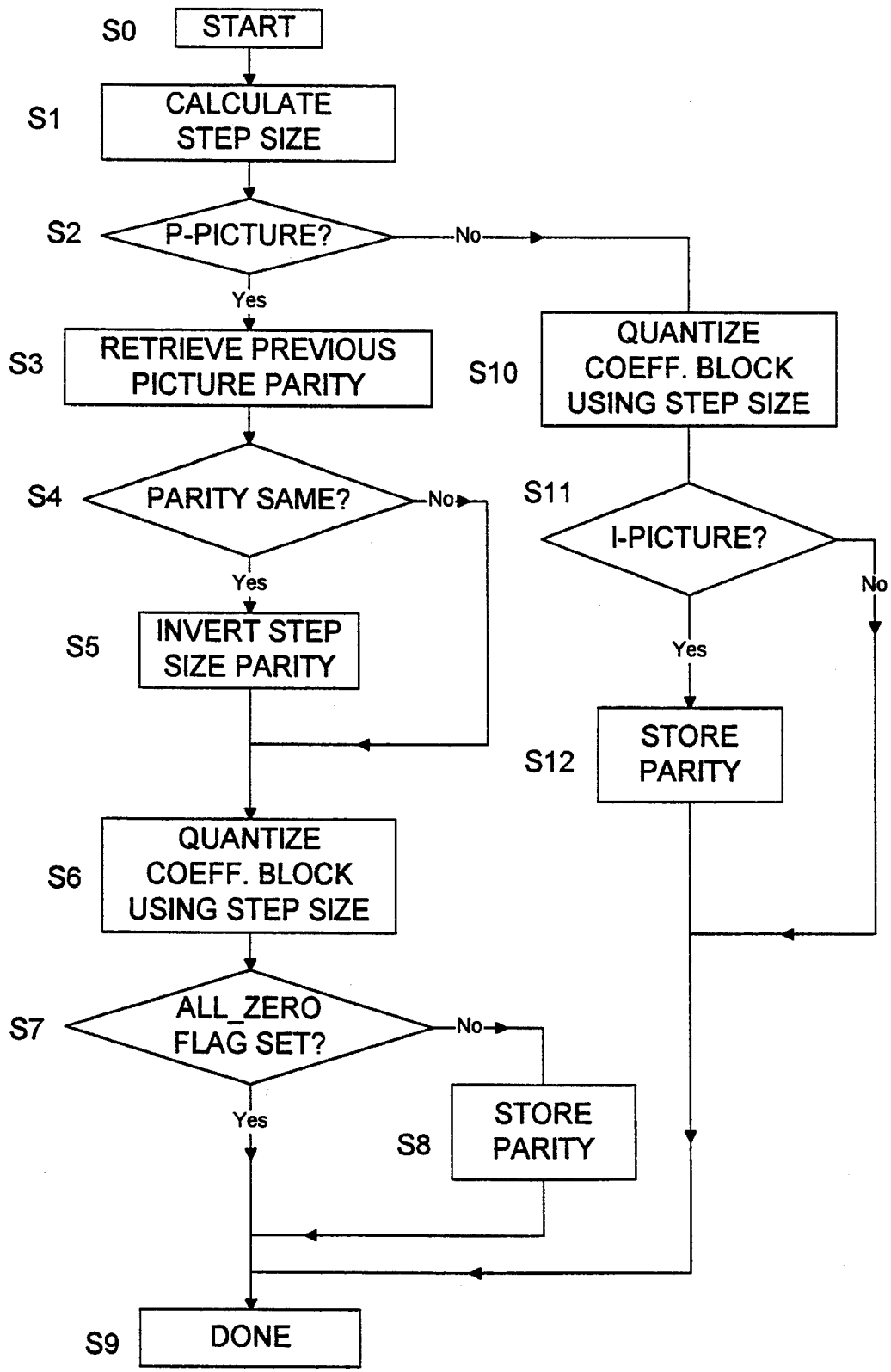
FIG. 17 is a flow chart illustrating the operation of the first embodiment of the step size controller according to the invention in the non-MPEG apparatus.

The step-size controller 51A may be implemented using a digital signal processor or a computer operating according to the flow chart shown in FIG. 17. The flow chart shown in FIG. 17 is similar to that shown in FIG. 5. The differences will be described next.

At step S1, the step-size controller 81 calculates the calculated step size for quantizing the DCT coefficients derived from the current picture block of the current picture, but the step size is not represented using a quantizer_scale_code and a qscale_type.

At step S3, the step size controller 51A retrieves from the parity memory 53A the stored previous picture parity indicating the parity of the step size that was used to quantize the coefficient block derived from the previous picture block, i.e., the picture block located in the previously-processed P-picture or I-picture at the position of the current picture block in the current picture.

At step S4, the step size controller 51A determines whether the parity of the calculated size determined at step S1 is the same as the retrieved previous picture parity. If the result is YES, execution passes to step S5, where the step size controller modifies the calculated step size determined at step S1 to invert its parity. For example, the least-significant bit (LSB) of the step size may be toggled, as shown in Table 6. However, if toggling the LSB of the step size results in a step size of zero, the step size is set to two, which has the opposite parity to a step size of one. The calculated step size with its LSB inverted is then adopted as the step size, and execution passes to step S6.

TABLE 6

| Previous Picture QSC Parity | LSB of Calculated Step Size (Calculated Step Size > 1) | LSB of Step Size |
| --- | --- | --- |
| 0 | 0 | 1 |
| 0 | 1 | 1 |
| 1 | 0 | 0 |
| 1 | 1 | 0 |

Alternatively, and preferably, step S4 may be omitted, and, at step S5, the previous picture parity may be inverted and substituted for the LSB of the calculated step size determined in step S1. The calculated step size with the inverted previous picture parity substituted for its LSB is then adopted as the step size. Execution then passes the step S6.

If the result at step S4 is NO, and the parity of the step size calculated at step S1 is different from the previous picture parity, execution also passes to step S6, and the calculated step size determined at step S1 is adopted as the step size.

At step S6, step size controller 51A feeds the step size to the quantizer 12. The quantizer 12 quantizes the current coefficient block using the step size supplied by the step size controller, and checks to determine whether the resulting quantized coefficient block is an all-zero quantized coefficient block. If so, the quantizer sets the all_zero flag.

At step S8, the step size controller 51A calculates the parity of the step size fed to the quantizer 12 in step S6, and stores the result in the parity memory 53A for use as a previous picture parity when the next P-picture is processed.

At step S10, the step size controller 51 feeds the step size calculated at step S1 to the quantizer 12A. The quantizer 12A quantizes the current coefficient block using the step size received from the step size controller.

At step S12, the step size controller 51A calculates the parity of the step size fed to the quantizer 12A in step S10, and stores the resulting step size parity in the parity memory 53A as a previous picture parity.

A hardware implementation of the step-size controller 51A will now be described with reference to FIG. 18. The step size controller includes the step size calculator 61A and the step size modifier 63A, which provide the step size for feeding to the quantizer 12A; the parity calculator 65A which calculates the parity of the step size used to quantize the current coefficient block; and the read/write signal generator 67 and the address generator 69, which control reading and writing the previous picture parity into and out of the parity memory 53A.

Figure 18:
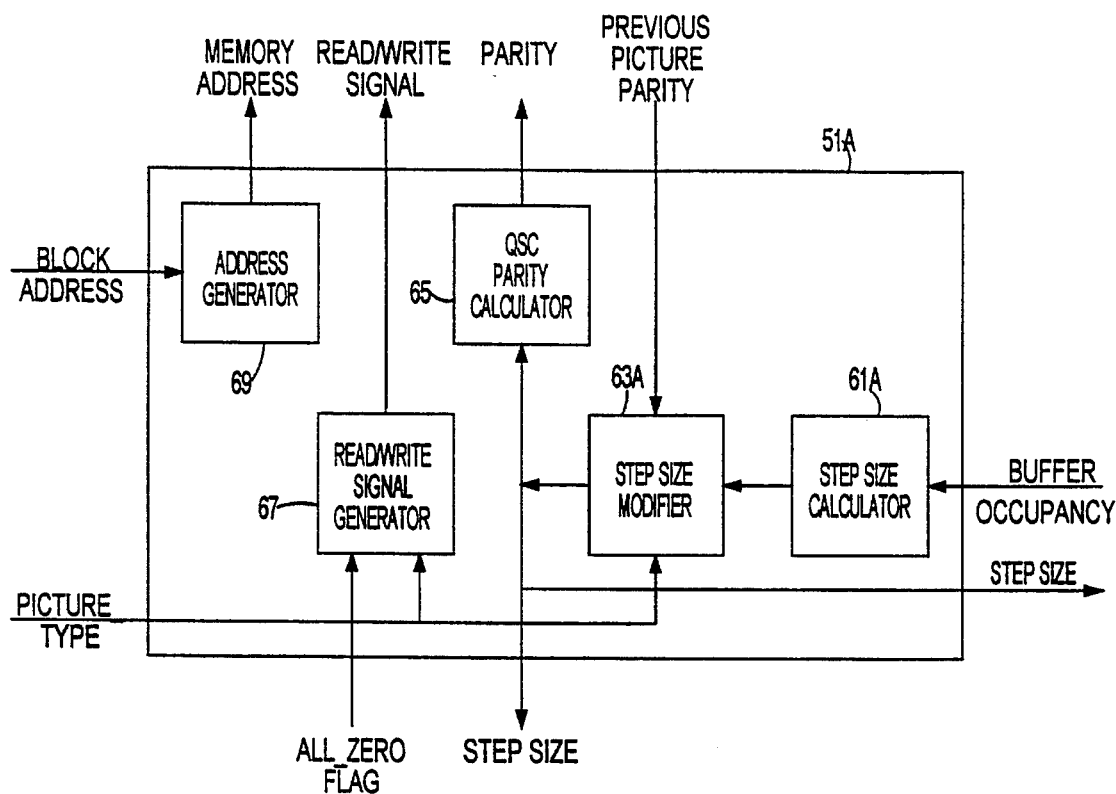
FIG. 18 is a block diagram showing a hardware implementation of the first embodiment of the step size controller according to the invention in the non-MPEG apparatus.

In the step size controller 51A shown in FIG. 18, elements corresponding to those in the step size controller shown in FIG. 6 are indicated by the same reference numerals, and will not be described again here. Elements similar to elements in the step size controller shown in FIG. 6 are indicated by the same reference numerals with the letter "A" added. Only the differences from the step size controller shown in FIG. 6 will be described.

The step size calculator 61A determines the calculated step size for quantizing the current coefficient block in response to buffer occupancy data from the output buffer 19. The step size calculator 61A feeds the calculated step size to the step size modifier 63A.

When the picture_type code indicates that the current picture is a P-picture, the parity memory 53A feeds the previous picture parity for the previous picture block, i.e., the picture block located in the previously-processed I-picture or P-picture at the position of the current picture block in the current picture, to the step size modifier 63A.

When the picture_type code indicates that the current picture is a P-picture, the step size modifier 63A may modify the calculated step size determined by the step size generator 61A to provide the step size. For example, the step size modifier may compare the previous picture parity with the parity of the calculated step size. Then, if the parity of the calculated step size is the same as the previous picture parity, the step size modifier may invert the parity of the calculated step size to provide the step size. To do this, the step size modifier may toggle the least significant bit (LSB) of the calculated step size, as shown in Table 6 set forth above. However, if toggling the LSB of the calculated step size results in a step size of zero, the step size is set to two to avoid a step size of zero.

Alternatively and preferably, the step size modifier 63A may invert the previous picture parity received from the parity memory 53A, and, when the picture_type code indicates that the current picture is a P-picture, replace the least-significant bit of the calculated step size determined by the step size generator 61A by the inverted previous picture parity information to provide the step size. By replacing the least-significant bit of the calculated step size determined by the step size generator with the inverted previous picture parity, the parity of the step size will always be the inverse of the parity of the step size used to quantize the previous coefficient block.

The step size modifier 63A feeds the step size to the quantizer 12A, which quantizes the current coefficient block using the step size received from the step size modifier. The step size modifier 63A also feeds the step size to the variable-length coder 17 for inclusion in the compressed motion picture signal. Finally, the step size modifier 63 feeds the step size to the parity calculator 65, which calculates the parity of the step size fed to the quantizer 12, and feeds the resulting step size parity to the parity memory 53A. The parity memory 53A operates the same way as the QSC parity memory 53 shown in FIG. 6, and will not be described further.

Figure 19:
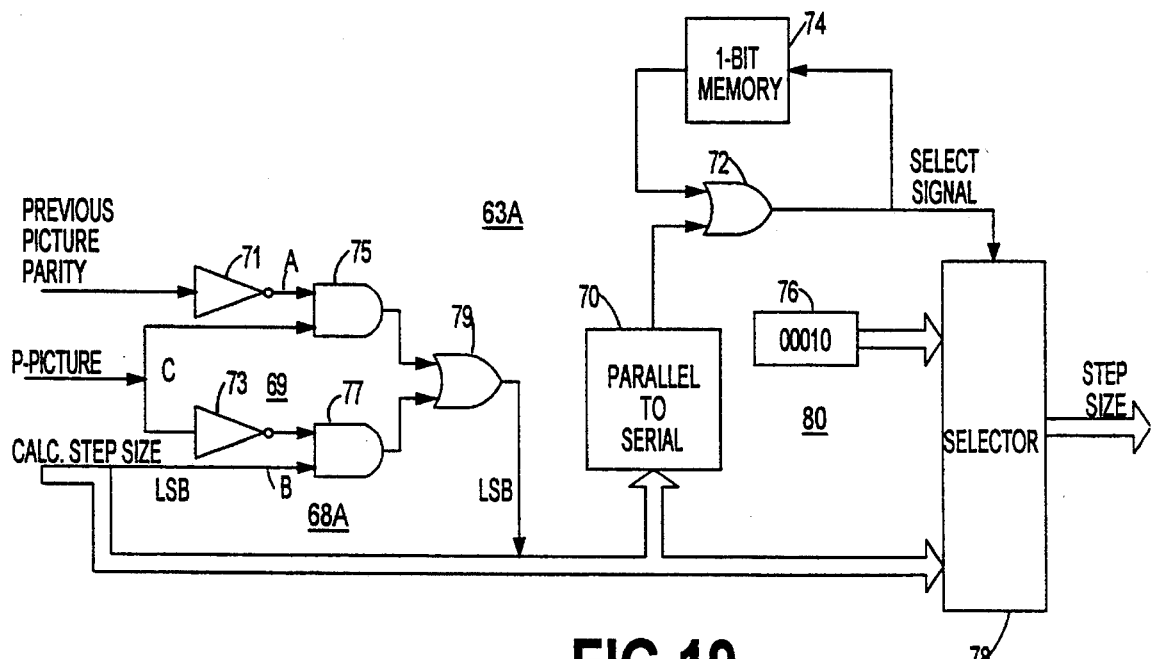
FIG. 19 is a block diagram showing an example of the step size modifier in the first embodiment of the step size controller according to the invention in the non-MPEG apparatus.

A block diagram of the step size modifier 63A is shown in FIG. 19. The structure and operation of the step size modifier shown in FIG. 19 is identical to the step size modifier shown in FIG. 7A, and will not be described again here. The parity of the step size can alternatively be modified using step size modifiers similar to those shown in FIGS. 7B and 7C.

The logical operation of the step size modifier shown in FIG. 19, for calculated step size values greater than one, is illustrated in Table 7.

TABLE 7

| Previous Picture Parity | LSB of Calculated Step Size | P-picture | LSB of Step Size |
|---|---|---|---|
| 0 | 0 | 1 | 1 |
| 0 | 1 | 1 | 1 |
| 1 | 0 | 1 | 0 |
| 1 | 1 | 1 | 0 |
| 0 | 0 | 0 | 0 |
| 0 | 1 | 0 | 1 |
| 1 | 0 | 0 | 0 |
| 1 | 1 | 0 | 1 |

Figure 20:
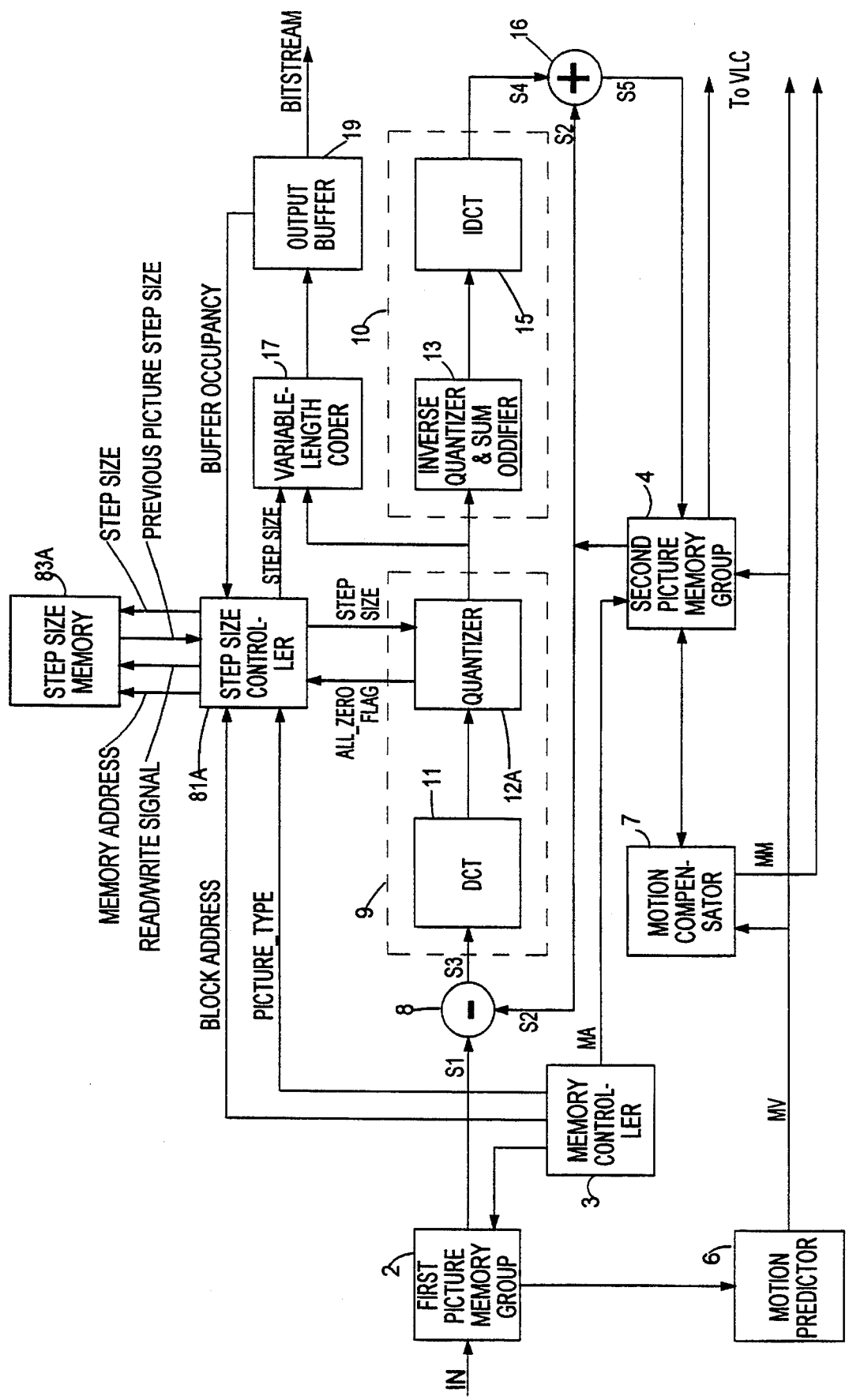
FIG. 20 is a block diagram showing the configuration of a non-MPEG motion picture signal compressor apparatus incorporating a second embodiment of the quantizing step size controller according to the invention.

A non-MPEG embodiment of the motion picture signal compressor shown in FIG. 8 is shown in FIG. 20. In the motion picture signal compressor shown in FIG. 20, elements corresponding to those in the motion picture signal compressor shown in FIG. 8 are indicated by the same reference numerals, and will not be described again here. Element similar to elements in the motion picture signal compressor shown in FIG. 8 are indicated by the same reference numeral with the letter "A" added. The motion picture signal compressor shown in FIG. 20 includes the step size controller 81A and the step size memory 83A.

Figure 21:
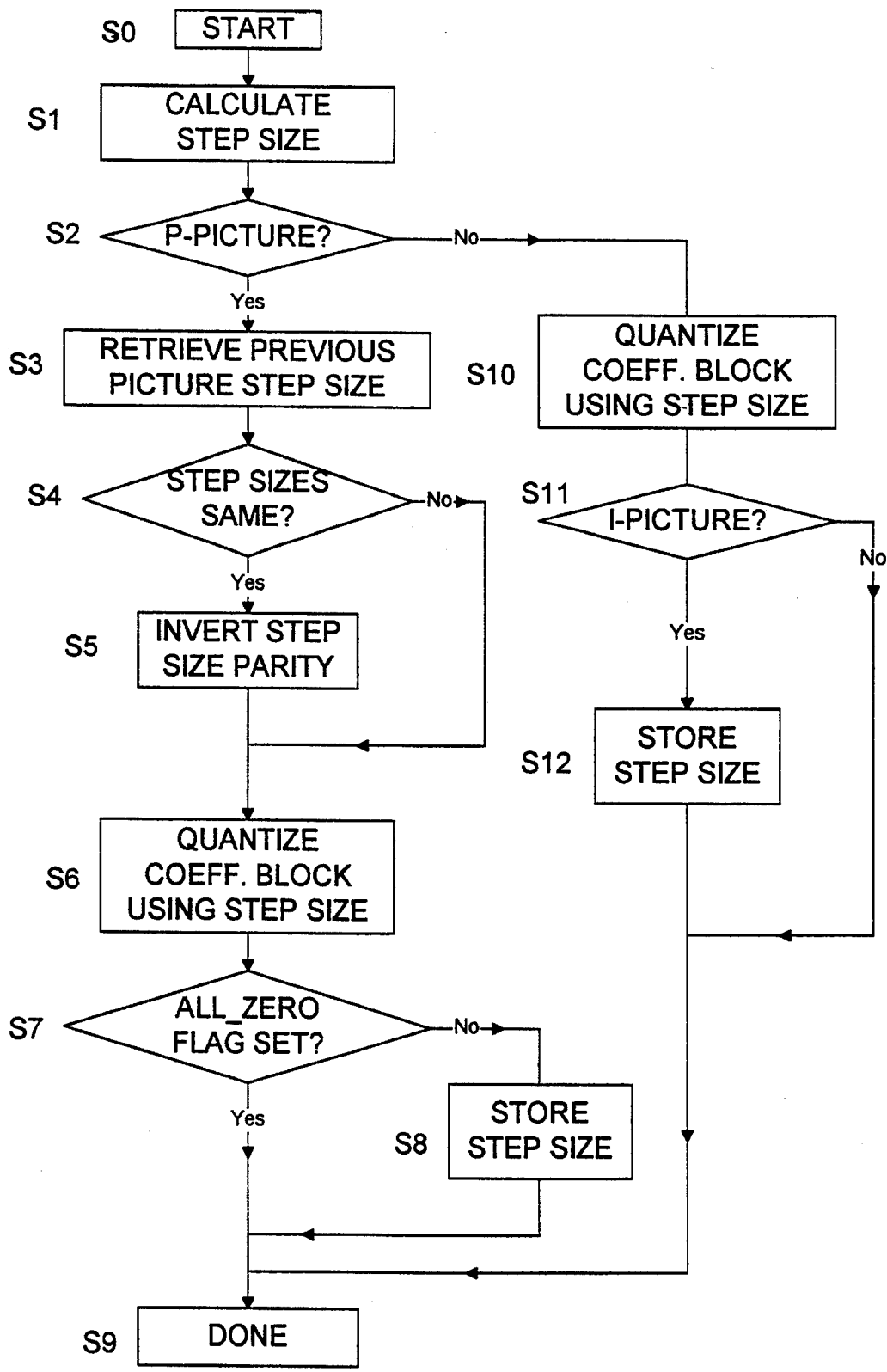
FIG. 21 is a flow chart illustrating the operation of the second embodiment of the step size controller according to the invention in the non-MPEG apparatus.

The step-size controller 81A may be implemented using a digital signal processor or a computer operating according to the flow chart shown in FIG. 21. In the flow chart shown in FIG. 21 is similar to the flow chart shown in FIG. 9. The differences will be described next.

At step S1, the step-size controller 81 determines the calculated step size for quantizing the DCT coefficients derived from the current picture block of the current picture, but the step size is not represented using a quantizer_scale_code and a qscale_type.

At step S3, the step size controller 81A retrieves from the step size memory 83A the stored previous picture step size, indicating the step size that was used to quantize the previous coefficient block.

At step S4, the step size controller 81A determines whether the calculated step size determined at step S1 is the same as the retrieved previous picture step size. If the result is YES, execution passes to step S5, where the step size controller modifies the calculated step size determined at step S1 to invert its parity. For example, the least-significant bit (LSB) of the step size may be toggled. However, if toggling the LSB of the step size results in a step size of zero, the step size is set to two, which has the opposite parity to a step size of one. The calculated step size with its LSB inverted is then adopted as the step size, and execution passes to step S6.

If the result at step S4 is NO, and the calculated step size determined at step S1 is different from the previous picture step size, the calculated step size determined at step S1 is adopted as the step size, and execution passes to step S6.

At step S6, step size controller 81 feeds the step size to the quantizer 12. The quantizer 12A quantizes the current coefficient block using the step size supplied by the step size controller, and checks to determine whether the resulting quantized coefficient block is an all-zero quantized coefficient block. If so, the quantizer sets the all_zero flag.

At step S8, the step size controller 81A stores the step size fed to the quantizer 12A in step S6 in the step size memory 83A for use as a previous picture step size when the next P-picture is processed.

At step S10, the step size controller 81A feeds the calculated step size determined at step S1 to the quantizer 12A. The quantizer quantizes the current coefficient block using the step size received from the step size controller.

At step S12, the step size controller 81A stores the step size fed to the quantizer 12A in step S10 in the step size memory 83A as a previous picture step size.

A hardware implementation of the step-size controller 81A will now be described with reference to FIG. 22. The step size controller includes the step size calculator 81A and the step size modifier 83A, which provide the step size for feeding to the quantizer 12A; and the read/write signal generator 67 and the address generator 69, which control reading and writing the previous picture step size into and out of the step size memory 83A.

Figure 10:
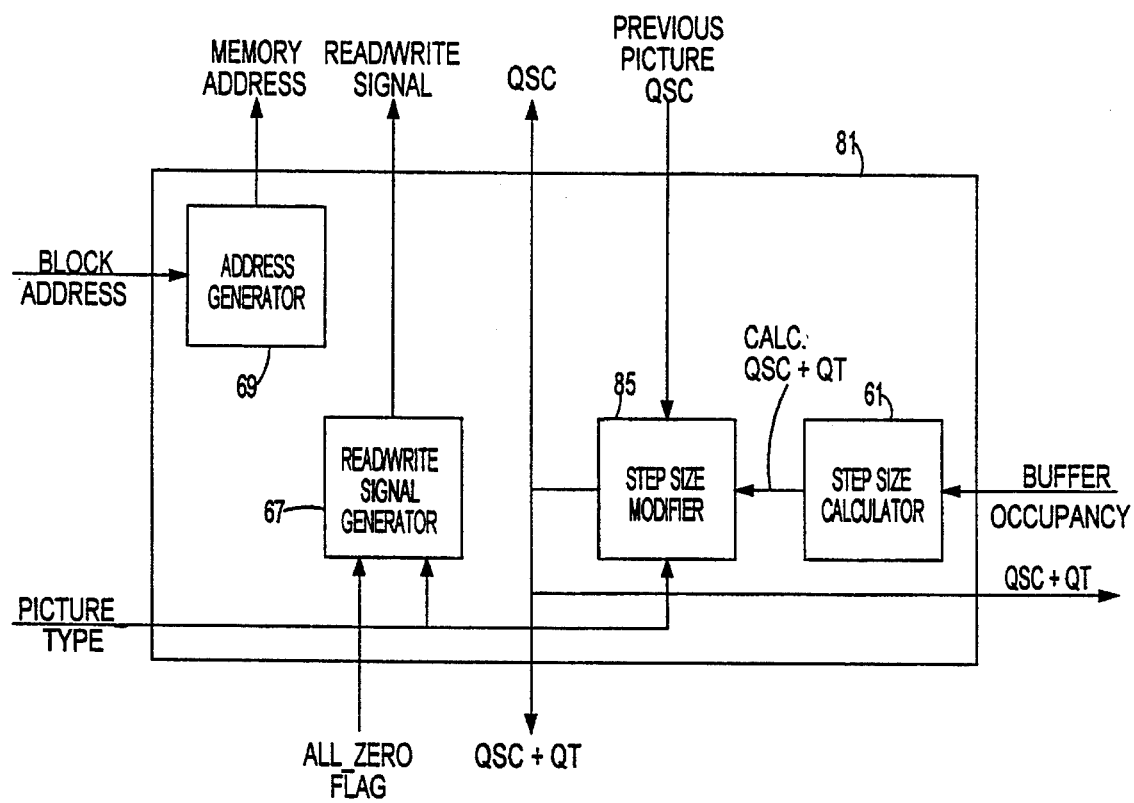
FIG. 10 is a block diagram showing a hardware implementation of the second embodiment of the step size controller according to the invention.
Figure 22:
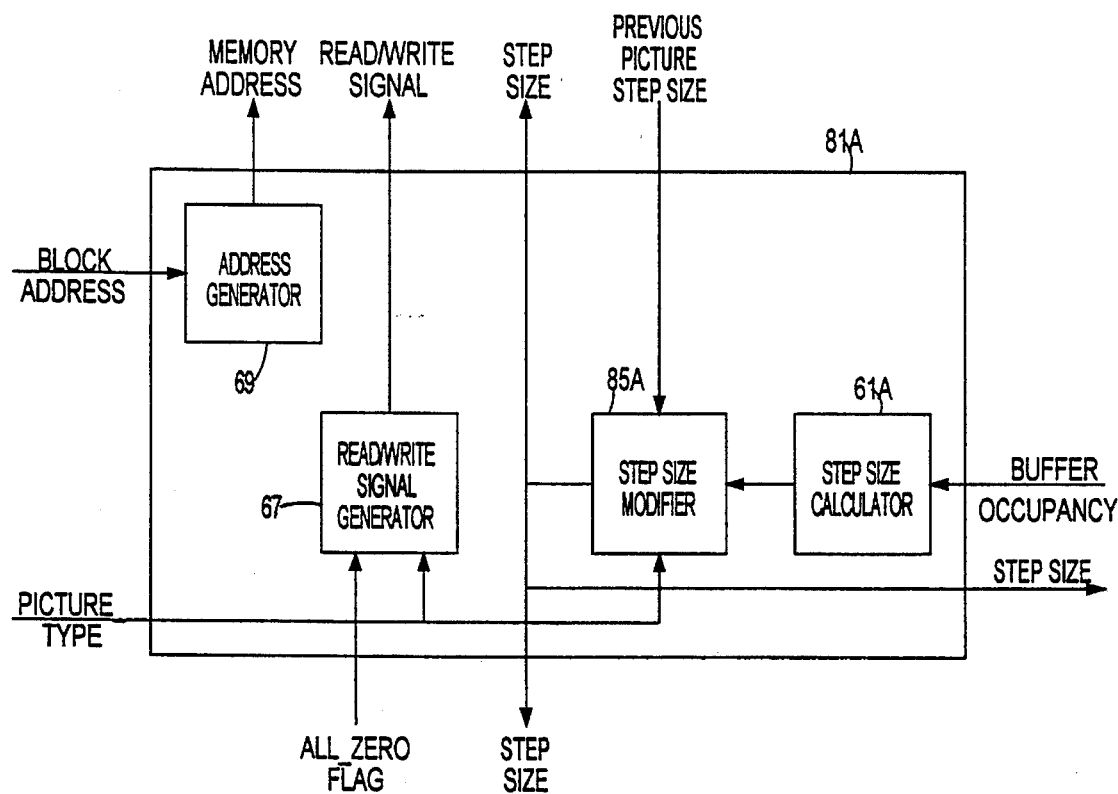
FIG. 22 is a block diagram showing a hardware implementation of the second embodiment of the step size controller according to the invention in the non-MPEG apparatus.

In the step size controller 81A shown in FIG. 22, elements corresponding to those in the step size controller shown in FIG. 10 are indicated by the same reference numerals, and will not be described again here. Elements similar to elements in the step size controller shown in FIG. 10 are indicated by the same reference numerals with the letter "A" added. Only the differences from the step size controller shown in FIG. 10 will be described.

The step size calculator 61A determines the calculated step size for quantizing the current coefficient block in response to buffer occupancy data from the output buffer 19 (FIG. 20). The step size calculator 61A feeds the calculated step size to the step size modifier 85A.

When the picture_type code indicates that the current picture is a P-picture, the step size memory 83A feeds the previous picture step size for the previous picture block, i.e., the picture block located in the previously-processed I-picture or P-picture at the position of the current picture block in the current picture, to the step size modifier 85A.

When the picture_type code indicates that the current picture is an I-picture or a P-picture, the step size modifier 85A passes unmodified the calculated step size determined by the step size generator 61A as the step size. On the other hand, when the picture_type code indicates that the current picture is a P-picture, the step size modifier may modify the calculated step size to provide the step size.

When the picture_type code indicates that the current picture is a P-picture, the step size modifier 85A compares the previous picture step size received from the step size memory 83A with the calculated step size determined by the step size generator 61A. If the step size modifier 85A determines that the calculated step size is the same as the previous picture step size, the step size modifier inverts the parity of the calculated step size to provide the step size. To do this, the step size modifier toggles the least significant bit (LSB) of the calculated step size, as shown in Table 8 set forth below. However, if toggling the LSB of the calculated step size results in a step size of zero, the step size is set to two to avoid a step size of zero.

The step size modifier 85A then feeds the step size to the quantizer 12A, which quantizes the current coefficient block using the step size received from the step size modifier. After quantizing the current coefficient block, the quantizer 12A checks to determine whether the resulting quantized coefficient block is an all-zero quantized coefficient block. If so, the quantizer sets the all_zero flag.

The step size modifier 85A also feeds the step size to the step size memory 83A. The step size memory 83A operates the same way as the QSC memory 83 shown in FIG. 10, and will not be described further.

The operation of the step size modifier, for values of the calculated step size greater than one, is illustrated in Table 8.

TABLE 8

| Previous Picture Step Size | Calculated Step Size (Calculated Step Size > 1) | P-Picture | Processing applied to LSB of Calculated Step Size |
|---|---|---|---|
| x | x | 1 | inverted |
| x | not x | 1 | unchanged |
| x | x | 0 | unchanged |
| x | not x | 0 | unchanged |

Figure 23:
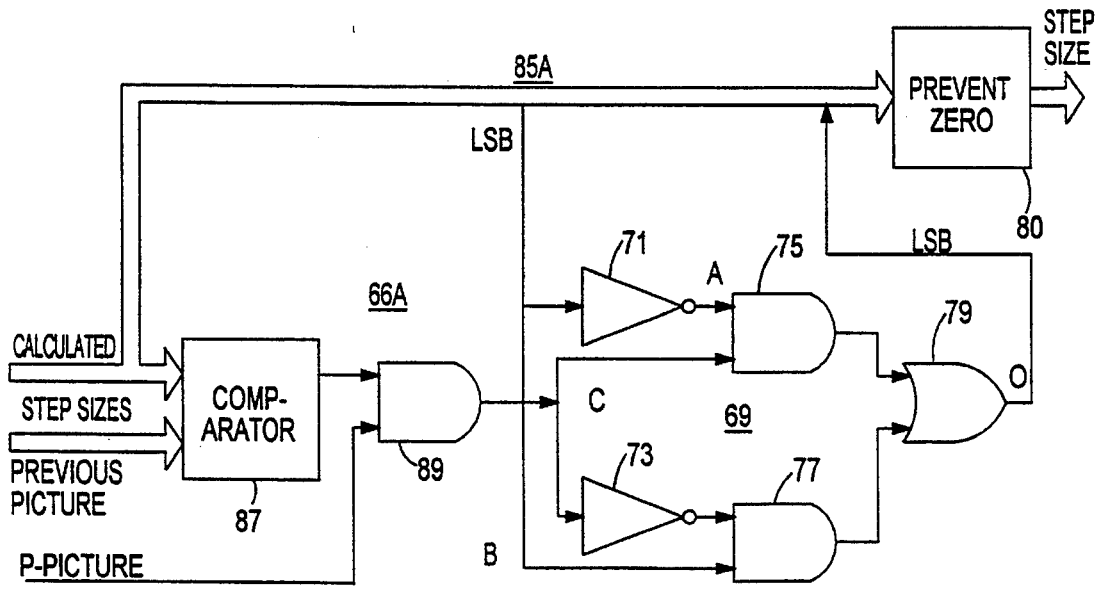
FIG. 23 is a block diagram showing the step size modifier in the second embodiment of the step size controller according to the invention in the non-MPEG apparatus.

A block diagram of the step size modifier 85A is shown in FIG. 23. The structure and operation of the step size modifier shown in FIG. 23 is identical to the step size modifier shown in FIG. 7A, and will not be described again here. The parity of the step size can alternatively be modified using step size modifiers similar to those shown in FIGS. 7B and 7C.

Figure 24:
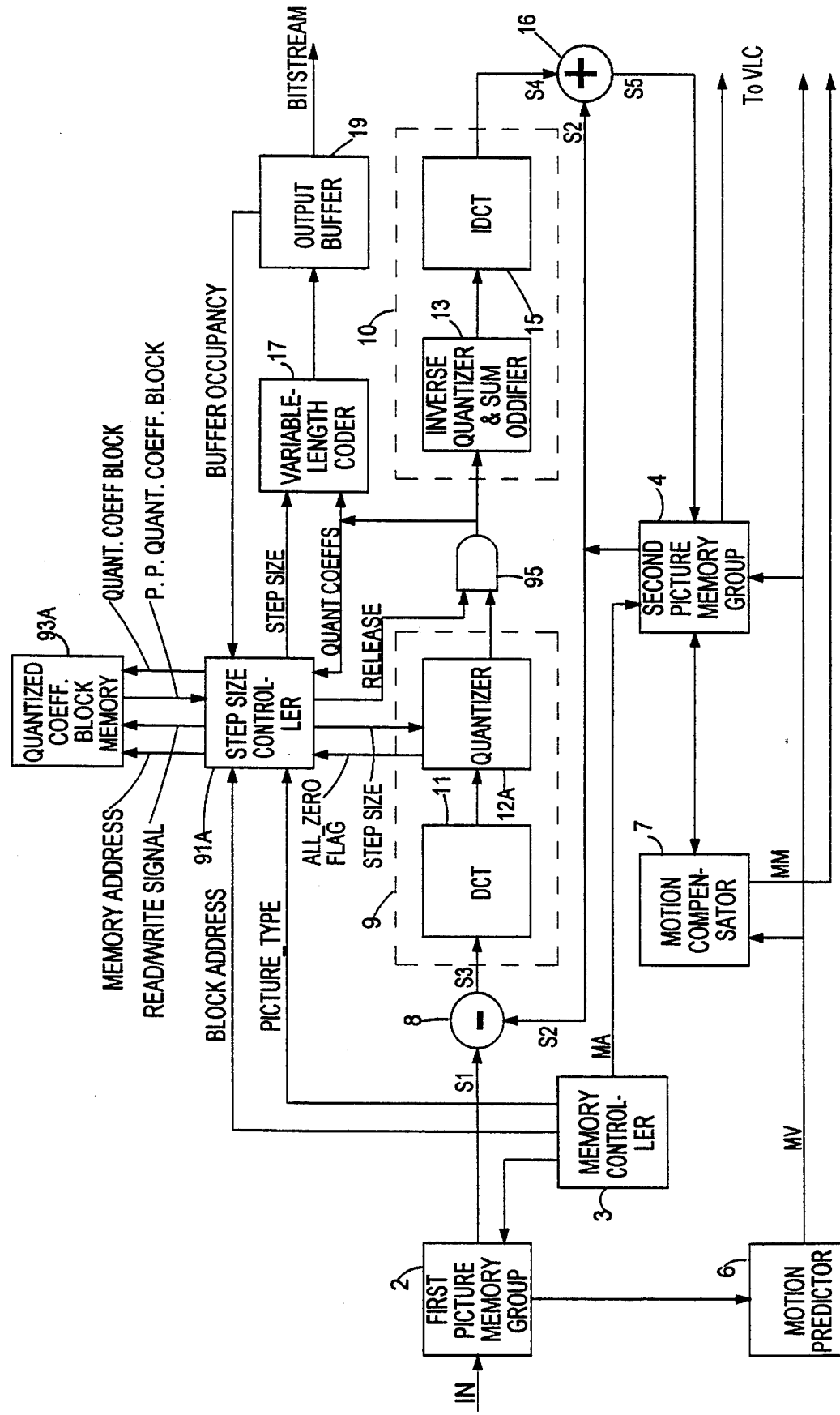
FIG. 24 is a block diagram showing the configuration of a non-MPEG motion picture signal compressor apparatus incorporating a third embodiment of the quantizing step size controller according to the invention.

A non-MPEG embodiment of the motion picture signal compressor shown in FIG. 12 is shown in FIG. 24. In the motion picture signal compressor shown in FIG. 24, elements corresponding to those in the motion picture signal compressor shown in FIG. 12 are indicated by the same reference numerals, and will not be described again here. Elements similar to elements in the motion picture signal compressor shown in FIG. 12 are indicated by the same reference numeral with the letter "A" added. The motion picture signal compressor shown in FIG. 24 includes the step size controller 91A, the step size memory 93A, and the AND-gate 95.

Figure 25:
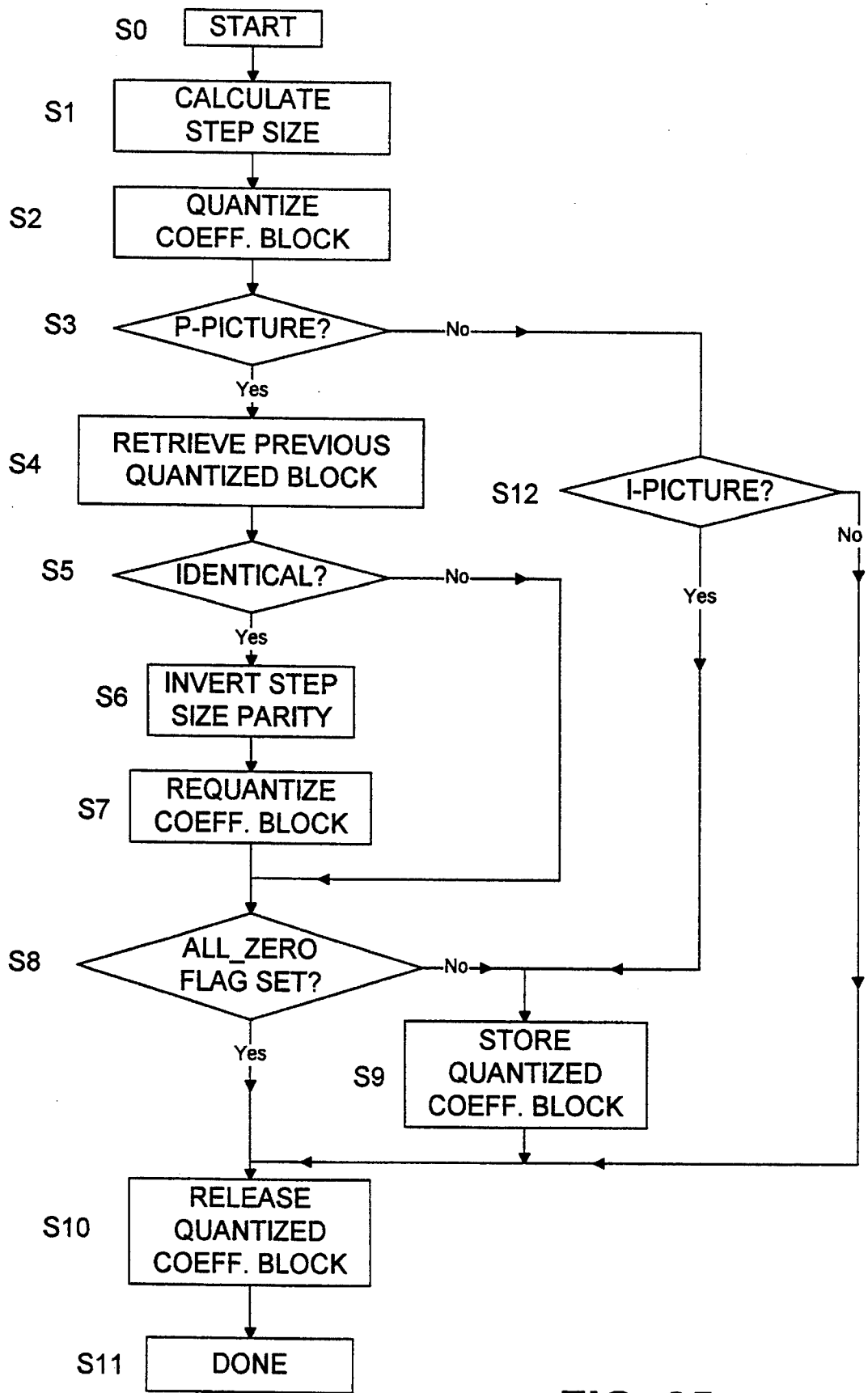
FIG. 25 is a flow chart illustrating the operation of the third embodiment of the step size controller according to the invention in the non-MPEG apparatus.

The step-size controller 91A may be implemented using a digital signal processor or a computer operating according to the flow chart shown in FIG. 25. In the flow chart shown in FIG. 25 is similar to the flow chart shown in FIG. 13. The differences will be described next.

In the flow chart shown in FIG. 25, at step S1, the step-size controller 91A determines the calculated step size for quantizing the current coefficient block, but the step size is not represented using a quantizer_scale_code and a qscale_type.

At step S2, the step-size controller 91A feeds the calculated step size determined in step S1 to the quantizer 12A, which quantizes the current coefficient block using the calculated step size, and feeds the resulting quantized coefficient block to the step size controller 91A. After quantizing the current coefficient block, the quantizer 12A checks to determine whether the resulting quantized coefficient block is an all-zero quantized coefficient block. If so, the quantizer sets the all_zero flag.

At step S6, the step size controller modifies the calculated step size determined at step S1 by inverting its parity to provide the step size. For example, the least-significant bit (LSB) of the step size may be toggled. However, if toggling the LSB of the step size results in a step size of zero, the step size is set to two, which has the opposite parity to a step size of one. The calculated step size with its LSB inverted is then adopted as the step size, and execution passes to step S7.

At step S7, the step size controller 91A feeds the step size generated at step S6 to the quantizer 12A. The quantizer 12A re-quantizes the current coefficient block using the step size supplied by the step size controller. After re-quantizing the current coefficient block, the quantizer 12A checks to determine whether the resulting quantized coefficient block is an all-zero quantized coefficient block. If so, the quantizer sets the all_zero flag.

A hardware implementation of the step-size controller 91A will now be described with reference to FIG. 26. The step size controller includes the step size calculator 91A and the step size modifier 93A, which provide the step size for feeding to the quantizer 12A; and the read/write signal generator 67 and the address generator 69, which control reading and writing the previous picture parity into and out of the quantized coefficient block memory 93A.

Figure 14:
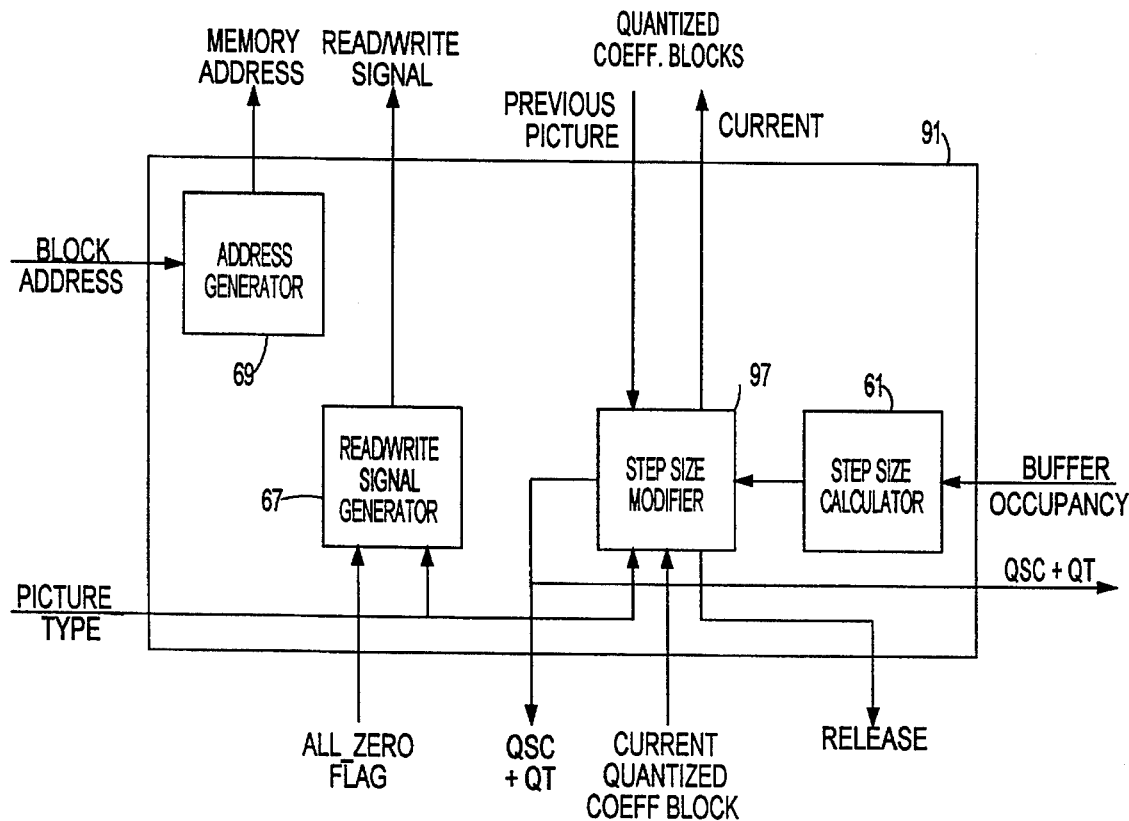
FIG. 14 is a block diagram showing a hardware implementation of the third embodiment of the step size controller according to the invention.
Figure 26:
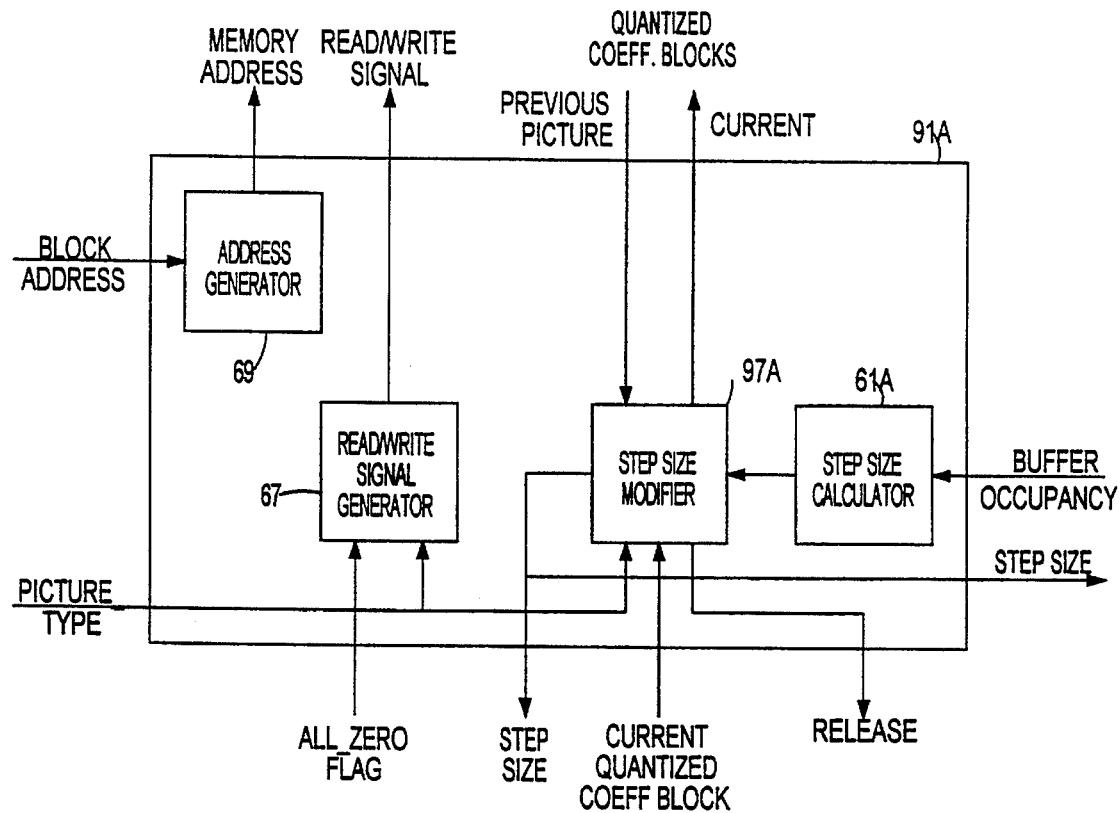
FIG. 26 is a block diagram showing a hardware implementation of the third embodiment of the step size controller according to the invention in the non-MPEG apparatus.

In the step size controller 91A shown in FIG. 26, elements corresponding to those in the step size controller shown in FIG. 14 are indicated by the same reference numerals, and will not be described again here. Elements similar to elements in the step size controller shown in FIG. 14 are indicated by the same reference numerals with the letter "A" added. Only the differences from the step size controller shown in FIG. 14 will be described.

The step size calculator 61A determines the calculated step size for quantizing the current coefficient block in response to buffer occupancy data from the output buffer 19 (FIG. 20). The step size calculator 61A feeds the calculated step size to the step size modifier 97A. The step size modifier passes the calculated step size to the quantizer 12A, which then quantizes the current coefficient block, and feeds the resulting quantized coefficient block to the step size modifier.

When the picture_type code indicates that the current picture is a P-picture, the quantized coefficient block memory 93A feeds the previous picture quantized coefficient block to the step size modifier 97A, where a coefficient by coefficient comparison is carried out with the quantized coefficient block received from the quantizer 12A. When the step size modifier determines that the quantized coefficient block from the quantizer 12A is identical to the previous picture quantized coefficient block, the step size modifier inverts the parity of the calculated step size received from the step size calculator 61A. To do this, the step size modifier toggles the least significant bit (LSB) of the calculated step size, as shown in Table 9 set forth below. However, if toggling the LSB of the calculated step size results in a step size of zero, the step size is set to two to avoid a step size of zero.

The step size modifier 97A then feeds the parity-inverted step size to the quantizer 12A, which re-quantizes the current coefficient block using the step size received from the step size modifier.

The operation of the step size modifier 97A, for values of the calculated step size greater than one, is illustrated in Table 9.

TABLE 9

| Quantized Coefficient Block | Previous Picture Quantized Coefficient Block | P-PICTURE | Processing Applied to LSB of Calculated Step Size (Calc. Step Size > 1) |
|---|---|---|---|
| $F_{0,0}-F_{7,7}$ | identical | 1 | inverted |
| $F_{0,0}-F_{7,7}$ | different | 1 | unchanged |
| $F_{0,0}-F_{7,7}$ | identical | 0 | unchanged |
| $2F_{0,0}-F_{7,7}$ | different | 0 | unchanged |

Figure 27:
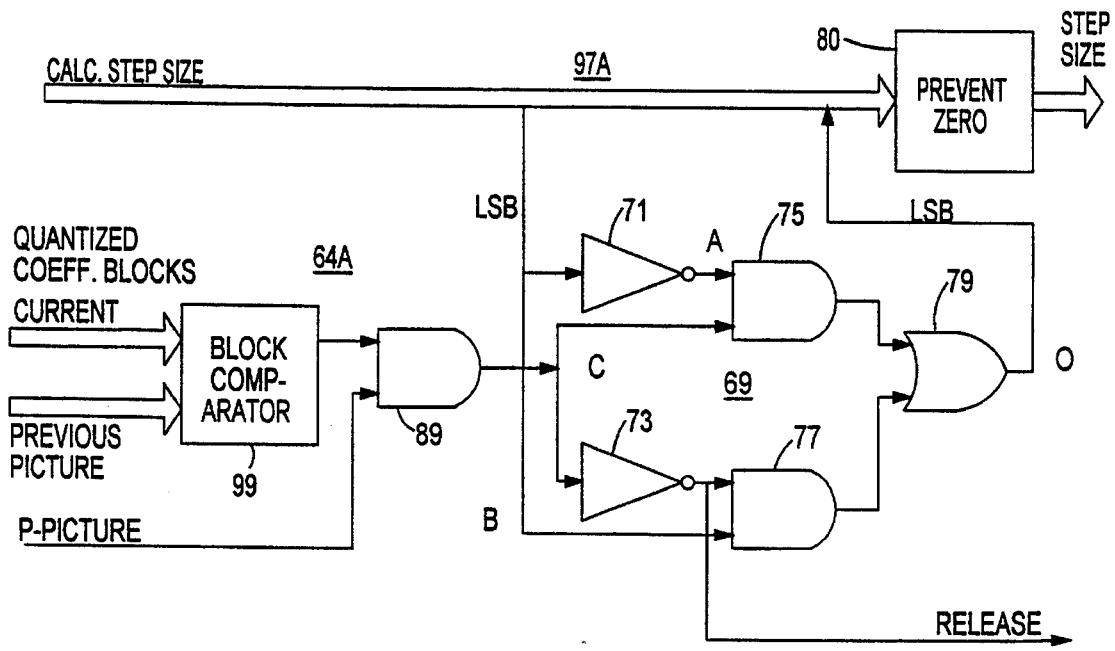
FIG. 27 is a block diagram showing the step size modifier in the third embodiment of the step size controller according to the invention in the non-MPEG apparatus.

A block diagram of an example of the step size modifier 97A is shown in FIG. 27. The structure and operation of the step size modifier shown in FIG. 27 is identical to the step size modifier shown in FIG. 7A, and will not be described again here. The parity of the step size can alternatively be modified using step size modifiers similar to those shown in FIGS. 7B and 7C.

Figure 28:
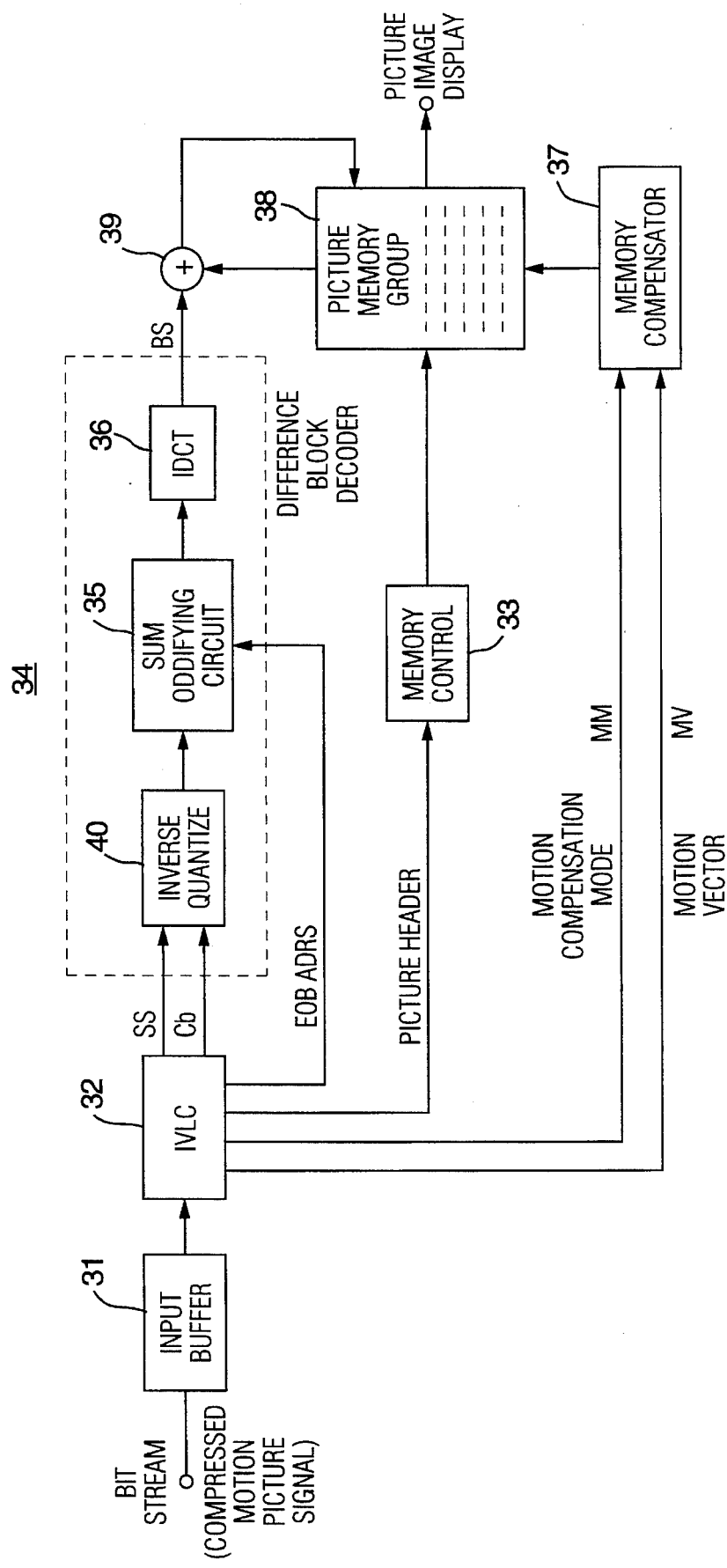
FIG. 28 is a block diagram showing a compressed motion picture expander for expanding the compressed motion picture signal generated by the motion picture signal compressor incorporating the step size controller according to the invention.

A compressed motion picture signal expander that will expand the compressed motion picture signal generated by the motion picture signal compressor described above will now be described with reference to FIG. 28. In FIG. 28, the compressed motion picture signal is received as a bit stream. The compressed motion picture signal may originate from a transmission medium or may be reproduced from a suitable recording medium, such as an optical disc. The bit stream is fed into the input buffer 31, where it is temporarily stored, and whence it is read out, picture-by-picture, into the inverse variable-length coder (the "IVLC") 32. The inverse variable-length coder 32 extracts from the compressed motion picture signal the header information of respective layers of the MPEG coding, and from the header information, extracts the picture decoding control information PH, which it feeds to the memory controller 33.

The IVLC 32 applies inverse variable-length coding to the blocks of variable-length coded DCT coefficients to provide blocks of quantized DCT coefficients including the current quantized coefficient block Cb. The quantized coefficient block Cb is delivered to the difference block decoder 34. The difference block decoder 34 decodes the quantized coefficient block Cb to provide the restored difference block BS, and feeds the restored difference block to the adder 39.

The IVLC 32 also extracts from the compressed motion picture signal the motion vector MV and the motion compensation mode MM for the quantized coefficient block Cb, and feeds them to the motion compensator 37. The IVLC 32 also extracts from the compressed motion picture signal the quantizing step size SS for each block, and feeds it to the inverse quantizer 40. The step size is represented by the quantizer_scale_code (QSC) and the qscale_type (QT). The motion compensator 37 causes the picture memory group 38 to read out a matching block for the restored difference block BS.

The picture memory block 38 includes several picture memories, each of which stores one already-reconstructed picture. The matching block BS is a block of the reconstructed picture stored in one of the picture memories at the address specified by the motion vector MV. The picture memory in the picture memory group 38 storing the reconstructed picture from which the matching block is read is specified by the memory controller 33.

As mentioned above, a picture can be coded by prediction coding using, as a reference picture, a previous reconstructed picture, a following reconstructed picture, or a block obtained by performing a pixel-by-pixel linear operation on a previous reconstructed picture and a following reconstructed picture. Finally, a picture may be coded using no prediction at all. In this case, the matching block provided by the picture memory group 38 is a zero block, i.e., a block in which all the pixel values are set to zero. The motion-compensated matching blocks provided by the picture memory group 38 are adaptively modified, and the optimum one is selected for each block. This process is carried out using a macroblock having a block size of 16×16 pixels.

The matching block provided by the picture memory group 38 is fed to the adder 39. The adder 39 performs a pixel-by-pixel addition between the restored difference block BS received from the difference block decoder 34, and the matching block provided by the picture memory group 38. The result of this addition is a reconstructed picture block, which is stored in the one of the picture memories in the picture memory group 38 specified by the memory controller 33. The reconstructed picture blocks produced by the adder 39 are stored one-by-one in the selected picture memory, overwriting the reconstructed picture previously stored in the picture memory, to form a new reconstructed picture. The new reconstructed picture will be used as a reference picture for prediction decoding other pictures of the motion picture signal.

The reconstructed pictures stored in the picture memory group 38 are read out in a sequence controlled by an output picture indication signal provided by the memory controller 33. The read out pictures are fed, as the motion picture output signal, to a suitable picture display, e.g., a video monitor. The picture display displays a motion picture in response to the motion picture output signal.

The difference block decoder 34 will now be described with reference to FIG. 28. The difference block decoder 34 comprises the inverse quantizer 40, the sum oddifying circuit 35, and the inverse discrete cosine transform circuit 36. The inverse quantizer 40 uses the step size represented by the QSC and the QT received from the IVLC 32 to inversely quantize the quantized coefficient block Cb received from the inverse variable-length coder 32. Because consecutive identical coefficient blocks were quantized using different quantizing step sizes in the compressor, the quantized coefficient blocks generated by the inverse quantizer 40 will not produce repetitive Type (1) mismatch errors when they are inversely orthogonally transformed by the inverse orthogonal transform circuit 36.

Before each dequantized coefficient block is inversely orthogonally transformed by the inverse orthogonal transform circuit 36, the sum oddifying circuit 35 performs a sum oddifying operation on it to prevent a Type (2) mismatch error from occurring in the IDCT processing by the IDCT circuit 36. The IDCT circuit 36 applies IDCT processing to each block of sum-oddified DCT coefficients from the sum oddifying circuit 35, and the resulting recovered difference blocks fed to the adder 39. Since the recovered difference blocks are free of both cumulative Type (1) mismatch errors and Type (2) mismatch errors; the reconstructed picture blocks produced by the adder 39 are also free of such defects. The motion picture output signal derived from the reconstructed pictures stored in the picture memory group are also free of such defects.

Although illustrative embodiments of the invention have been described herein in detail, it is to be understood that the invention is not limited to the precise embodiments described, and that various modifications may be practiced within the scope of the invention defined by the appended claims.

I claim:

1. A method of quantizing coefficient blocks of DCT coefficients representing a motion picture signal to prevent repetitive mismatch errors, the coefficient blocks including a current coefficient block derived from a current picture block having a position in a current picture, and a previous coefficient block derived from a previous picture block located in a previous picture at the position of the current picture block in the current picture, the current picture being a P-picture, the previous picture being one of a P-picture and an I-picture processed immediately before the current picture, the method comprising the steps of:

quantizing the previous coefficient block using a previous step size;

calculating a current step size for quantizing the current coefficient block;

determining when the current step size calculated in the calculating step is equal to the previous step size to generate an equality indication;

in response to the equality indication, setting a corrected step size to be different from the current step size calculated in the calculating step, and otherwise setting the corrected step size to be equal to the current step size; and quantizing the current coefficient block using the corrected step size.

2. The method of claim 1, wherein the coefficient blocks additionally include a prior-previous coefficient block derived from a prior-previous picture block located in a prior-previous picture at the position of the current picture block in the current picture, the prior-previous picture being one of an I-picture and a P-picture processed immediately before the previous picture, the prior-previous coefficient block being quantized using a prior-previous step size, and wherein:

the step of quantizing the previous coefficient block using a previous step size:
results in a previous quantized coefficient block, and
includes a step of testing when the previous quantized coefficient block is an all-zero quantized coefficient block; and when the testing step indicates that the previous quantized coefficient block is an all-zero quantized coefficient block, the determining step determines when the current step size calculated in the calculating step is equal to the prior-previous step size to generate the equality indication instead of determining when the current step size is equal to the previous step size.

3. The method of claim 2, wherein the prior-previous step size is stored as a stored step size, and wherein:

when the testing step indicates that the previous quantized coefficient block is not an all-zero quantized coefficient block, the step of quantizing the previous coefficient block additionally includes a step of storing the previous step size as the stored step size to overwrite the prior-previous step size; and the determining step determines when the current step size is equal to the stored step size to generate the equality indication.

4. The method of claim 2, wherein a prior previous quantized coefficient block obtained by quantizing the prior-previous coefficient block using the prior-previous step size is stored as a stored quantized coefficient block, and wherein:

when the testing step indicates that the previous quantized coefficient block is not an all-zero quantized coefficient block, the step of quantizing the previous coefficient block additionally includes a step of storing the previous quantized coefficient block as the stored quantized coefficient block to overwrite the prior-previous quantized coefficient block; and the determining step determines when the current quantized coefficient block is identical to the stored quantized coefficient block to generate the equality indication.

5. The method of claim 1, wherein the coefficient blocks additionally include a prior-previous coefficient block derived from a prior-previous picture block located in a prior-previous picture at the position of the current picture block in the current picture, the prior-previous picture being one of an I-picture and a P-picture processed immediately before the previous picture, the prior-previous coefficient block being quantized using a prior-previous step size, and wherein:

the prior-previous step size, the previous step size, and the current step size each have a parity;

the step of quantizing the previous coefficient block using a previous step size:
results in a previous quantized coefficient block, and
includes a step of testing when the previous quantized coefficient block is an all-zero quantized coefficient block;

when the testing step indicates that the previous quantized coefficient block is an all-zero quantized coefficient block, the determining step determines whether the parity of the current step size is equal to the parity of the prior-previous step size to generate the equality indication and otherwise determines when the parity of the current step size is equal to the parity of the previous step size to generate the equality indication; and the setting step includes a step of changing the parity of the current step size to set the corrected step size to be different from the current step size.

6. The method of claim 5, wherein the prior-previous step size has a prior-previous step size parity, and the prior-previous step size parity is stored as a stored step size parity, and wherein:

when the testing step indicates that the previous quantized coefficient block is not an all-zero quantized coefficient block, the step of quantizing the previous coefficient block additionally includes a step of storing the previous step size parity as the stored step size parity to overwrite the prior-previous step size parity; and the determining step determines when the current step size parity is equal to the stored step size parity to generate the equality indication.

7. The method of claim 1, wherein:

the current step size calculated by the calculating step has a least-significant bit;

the determining step includes steps of:
determining a parity of the previous step size, the parity being represented by a parity bit, and
inverting the parity bit to provide an inverted parity bit; and the setting step includes a step of replacing the least-significant bit of the current step size with the inverted parity bit to provide the corrected step size.

8. The method of claim 1, wherein:

the determining step includes steps of:
determining a parity of the previous step size to provide a previous parity,
determining a parity of the current step size to provide a current parity, and
comparing the previous parity and the current parity, and
generating the equality indication when the comparing step determines that the previous parity is equal to the current parity; and the setting step includes a step of inverting the parity of the current step size in response to the equality indication to set the corrected step size to be different from the current step size.

9. The method of claim 8, wherein the step of inverting the parity of the current step size includes steps of:

storing a parity-inverted step size for each step size;

reading out the stored parity-inverted step size in response to the current step size; and selecting the read out parity-inverted step size as the corrected step size.

10. The method of claim 8, wherein:

the current step size includes a least-significant bit; and the step of inverting the parity of the current step size includes steps of:
 inverting the least-significant bit of the current step size to provide a parity-inverted current step size,
 testing whether the parity-inverted current step size is equal to zero,
 if the testing step determines that the parity-inverted current step size is equal to zero, setting the parity-inverted current step size to two, and
 providing the parity-inverted current step size as the corrected step size.

11. The method of claim 8, wherein:

the current step size has a maximum value; and the step of inverting the parity of the current step size includes steps of:
 adding one to the current step size to provide a parity-inverted current step size,
 testing whether the parity-inverted current step size is greater than the maximum value,
 if the testing step determines that the parity-inverted current step size is greater than the maximum value, setting the parity-inverted current step size to a value of one less than the maximum value, and
 providing the parity-inverted current step size as the corrected step size.

12. The method of claim 8, wherein the step of inverting the parity of the current step size includes steps of:
 subtracting one from the current step size to provide a parity-inverted current step size;
 testing whether the parity-inverted current step size is equal to zero;
 if the testing step determines that the parity-inverted current step size is equal to zero, setting the parity-inverted current step size to two; and
 providing the parity-inverted current step size as the corrected step size.

13. The method of claim 1, wherein:

the determining step includes steps of:
 comparing the current step size with the previous step size, and
 generating the equality indication when the comparing step determines that the current step size is equal to the previous step size; and the setting step includes a step of inverting the parity of the current step size in response to the equality indication to set the corrected step size to be different from the current step size.

14. The method of claim 1, wherein:

the step of quantizing the previous coefficient block using a previous step size provides a previous quantized coefficient block;

the current step size calculated in the calculating step has a parity;

the step of quantizing the current coefficient block includes a first stage in which the current coefficient block is quantized using the current step size calculated in the calculating step to provide a current quantized coefficient block;

the determining step includes steps of:
 comparing the current quantized coefficient block with the previous quantized coefficient block, and
 generating the equality indication when the comparing step determines that the current quantized coefficient block is identical to the previous quantized coefficient block; and in response to the equality indication:
 the setting step includes a step of inverting the parity of the current step size to set the corrected step size to be different from the current step size, and
 the step of quantizing the current coefficient block additionally includes a second stage comprising a step of re-quantizing the current quantized coefficient block using the corrected step size determined in the setting step.

15. The method of claim 1, wherein:

in the step of quantizing the previous coefficient block, the previous step size is represented by a previous quantizer_scale_code;

the current step size calculated by the calculating step is represented by a current quantizer_scale_code, the current quantizer_scale_code including a least-significant bit;

the determining step includes steps of:
 determining a parity of the previous quantizer_scale_code, the parity being represented by a parity bit, and
 inverting the parity bit to provide an inverted parity bit;

the setting step includes a step of replacing the least-significant bit of the current quantizer_scale_code with the inverted parity bit to provide a corrected quantizer_scale_code representing the corrected step size; and in the step of quantizing the current coefficient block, the current coefficient block is quantized using the corrected step size represented by the corrected quantizer_scale_code.

16. The method of claim 1, wherein:

in the step of quantizing the previous coefficient block, the previous step size is represented by a previous quantizer_scale_code;

the current step size calculated by the calculating step is represented by a current quantizer_scale_code;

the determining step includes steps of:
 determining a parity of the previous quantizer_scale_code to provide a previous parity,
 determining a parity of the current quantizer_scale_code to provide a current parity,
 comparing the previous parity and the current parity, and
 generating the equality indication when the comparing step determines that the previous parity is equal to the current parity;

the setting step includes a step of inverting the parity of the current quantizer_scale_code in response to the equality indication to provide a corrected quantizer_scale_code representing the corrected step size; and in the step of quantizing the current coefficient block, the current coefficient block is quantized using the corrected step size represented by the corrected quantizer_scale_code.

17. The method of claim 16, wherein the step of inverting the parity of the current quantizer_scale_code includes steps of:
 storing a parity-inverted quantizer_scale_code for each quantizer_scale_code;
 reading out the stored parity-inverted quantizer_scale_code in response to the current quantizer_scale_code; and
 selecting the read out parity-inverted quantizer_scale_code as the corrected quantizer_scale_code.

18. The method of claim 16, wherein:

the current quantizer_scale_code includes a least-significant bit; and the step of inverting the parity of the current quantizer_scale_code includes steps of:
  inverting the least-significant bit of the current quantizer_scale_code to provide a parity-inverted current quantizer_scale_code,
  testing whether the parity-inverted current quantizer_scale_code is equal to zero,
  if the testing step determines that the parity-inverted current quantizer_scale_code is equal to zero, setting the parity-inverted current quantizer_scale_code to two, and
  providing the parity-inverted current quantizer_scale_code as the corrected quantizer_scale_code.

19. The method of claim 16, wherein:

the quantizer_scale_code has a maximum value; and the step of inverting the parity of the current quantizer_scale_code includes steps of:
  adding one to the current quantizer_scale_code to provide a parity-inverted current quantizer_scale_code,
  testing whether the parity-inverted current quantizer_scale_code is greater than the maximum value,
  if the testing step determines that the parity-inverted current quantizer_scale_code is greater than the maximum value, setting the parity-inverted current quantizer_scale_code to a value of one less than the maximum value, and
  providing the parity-inverted current quantizer_scale_code as the corrected quantizer_scale_code.

20. The method of claim 16, wherein the step of inverting the parity of the current quantizer_scale_code includes steps of:
  subtracting one from the current quantizer_scale_code to provide a parity-inverted current quantizer_scale_code;
  testing whether the parity-inverted current quantizer_scale_code is equal to zero;
  if the testing step determines that the parity-inverted current quantizer_scale_code is equal to zero, setting the parity-inverted current quantizer_scale_code to two; and
  providing the parity-inverted current quantizer_scale_code as the corrected quantizer_scale_code.

21. The method of claim 1, wherein:

in the step of quantizing the previous coefficient block, the previous step size is represented by a previous quantizer_scale_code;

the current step size calculated by the calculating step is represented by a current quantizer_scale_code;

the determining step includes steps of:
  comparing the current quantizer_scale_code with the previous quantizer_scale_code, and
  generating the equality indication when the comparing step determines that the current quantizer_scale_code is equal to the previous quantizer_scale_code;

the setting step includes a step of inverting the parity of the current quantizer_scale_code in response to the equality indication to provide a corrected quantizer_scale_code representing the corrected step size; and in the step of quantizing the current coefficient block, the current coefficient block is quantized using the corrected step size represented by the corrected quantizer_scale_code.

22. The method of claim 1, wherein:

the step of quantizing the previous coefficient block using a previous step size provides a previous quantized coefficient block;

in the step of quantizing the previous coefficient block, the previous step size is represented by a previous quantizer_scale_code;

the current step size calculated by the calculating step is represented by a current quantizer_scale_code, the current quantizer_scale_code having a parity;

the step of quantizing the current coefficient block includes a first stage in which the current coefficient block is quantized using the current step size calculated in the calculating step and represented by the current quantizer_scale_code to provide a current quantized coefficient block;

the determining step includes steps of:
  comparing the current quantized coefficient block with the previous quantized coefficient block, and
  generating the equality indication when the comparing step determines that the current quantized coefficient block is equal to the previous quantized coefficient block;

in response to the equality indication:
  the setting step includes a step of inverting the parity of the current quantizer_scale_code to provide a parity-inverted current quantizer_scale_code representing the corrected step size, and
  the step of quantizing the current coefficient block additionally includes a second stage comprising a step of re-quantizing the current quantized coefficient block using the corrected step size represented by the parity-inverted current quantizer_scale_code.

23. The method of claim 1, wherein:

in the step of quantizing the previous coefficient block, the previous step size is represented by a previous quantizer_scale_code;

the current step size calculated by the calculating step is represented by a current quantizer_scale_code;

in the setting step, the corrected step size is represented by a corrected quantizer_step_code; and in the step of quantizing the current coefficient block, the current coefficient block is quantized using the corrected step size represented by the corrected quantizer_scale_code.

24. The method of claim 23, wherein the coefficient blocks additionally include a prior-previous coefficient block derived from a prior-previous picture block located in a prior-previous picture at the position of the current picture block in the current picture, the prior-previous picture being one of an I-picture and a P-picture processed immediately before the previous picture, the prior-previous coefficient block being quantized using a prior-previous step size represented by a prior-previous quantizer_scale_code, and wherein:

the step of quantizing the previous coefficient block using the previous step size:
  results in a previous quantized coefficient block, and
  includes a step of testing when the previous quantized coefficient block is an all-zero quantized coefficient block; and when the testing step indicates that the previous quantized coefficient block is an all-zero quantized coefficient block, the determining step determines when the current quantizer_scale_code is equal to the prior-previous quantizer_scale_code to generate the equality indication instead of determining when the current quantizer_scale_code is equal to the previous quantizer_scale_code; and the setting step includes a step of changing the current quantizer_scale_code in response to the equality indication to provide a corrected quantizer_scale_code representing the corrected step size.

25. The method of claim 24, wherein the prior-previous quantizer_scale_code is stored as a stored quantizer_scale_code, and wherein:

when the testing step indicates that the previous quantized coefficient block is not an all-zero quantized coefficient block, the step of quantizing the previous coefficient block additionally includes a step of storing the previous quantizer_scale_code as the stored quantizer_scale_code to overwrite the prior-previous quantizer_scale_code; and the determining step determines when the current quantizer_scale_code is equal to the stored quantizer_scale_code to generate the equality indication.

26. The method of claim 24, wherein a prior previous quantized coefficient block obtained by quantizing the prior-previous coefficient block using the prior-previous step size is stored as a stored quantized coefficient block, and wherein:

when the testing step indicates that the previous quantized coefficient block is not an all-zero quantized coefficient block, the step of quantizing the previous coefficient block additionally includes a step of storing the previous quantized coefficient block as the stored quantized coefficient block to overwrite the prior-previous quantized coefficient block; and the determining step determines when the current quantized coefficient block is identical to the stored quantized coefficient block to generate the equality indication.

27. The method of claim 23, wherein the coefficient blocks additionally include a prior-previous coefficient block derived from a prior-previous picture block located in a prior-previous picture at the position of the current picture block in the current picture, the prior-previous picture being one of an I-picture and a P-picture processed immediately before the previous picture, the prior-previous coefficient block being quantized using a prior-previous step size represented by a prior-previous quantizer_scale_code, and wherein:

the prior-previous quantizer_scale_code, the previous quantizer_scale_code, and the current quantizer_scale_code each have a parity;

the step of quantizing the previous coefficient block using a previous step size:

results in a previous quantized coefficient block, and includes a step of testing when the previous quantized coefficient block is an all-zero quantized coefficient block;

when the testing step indicates that the previous quantized coefficient block is an all-zero quantized coefficient block, the determining step determines when the parity of the current quantizer_scale_code is equal to the parity of the prior-previous quantizer_scale_code and otherwise determines when the parity of the current quantizer_scale_code is equal to the parity of the previous quantizer_scale_code to generate the equality indication; and the setting step includes a step of changing the parity of the current quantizer_scale_code in response to the equality indication to provide a corrected quantizer_scale_code representing the corrected step size.

28. The method of claim 27, wherein the prior-previous quantizer_scale_code has a prior-previous quantizer_scale_code parity, and the prior-previous quantizer_scale_code parity is stored as a stored quantizer_scale_code parity, and wherein:

when the testing step indicates that the previous quantized coefficient block is not an all-zero quantized coefficient block, the step of quantizing the previous coefficient block additionally includes a step of storing the previous quantizer_scale_code parity as the stored quantizer_scale_code parity to overwrite the prior-previous quantizer_scale_code parity; and the determining step determines when the current quantizer_scale_code parity is equal to the stored quantizer_scale_code parity to generate the equality indication.

29. Apparatus for quantizing coefficient blocks of DCT coefficients representing a motion picture signal to prevent repetitive mismatch errors, the coefficient blocks including a current coefficient block derived from a current picture block having a position in a current picture, and a previous coefficient block derived from a previous picture block located in a previous picture at the position of the current picture block in the current picture, the current picture being a P-picture, the previous picture being one of a P-picture and an I-picture processed immediately preceding the current picture, the apparatus comprising:

step size control means for generating a corrected step size for quantizing each coefficient block, the step size control means including:

step size calculating means for calculating a current step size for the current coefficient block, equality determining means for determining when the current step size calculated for the current coefficient block by the step size calculating means is equal to a previous step size to generate an equality indication, the previous step size being a step size with which the previous coefficient block is quantized, step size setting means for setting the corrected step size to be different from the current step size in response to the equality indication from the equality determining means, and otherwise for setting the corrected step size to be equal to the current step size; and a quantizer, the quantizer receiving each coefficient block, and receiving the corrected step size for the coefficient block from the step size control means.

30. The apparatus of claim 29, wherein the coefficient blocks additionally include a prior-previous coefficient block derived from a prior-previous picture block located in a prior-previous picture at the position of the current picture block in the current picture, the prior-previous picture being one of an I-picture and a P-picture processed immediately before the previous picture, the prior-previous coefficient block being quantized using a prior-previous step size, and wherein:

the quantizer includes:

quantizing means for quantizing each coefficient block using the corrected step size for the coefficient block received from the step size control means to provide a quantized coefficient block, the quantizing means quantizing the previous coefficient block to provide a previous quantized coefficient block, and means for feeding an all_zero flag to the step size control means when the quantized coefficient block is an all-zero quantized coefficient block; and in response to the all_zero flag, the equality determining means determines when the current step size is equal to the prior-previous step size to generate the equality indication instead of determining when the current step size is equal to the previous step size.

31. The apparatus of claim 30, wherein:

the apparatus additionally comprises:
   a memory in which the prior-previous step size is stored as a stored step size, and
   means for storing the previous step size in the memory as the stored step size to overwrite the prior-previous step size in response to the all_zero flag; and the equality determining means includes:
   comparator means for comparing the current step size with the stored step size read from the memory, and
   means for generating the equality indication when the comparator means indicates that the current step size is equal to the stored step size.

32. The apparatus of claim 30, wherein:

the apparatus additionally comprises:
   a memory in which a prior-previous quantized coefficient block obtained by quantizing the prior-previous coefficient block using the prior-previous step size is stored as a stored quantized coefficient block, and
   means for storing the previous quantized coefficient block as the stored quantized coefficient block to overwrite the prior-previous quantized coefficient block in response to the all_zero flag; and the equality determining means includes:
   comparator means for comparing the current quantized coefficient block with the stored quantized coefficient block, and
   means for generating the equality indication when the comparator means indicates that the current quantized coefficient block is identical to the stored quantized coefficient block.

33. The apparatus of claim 30, wherein the coefficient blocks additionally include a prior-previous coefficient block derived from a prior-previous picture block located in a prior-previous picture at the position of the current picture block in the current picture, the prior-previous picture being one of an I-picture and a P-picture processed immediately before the previous picture, the prior-previous coefficient block being quantized using a prior-previous step size, and wherein:

the prior-previous step size, the previous step size, and the current step size each have a parity;

the quantizer includes:
   quantizing means for quantizing each coefficient block using the corrected step size for the coefficient block received from the step size control means to provide a quantized coefficient block, the quantizing means quantizing the previous coefficient block to provide a previous quantized coefficient block, and
   means for feeding an all_zero flag to the step size control means when the quantized coefficient block is an all-zero quantized coefficient block; and in response to the all_zero flag, the equality determining means determines when the parity of the current step size is equal to the parity of the prior-previous step size to generate the equality indication, and otherwise determines when the parity of the current step size is equal to the parity of the previous step size to generate the equality indication, and the step size setting means includes means, operating in response to the equality indication, for changing the parity of the current step size to set the corrected step size to be different from the current step size.

34. The apparatus of claim 33, wherein:

the apparatus additionally comprises:
   a memory wherein the prior-previous step size parity is stored as a stored step size parity, and
   means for storing the previous step size parity as the stored step size parity to overwrite the prior-previous step size parity when the all_zero flag indicates that the previous quantized coefficient block is not an all-zero quantized coefficient block; and the equality determining means includes:
   comparator means for comparing current step size parity with the stored step size parity, and
   means for generating the equality indication when the comparator means indicates that the current step size parity is equal to the stored step size parity.

35. The apparatus of claim 29, wherein:

the current step size has a least-significant bit;

the equality determining means includes:
   means for representing a parity of the previous step size by a parity bit, and
   means for inverting the parity bit to provide an inverted parity bit; and the step size setting means includes means for replacing the least-significant bit of the current step size with the inverted parity bit to provide the corrected step size.

36. The apparatus of claim 29, wherein:

the equality determining means includes:
   means for determining a parity of the previous step size to provide a previous parity,
   means for determining a parity of the current step size to provide a current parity,
   comparator means for comparing the previous parity and the current parity,
   means, operating when the comparator means determines that the previous parity is equal to the current parity, for generating the equality indication; and the step size setting means includes parity inverting means, operating in response to the equality indication, for inverting the parity of the current step size to set the corrected step size to be different from the current step size.

37. The apparatus of claim 36, wherein the parity inverting means includes:

a look-up memory, the look-up memory storing a parity-inverted step size for each step size;

means for reading out the stored parity-inverted step size in response to the current step size; and means, operating in response to the equality indication, for selecting the read out parity-inverted step size as the corrected step size.

38. The apparatus of claim 36, wherein:

the current step size includes a least-significant bit; and the parity inverting means includes:
   means for inverting the least-significant bit of the current step size to provide a parity-inverted current step size,
   testing means for testing whether the parity-inverted current step size is equal to zero,
   means, operating when the testing means determines that the parity-inverted current step size is equal to zero, for setting the parity-inverted current step size to two, and means, operating when the comparator means determines that the current step size is equal to the previous step size, for providing the parity-inverted current step size as the corrected step size.

39. The apparatus of claim 36, wherein:

the current step size has a maximum value; and the parity inverting means includes:

means for adding one to the current step size to provide a parity-inverted current step size, testing means for testing whether the parity-inverted current step size is greater than the maximum value, means, operating when the testing means determines that the parity-inverted current step size is greater than the maximum value, for setting the parity-inverted current step size to a value of one less than the maximum value, and means, operating when the comparator means determines that the current step size is equal to the previous step size, for providing the parity-inverted current step size as the corrected step size.

40. The apparatus of claim 36, wherein the parity inverting means includes:

means for subtracting one from the current step size to provide a parity-inverted current step size;

testing means for testing whether the parity-inverted current step size is equal to zero;

means, operating when the testing means determines that the parity-inverted current step size is equal to zero, for setting the parity-inverted current step size to two; and means, operating when the comparator means determines that the current step size is equal to the previous step size, for providing the parity-inverted current step size as the corrected step size.

41. The apparatus of claim 29, wherein:

the equality determining means includes:

comparator means for comparing the current step size with the previous step size, and means for generating the equality indication when the comparator means indicates that the current step size is equal to the previous step size; and the step size setting means includes parity inverting means, operating in response to the equality indication, for inverting the parity of the current step size to provide the corrected step size.

42. The apparatus of claim 29, wherein:

the step size control means determines a current step size having a parity;

the quantizer includes quantizing means for quantizing each coefficient block using the corrected step size received from the step size control means to provide a quantized coefficient block, the quantizing means:

quantizing the previous coefficient block to provide a previous quantized coefficient block, and initially quantizing the current coefficient block using the current step size determined by the step size control means to provide a current quantized coefficient block;

the equality determining means includes:

comparator means for comparing the current quantized coefficient block with the previous quantized coefficient block, and means, operating when the comparator means determines that the current quantized coefficient block is equal to the previous quantized coefficient block, for generating the equality indication;

the step size setting means includes parity inverting means, operating in response to the equality indication, for inverting the parity of the current step size to provide the corrected step size; and the quantizing means additionally operates in response to the equality indication to requantize the current quantized coefficient block using the corrected step size set by the step size setting means.

43. The apparatus of claim 29, wherein:

the previous step size is represented by a previous quantizer_scale_code;

the current step size represented by a current quantizer_scale_code, the current quantizer_scale_code including a least-significant bit;

the equality determining means includes:

means for representing a parity of the previous quantizer_scale_code by a parity bit, and means for inverting the parity bit to provide an inverted parity bit;

the step size setting means includes means for replacing the least-significant bit of the current quantizer_scale_code with the inverted parity bit to provide a corrected quantizer_scale_code representing the corrected step size; and the quantizer receives from the step size control means the quantizer_scale_code representing the corrected step size for each coefficient block.

44. The apparatus of claim 29, wherein:

the previous step size is represented by a previous quantizer_scale_code;

the current step size is represented by a current quantizer_scale_code;

the equality determining means includes:

means for determining a parity of the previous quantizer_scale_code to provide a previous parity, means for determining a parity of the current quantizer_scale_code to provide a current parity, comparator means for comparing the previous parity and the current parity, and means for generating the equality indication operating when the comparator means determines that the previous parity is equal to the current parity;

the step size setting means includes parity inverting means, operating in response to the equality indication, for inverting the parity of the current quantizer_scale_code to provide a corrected quantizer_scale_code representing the corrected step size; and the quantizer receives from the step size control means the corrected quantizer_scale_code representing the corrected step size for each coefficient block.

45. The apparatus of claim 44, wherein the parity inverting means includes:

means for storing a parity-inverted quantizer_scale_code corresponding to each quantizer_scale_code;

means for reading out the stored parity-inverted quantizer_scale_code in response to the current quantizer_scale_code as a read out quantizer_scale_code; and means, operating when the comparator means determines that the previous parity is equal to the current parity, for selecting the read out parity-inverted quantizer_scale_code as the corrected quantizer_scale_code.

46. The apparatus of claim 44, wherein:

the current quantizer_scale_code includes a least-significant bit; and the parity inverting means includes:
  means for inverting the least-significant bit of the current quantizer_scale_code to provide a parity-inverted current quantizer_scale_code,
  testing means for testing whether the parity-inverted current quantizer_scale_code is equal to zero,
  means, operating when the testing means determines that the parity-inverted current quantizer_scale_code is equal to zero, for setting the parity-inverted current quantizer_scale_code to two, and
  means, operating when the comparator means determines that the previous parity is equal to the current parity, for providing the parity-inverted current quantizer_scale_code as the current quantizer_scale_code.

47. The apparatus of claim 44, wherein:
the quantizer_scale_code has a maximum value; and
the parity inverting means includes:
  means for adding one to the current quantizer_scale_code to provide a parity-inverted current quantizer_scale_code,
  testing means for testing whether the parity-inverted current quantizer_scale_code is greater than the maximum value,
  means, operating when the testing means determines that the parity-inverted current quantizer_scale_code is greater than the maximum value, for setting the parity-inverted current quantizer_scale_code to a value of one less than the maximum value, and
  means, operating when the comparator means determines that the previous parity is equal to the current parity, for providing the parity-inverted current quantizer_scale_code as the corrected quantizer_scale_code.

48. The apparatus of claim 44, wherein the parity inverting means includes:
  means for subtracting one from the current quantizer_scale_code to provide a parity-inverted current quantizer_scale_code;
  testing means for testing whether the parity-inverted current quantizer_scale_code is equal to zero;
  means, operating when the testing step determines that the parity-inverted current quantizer_scale_code is equal to zero, for setting the parity-inverted current quantizer_scale_code to two; and
  means, operating when the comparator means determines that the previous parity is equal to the current parity, providing the parity-inverted current quantizer_scale_code as the corrected quantizer_scale_code.

49. The apparatus of claim 29, wherein:
the previous step size is represented by a previous quantizer_scale_code;
the current step size is represented by a current quantizer_scale_code;
the equality determining means includes:
  comparator means for comparing the current quantizer_scale_code with the previous quantizer_scale_code, and
  means for generating the equality indication when the comparator means determines that the current quantizer_scale_code is equal to the previous quantizer_scale_code;
the step size setting means includes means, operating in response to the equality indication, for inverting the parity of the current quantizer_scale_code to provide a corrected quantizer_scale_code representing the corrected step size; and
the quantizer receives from the step size control means the corrected quantizer_scale_code representing the corrected step size for each coefficient block.

50. The apparatus of claim 29, wherein:
the current step size is represented by a current quantizer_scale_code, the current quantizer_scale_code having a parity;
the quantizer includes quantizing means for quantizing each coefficient block using the corrected step size received from the step size control means to provide a quantized coefficient block, the quantizing means:
  quantizing the previous coefficient block using the previous step size represented by a previous quantizer_scale_code to provide a previous quantized coefficient block, and
  quantizing the current coefficient block using the current step size calculated by the step size calculating means and represented by the current quantizer_scale_code to provide a current quantized coefficient block;
the equality determining means includes:
  comparing means for comparing the current quantized coefficient block with the previous quantized coefficient block, and
  means for generating the equality indication when the comparator means determines that the current quantized coefficient block is equal to the previous quantized coefficient block;
the step size setting means includes means, operating in response to the equality indication, for inverting the parity of the current quantizer_scale_code to provide a parity-inverted current quantizer_scale_code representing the corrected step size; and
the quantizing means additionally operates in response to the equality indication to re-quantize the current quantized coefficient block using the corrected step size represented by the parity-inverted current quantizer_scale_code.

51. The apparatus of claim 29, wherein:
the previous step size is represented by a previous quantizer_scale_code;
the current step size is represented by a current quantizer_scale_code;
the corrected step size is represented by a corrected quantizer_scale_code; and
the quantizer receives from the step size control means the corrected quantizer_scale_code representing the corrected step size for each coefficient.

52. The apparatus of claim 51, wherein the coefficient blocks additionally include a prior-previous coefficient block derived from a prior-previous picture block located in a prior-previous picture at the position of the current picture block in the current picture, the prior-previous picture being one of an I-picture and a P-picture processed immediately before the previous picture, the prior-previous coefficient block being quantized using a prior-previous step size represented by a prior-previous quantizer_scale_code, and wherein:
the quantizer includes:
  quantizing means for quantizing each coefficient block using the corrected step size for the coefficient block received from the step size control means to provide a quantized coefficient block, the quantizing means quantizing the previous coefficient block to provide a previous quantized coefficient block, and means for feeding an all_zero flag to the step size control means when the quantized coefficient block is an all-zero quantized coefficient block;

in response to the all-zero flag, the equality determining means determines when the current quantizer_scale_code is equal to the prior-previous quantizer_scale_code to generate the equality indication, instead of determining when the current quantizer_scale_code is equal to the previous quantizer_scale_code; and the step size setting means includes means, operating in response to the equality indication, for changing the current quantizer_scale_code to provide a corrected quantizer_scale_code representing the corrected step size.

53. The apparatus of claim 52, wherein:

the apparatus additionally includes:

a memory in which the prior-previous quantizer_scale_code is stored as a stored quantizer_scale_code, and means for storing the previous quantizer_scale_code as the stored quantizer_scale_code to overwrite the prior-previous quantizer_scale_code in response to the all_zero flag;

the equality determining means includes:

comparator means for comparing the current quantizer_scale_code and the stored quantizer_scale_code, and means for generating the equality indication when the comparator means indicates that the current quantizer_scale_code is equal to the stored quantizer_scale_code; and the step size setting means includes means, operating in response to the equality indication, for changing the current quantizer_scale_code to provide a corrected quantizer_scale_code representing the corrected step size.

54. The apparatus of claim 52, wherein:

the apparatus additionally comprises:

a memory in which a prior previous quantized coefficient block obtained by quantizing the prior-previous coefficient block using the prior-previous step size is stored as a stored quantized coefficient block, and means for storing the previous quantized coefficient block as the stored quantized coefficient block to overwrite the prior-previous quantized coefficient block in response to the all_zero flag;

the equality determining means includes:

comparator means for comparing the current quantized coefficient block and the stored quantized coefficient block, and means for generating the equality indication when the comparator means indicates that the current quantized coefficient block is identical to the stored quantized coefficient block; and the step size setting means includes means, operating in response to the equality indication, for changing the current quantizer_scale_code to provide a corrected quantizer_scale_code representing the corrected step size.

55. The apparatus of claim 51, wherein the coefficient blocks additionally include a prior-previous coefficient block derived from a prior-previous picture block located in a prior-previous picture at the position of the current picture block in the current picture, the prior-previous picture being one of an I-picture and a P-picture processed immediately before the previous picture, the prior-previous coefficient block being quantized using a prior-previous step size represented by a prior-previous quantizer_scale_code, and wherein:

the prior-previous quantizer_scale_code, the previous quantizer_scale_code, and the current quantizer_scale_code each have a parity;

the quantizer includes:

quantizing means for quantizing each coefficient block using the corrected step size for the coefficient block received from the step size control means to provide a quantized coefficient block, the quantizing means quantizing the previous coefficient block to provide a previous quantized coefficient block, and means for feeding an all_zero flag to the step size control means when the quantized coefficient block is an all-zero quantized coefficient block;

in response to the all_zero flag, the equality determining means determines when the parity of the current quantizer_scale_code is equal to the parity of the prior-previous quantizer_scale_code to generate the equality indication, and otherwise determines when the parity of the current quantizer_scale_code is equal to the parity of the previous quantizer_scale_code; and the step size setting means includes means, operating in response to the equality indication, for changing the parity of the current quantizer_scale_code to generate a corrected quantizer_scale_code representing the corrected step size.

56. The apparatus of claim 55, wherein:

the prior-previous quantizer_scale_code has a prior-previous quantizer_scale_code parity;

the apparatus additionally comprises:

a memory in which the prior-previous quantizer_scale_code parity is stored as a stored quantizer_scale_code parity, and means for storing the previous quantizer_scale_code parity as the stored quantizer_scale_code parity to overwrite the prior-previous quantizer_scale_code parity in response to the all_zero flag;

the equality determining means includes:

comparator means for comparing the current quantizer_scale_code parity with the stored quantizer_scale_code parity, and means for generating the equality indication when the comparator means determines that the current quantizer_scale_code parity is equal to the stored quantizer_scale_code parity; and the step size setting means includes means, operating in response to the equality indication, for changing the parity of the current quantizer_scale_code to provide a corrected quantizer_scale_code representing the corrected step size.

57. Apparatus for compressing a motion picture signal, the motion picture signal including successive pictures comprising picture blocks, the pictures including a previous picture and a current picture, the current picture including a current picture block having a position in the current picture, the previous picture including a previous picture block located therein at the position of the current picture block in the current picture, the apparatus comprising:

means for performing motion compensation on the previous picture to derive a block of differences between the current picture block and the previous picture;

means for orthogonally transforming the block of differences to provide a current coefficient block;

step size control means for determining a corrected step size for quantizing the current coefficient block, the step size control means receiving information indicating a previous step size used to quantize a previous coefficient block derived from the previous picture block, the step size control means including:

step size calculating means for calculating a current step size for the current coefficient block, equality determining means for determining when the current step size calculated for the current coefficient block by the step size calculating means is equal to the previous step size to generate an equality indication, and step size setting means for setting the corrected step size to be different from the current step size in response to the equality indication from the equality determining means, and otherwise for setting the corrected step size to be equal to the current step size; and a quantizer, the quantizer receiving the current coefficient block and the previous coefficient block, and receiving the corrected step size for the current coefficient block from the step size control means.

58. The apparatus of claim 57, wherein the coefficient blocks additionally include a prior-previous coefficient block derived from a prior-previous picture block located in a prior-previous picture at the position of the current picture block in the current picture, the prior-previous picture being one of an I-picture and a P-picture processed immediately before the previous picture, the prior-previous coefficient block being quantized using a prior-previous step size, and wherein:

the quantizer includes:

quantizing means for quantizing each coefficient block using the corrected step size received for the coefficient block from the step size control means to provide a quantized coefficient block, the quantizing means quantizing the previous coefficient block to provide a previous quantized coefficient block, and means for feeding an all_zero flag to the step size controller when the quantized coefficient block is an all-zero quantized coefficient block; and in response to the all_zero flag, the equality determining means determines when the current step size is equal to the prior-previous step size to generate the equality indication instead of determining when the current step size is equal to the previous step size.

59. The apparatus of claim 57, wherein:

the current step size has a least-significant bit; and the equality determining means includes:

means for representing a parity of the previous step size by a parity bit, and means for inverting the parity bit to provide an inverted parity bit; and the step size setting means includes means for replacing the least-significant bit of the current step size with the inverted parity bit to provide the corrected step size.

60. The apparatus of claim 57, wherein:

the equality determining means includes:

means for determining a parity of the previous step size to provide a previous parity, means for determining a parity of the current step size to provide a current parity, comparator means for comparing the previous parity and the current parity, and means for generating the equality indication when the comparator means determines that the previous parity is equal to the current parity; and the step size setting means include means, operating in response to the equality indication, for inverting the parity of the current step size to provide the corrected step size.

* * * * *